US012219470B2

(12) United States Patent
Chen et al.

(10) Patent No.: US 12,219,470 B2
(45) Date of Patent: Feb. 4, 2025

(54) METHOD FOR ACCESSING WIRELESS LOCAL AREA NETWORK AND TERMINAL

(71) Applicant: Huawei Technologies Co., Ltd., Shenzhen (CN)

(72) Inventors: Qihang Chen, Xi'an (CN); Peng Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 587 days.

(21) Appl. No.: 17/611,427

(22) PCT Filed: May 18, 2020

(86) PCT No.: PCT/CN2020/090747
§ 371 (c)(1),
(2) Date: Nov. 15, 2021

(87) PCT Pub. No.: WO2020/233538
PCT Pub. Date: Nov. 26, 2020

(65) Prior Publication Data
US 2022/0232466 A1    Jul. 21, 2022

(30) Foreign Application Priority Data
May 17, 2019    (CN) .......................... 201910411638.7

(51) Int. Cl.
H04W 4/00          (2018.01)
H04W 48/16         (2009.01)
(Continued)

(52) U.S. Cl.
CPC ........... *H04W 48/18* (2013.01); *H04W 48/16* (2013.01); *H04W 84/12* (2013.01)

(58) Field of Classification Search
CPC ............................ H04W 48/16; H04W 48/18
(Continued)

(56) References Cited

U.S. PATENT DOCUMENTS

2011/0066756 A1    3/2011   Kakumaru
2015/0103776 A1    4/2015   Luther et al.
(Continued)

FOREIGN PATENT DOCUMENTS

CN    103167488 A    6/2013
CN    105208206 A    12/2015
(Continued)

OTHER PUBLICATIONS

Mark Hamilton, "802.11 Notes for response to Liaison statement from WBA on MAC Address Randomzation impacts," IEEE 802.11-18/1671r1, Oct. 2018, 5 pages.
(Continued)

*Primary Examiner* — Temica M Beamer
(74) *Attorney, Agent, or Firm* — Conley Rose, P.C.

(57) ABSTRACT

A method for accessing a wireless local area network (WLAN) includes a terminal receiving type information of the WLAN and identification information of the WLAN from an access point. The terminal determines a type of the WLAN based on the type information. The terminal sends, to the access point when the terminal determines that the type is a type I, a message requesting to access the WLAN. The message carries a virtual media access control (MAC)
(Continued)

address, where the virtual MAC address identifies the terminal, and where the virtual MAC address is different from a device MAC address of the terminal.

20 Claims, 30 Drawing Sheets

(51) Int. Cl.
*H04W 48/18* (2009.01)
*H04W 84/12* (2009.01)

(58) Field of Classification Search
USPC ........................................................ 370/338
See application file for complete search history.

(56) References Cited

U.S. PATENT DOCUMENTS

| | | |
|---|---|---|
| 2015/0281167 A1 | 10/2015 | Seddon |
| 2016/0037367 A1 | 2/2016 | Li et al. |
| 2016/0050559 A1 | 2/2016 | Rose et al. |
| 2016/0212695 A1* | 7/2016 | Lynch ............... H04W 28/0268 |
| 2017/0171737 A1 | 6/2017 | Mestanov et al. |
| 2018/0248871 A1 | 8/2018 | Tsirkin |

FOREIGN PATENT DOCUMENTS

| | | |
|---|---|---|
| CN | 106102125 A | 11/2016 |
| CN | 106664552 A | 5/2017 |
| CN | 107094293 A | 8/2017 |
| CN | 107872791 A | 4/2018 |
| CN | 109714761 A | 5/2019 |
| EP | 3145232 A1 | 3/2017 |

OTHER PUBLICATIONS

Mark Hamilton, "Randomized or Changing MAC address use cases," IEEE 802.11-19/1607r0, Sep. 2019, 8 pages.

Anonymous, "MAC randomization behavior," Android Open Source Project, Sep. 25, 2024, XP93208626, 4 pages.

El, R., et al., "Android Q randomizes MAC addresses by default, with per-network customization," Apr. 5, 2019, XP93208637, 3 pages.

Anonymous-Wikipedia Android et al., "Android 10—Wikipedia", Sep. 3, 2024, XP093208652, 11 pages.

* cited by examiner

METHOD FOR ACCESSING WIRELESS LOCAL AREA NETWORK AND TERMINAL

CROSS-REFERENCE TO RELATED APPLICATIONS

This is a U.S. National Stage of International Patent Application No. PCT/CN2020/090747 filed on May 18, 2020, which claims priority to Chinese Patent Application No. 201910411638.7 filed on May 17, 2019. Both of the aforementioned applications are hereby incorporated by reference in their entireties.

TECHNICAL FIELD

This application relates to the field of terminal device technologies, and in particular, to a method for accessing a wireless local area network and a terminal.

BACKGROUND

A wireless fidelity (Wireless Fidelity, Wi-Fi) technology is a wireless local area network technology established in the IEEE 802.11 standards, and is a technology that can wirelessly connect a terminal such as a personal computer, a personal digital assistant (personal digital assistant, PDA), or a mobile phone to a wide area network.

A media access control (Media Access Control. MAC) address of the terminal is an identifier of the terminal. In the conventional technology, a plurality of Wi-Fi access points are distributed in a public network environment, and a terminal usually sends a real device MAC address of the terminal to the Wi-Fi access points in a process of establishing connections to the Wi-Fi access points. Therefore, the device MAC address of the terminal can be obtained through the foregoing Wi-Fi access points. A third party may separately obtain, by using the device MAC address of the terminal, data such as a model and a price of the terminal in production and sales processes of the terminal and a movement track of the terminal in a process in which a user uses the terminal after the user purchases the terminal, and the third party establishes a connection between the two by using a same device MAC address, so that the third party can obtain location information and purchase preference of the user.

SUMMARY

In view of this, this application provides a method for accessing a wireless local area network. In the method, a virtual MAC address is used to replace a device MAC address to identify a terminal device, and the virtual MAC address is different from the device MAC address. This resolves a technical problem that a third party may track a device MAC address of a terminal through a local area network and then associate data such as a model and a price of the terminal in production and sales processes.

According to a first aspect, this application provides a method for accessing a wireless local area network. The method includes: A terminal receives type information of a first wireless local area network and identification information of the first wireless local area network that are sent by a first access point. The first wireless local area network is provided by the first access point. The terminal determines a type of the first wireless local area network based on the type information of the first wireless local area network. The terminal sends a first message to the first access point if the terminal determines that the type of the first wireless local area network is a type I. The first message is used to request to access the first wireless local area network, the first message carries a first virtual MAC address, the first virtual MAC address is used to identify the terminal, and the first virtual MAC address is different from a device MAC address of the terminal. The terminal stores the identification information of the first wireless local area network after the terminal accesses the first wireless local area network.

Therefore, according to the method, when the terminal performs determining based on a type of a local area network, if the wireless local area network is of a first type, security of the type of wireless local area network is relatively low, the terminal uses a virtual MAC address different from a device MAC address to identify the terminal, and even through the wireless local area network, a third party cannot obtain the device MAC address of the terminal but can obtain only the virtual MAC address of the terminal. Consequently, the third party cannot associate user information obtained by using the device MAC address with user information obtained by using the virtual MAC address.

In a possible implementation of the first aspect, the virtual MAC address includes a random MAC address, a function MAC address, or the like. The random MAC address is generated by a processor, and a format of the random MAC address is XX-XX-XX-XX-XX-XX. A first byte is X2, X6, XA, or XE, and X ranges from 0 to F. The function MAC address is a MAC address having a specific function rule, for example, 01-02-03-04-05-06 or 01-02-04-08-16-32.

According to the first aspect or any implementation of the first aspect, the type information of the local area network is an open (OPEN) network, a WPA3 enhanced open network, a shared-key WEP network, a WPA network, a WPA2-PSK network, a WPA3-PSK only personal encryption network, WPA2/WPA3-PSK compatible personal encryption network, WPA-802.1x enterprise encryption network, or WPA3-Enterprise encryption network.

According to the first aspect or any implementation of the first aspect, after the terminal accesses the first wireless local area network, the method further includes: The terminal stores a correspondence between the identification information of the first wireless local area network and the first virtual MAC address; the terminal leaves the first wireless local area network; the terminal receives again the type information of the first wireless local area network and the identification information of the first wireless local area network that are sent by the first access point; and the terminal sends the first message to the first access point based on the correspondence between the identification information of the first wireless local area network and the first virtual MAC address. In this way, when the terminal accesses a wireless local area network again by using a same device address used to identify the terminal, the terminal does not need to perform determining again based on a type of the wireless local area network, but selects a to-be-used device address based on a stored record.

According to the first aspect or any implementation of the first aspect, the correspondence between the identification information of the first wireless local area network and the first virtual MAC address may be a mapping relationship between an SSID of the wireless local area network and a random MAC address, or may be a mapping relationship between an SSID of the wireless local area network, a BSSID of the access point, and a random MAC address, or may be a mapping relationship between a BSSID of the access point and a random MAC address.

According to the first aspect or any implementation of the first aspect, before the terminal accesses the first wireless local area network, the method further includes: If the terminal determines that the terminal cannot access the first wireless local area network, the terminal sends a second message to a second access point. The second message is used to request to access a second wireless local area network, the second message carries a second virtual MAC address, the second virtual MAC address is used to identify the terminal, the second virtual MAC address is different from the device MAC address of the terminal, and the second wireless local area network is provided by the second access point. In this way, after determining that the first wireless local area network cannot be accessed, the terminal switches to access the second wireless local area network. This reduces a time of accessing a wireless local area network by a user, and helps the user access the wireless local area network. For different wireless local area networks, there are different virtual MAC addresses of the terminal. In this case, even if the third party can track a virtual MAC address of the terminal through a wireless local area network, the third party may obtain different virtual MAC addresses. Because there is no association relationship between virtual MAC addresses, the third party cannot associate the virtual MAC addresses to obtain a complete activity track of the terminal. This avoids a case in which the third party may obtain the complete activity track of the terminal by tracking the device MAC address of the terminal. It can be learned that the method effectively protects security of location information of the user using the terminal.

According to the first aspect or any implementation of the first aspect, the type I includes an open (OPEN) network, a WPA3 enhanced open network, a shared-key WEP network, a WPA network, a WPA2-PSK network, a WPA3-PSK only personal encryption network, or a WPA2/WPA3-PSK compatible personal encryption network.

According to the first aspect or any implementation of the first aspect, before the terminal sends the first message to the first access point if the terminal determines that the type of the first wireless local area network is the type I, the method further includes: The terminal determines that a correspondence between the identification information of the first wireless local area network and a virtual MAC address is not stored. In this way, if the terminal does not store the correspondence between the identification information of the first wireless local area network and the virtual MAC address, the terminal needs to perform determining only when the terminal accesses the first wireless local area network. This reduces a time of accessing a wireless local area network by the user, and helps the user access the wireless local area network.

According to the first aspect or any implementation of the first aspect, after the terminal accesses the first wireless local area network, the method further includes: The terminal displays a first interface. The first interface includes a control of the identification information of the first wireless local area network, an identifier indicating that the first wireless local area network is in a connected state, and an identifier indicating signal strength of the first wireless local area network. The terminal detects a first operation performed by a user on the control of the identification information of the first wireless local area network. The terminal displays a second interface in response to the first operation. The second interface includes a control using virtual MAC and a control using device MAC, the control using virtual MAC is in a selected state, and that the control using virtual MAC is in a selected state indicates that the terminal accesses the first wireless local area network by using a virtual MAC address. The terminal detects a first selection operation performed by the user on the control using device MAC. The terminal displays a third interface in response to the first selection operation. The third interface includes the control using virtual MAC and the control using device MAC, the control using device MAC is in a selected state, and that the control using device MAC is in a selected state indicates that the terminal accesses the first wireless local area network by using the device MAC address. The terminal leaves the first wireless local area network. The terminal sends a third message to the first access point. The third message is used to request to access the first wireless local area network, and the third message carries the device MAC address of the terminal. In this way, after the terminal accesses the first wireless local area network, the user may change, according to a requirement or preference, a device address that is used to identify the terminal and that is used to access the first wireless local area network, so that the terminal automatically accesses the first wireless local area network by using a device MAC address obtained after changing by the user.

According to the first aspect or any implementation of the first aspect, the user enables a wireless local area network function by using a control, and the terminal starts to perform active scanning, and displays, on an interface, a control that is of an SSID of an available wireless local area network and that is obtained through scanning. The interface includes a control of an SSID of the first wireless local area network and an identifier indicating signal strength of the first wireless local area network. After the terminal accesses the first wireless local area network, the method further includes: The terminal displays a first interface. The first interface displays not only the control of the SSID of the first wireless local area network and the identifier indicating the signal strength of the first wireless local area network, but also an identifier indicating that the first wireless local area network is in a connected state. The user taps the control of the SSID of the first wireless local area network to enter a second interface, that is, a network details interface of the first wireless local area network. The interface includes an IP setting control, a control indicating whether to use a proxy, or/and a privacy control. The privacy control includes a control using virtual MAC and a control using device MAC, and the control using virtual MAC is in a selected state. The user taps the control using device MAC, and the terminal displays a third interface in response to the foregoing tap operation. The third interface also includes the IP setting control, the control indicating whether to use a proxy, or/and the privacy control. A difference between the third interface and the second interface is that the control using device MAC is in a selected state. The terminal switches back to display the first interface after the user taps a control "Save", or the terminal automatically switches back to display the first interface. The terminal leaves the first wireless local area network, and sends a message that carries the device MAC address to the first access point to request to access the first wireless local area network.

According to the first aspect or any implementation of the first aspect, after the terminal accesses the first wireless local area network, the method further includes: The terminal displays a fourth interface. The fourth interface includes a control of the identification information of the first wireless local area network, an identifier indicating that the first wireless local area network is in a connected state, an identifier indicating signal strength of the first wireless local area network, and a control of identification information of a second wireless local area network, and the second wireless local area network is provided by a second access point. The terminal detects a second operation performed by a user on the control of the identification information of the second wireless local area network. The terminal displays a fifth interface in response to the second operation. The fifth interface includes a control using virtual MAC and a control using device MAC, the control using virtual MAC is in a selected state, and that the control using virtual MAC is in a selected state indicates that the terminal accesses the second wireless local area network by using a virtual MAC address. The terminal detects a second selection operation performed by the user on the control using device MAC. The terminal displays a sixth interface in response to the second selection operation. The sixth interface includes the control using virtual MAC and the control using device MAC, the control using device MAC is in a selected state, and that the control using device MAC is in a selected state indicates that the terminal accesses the second wireless local area network by using the device MAC address. The terminal detects a third operation performed by the user on the control of the identification information of the second wireless local area network. The terminal leaves the first wireless local area network in response to the third operation. The terminal sends a fourth message to the second access point. The fourth message is used to request to access the second wireless local area network, and the fourth message carries the device MAC address of the terminal. In this way, after the terminal accesses the first wireless local area network, the user may change, according to a requirement or preference, a device address that is used to identify the terminal and that is not used to access the second wireless local area network. Because the terminal is accessing the first wireless local area network, user triggering is required to enable the terminal to start to access the second wireless local area network by using a specified device MAC address. This improves user controllability.

According to the first aspect or any implementation of the first aspect, the user enables a wireless local area network function by using a control, and the terminal starts to perform active scanning, and displays, on an interface, a control that is of an SSID of an available wireless local area network and that is obtained through scanning. The interface includes a control of an SSID of the first wireless local area network, a control of an SSID of a second wireless local area network, and an identifier indicating signal strength of the first wireless local area network. After the terminal accesses the first wireless local area network, the method further includes: The terminal displays a fourth interface. The fourth interface displays not only the control of the SSID of the first wireless local area network, the control of the SSID of the second wireless local area network, and the identifier indicating the signal strength of the first wireless local area network, but also an identifier indicating that the first wireless local area network is in a connected state. The user taps the control of the SSID of the second wireless local area network to enter a fifth interface, that is, a network details interface of the second wireless local area network. The fifth interface includes an IP setting control, a control indicating whether to use a proxy, or/and a privacy control. The privacy control includes a control using virtual MAC and a control using device MAC, and the control using virtual MAC is in a selected state. The user taps the control using device MAC, and the terminal displays a sixth interface in response to the foregoing tap operation. The sixth interface also includes the IP setting control, the control indicating whether to use a proxy, or/and the privacy control. A difference between the sixth interface and the fifth interface is that the control using device MAC is in a selected state. The terminal switches back to display the fourth interface after the user taps a control "Save", or the terminal automatically switches back to display the fourth interface. On the fourth interface, the user taps the control of the SSID of the second wireless local area network, and the terminal leaves the first wireless local area network in response to the foregoing tap operation. The terminal sends a message that carries the device MAC address to a second access point to request to access the second wireless local area network.

According to the first aspect or any implementation of the first aspect, after the terminal accesses the first wireless local area network, the method further includes: The terminal displays a seventh interface. The seventh interface includes a control of the identification information of the first wireless local area network, a control of identification information of a third wireless local area network, an identifier indicating that the first wireless local area network is in a connected state, and an identifier indicating signal strength of the first wireless local area network, and the third wireless local area network is provided by a third access point. The terminal detects a fourth operation performed by a user on the control of the identification information of the third wireless local area network. The terminal leaves the first wireless local area network in response to the fourth operation. The terminal sends a fifth message to the third access point if the terminal determines that a type of the third wireless local area network is the type I. The fifth message is used to request to access the third wireless local area network, the fifth message carries a third virtual MAC address, the third virtual MAC address is used to identify the terminal, the third virtual MAC address is different from the first virtual MAC address and the device MAC address of the terminal, and the third wireless local area network is different from the first wireless local area network. For different wireless local area networks, there are different virtual MAC addresses of the terminal. In this case, even if the third party can track a virtual MAC address of the terminal through a wireless local area network, the third party may obtain different virtual MAC addresses. Because there is no association relationship between virtual MAC addresses, the third party cannot associate the virtual MAC addresses to obtain a complete activity track of the terminal. This avoids a case in which the third party may obtain the complete activity track of the terminal by tracking the device MAC address of the terminal. It can be learned that the method effectively protects security of location information of the user using the terminal, After the terminal accesses the first wireless local area network, or when the terminal is accessing the first wireless local area network, or before the terminal accesses the first wireless local area network, the terminal receives type information of the third wireless local area network and the identification information of the third wireless local area network that are sent by the third access point.

According to the first aspect or any implementation of the first aspect, before the terminal sends the fifth message to the third access point if the terminal determines that the type of the third wireless local area network is the type I, the method further includes: The terminal determines that a correspondence between the identification information of the third wireless local area network and a virtual MAC address is not stored. In this way, if the terminal does not store the correspondence between the identification information of the third wireless local area network and the virtual MAC address, the terminal needs to perform determining only when the terminal accesses the third wireless local area network. This reduces a time of accessing a wireless local area network by the user, and helps the user access the wireless local area network.

According to the first aspect or any implementation of the first aspect, the terminal sends a third message to the first access point if the terminal determines that the type of the first wireless local area network is a type III. The third message is used to request to access the first wireless local area network, and the third message carries the device MAC address of the terminal. The terminal stores the identification information of the first wireless local area network after the terminal accesses the first wireless local area network. In this way, compatibility of a specific type of wireless local area network is ensured, so that the user can quickly access the wireless local area network without a plurality of attempts.

According to the first aspect or any implementation of the first aspect, the type III includes a WPA-802.1x enterprise encryption network or a WPA3-Enterprise encryption network.

According to the first aspect or any implementation of the first aspect, before the terminal sends the first message to the first access point if the terminal determines that the type of the first wireless local area network is the type I, the method further includes: The terminal displays an eighth interface. The eighth interface includes a control of the identification information of the first wireless local area network and an identifier indicating signal strength of the first wireless local area network. The terminal detects a fourth operation performed by the user on the control of the identification information of the first wireless local area network. The terminal sends the first message to the first access point if the terminal determines that the type of the first wireless local area network is the type I. In this way, the user selects the first wireless local area network, then the terminal accesses the first wireless local area network, and the user may make a selection according to a requirement of the user and a current case. This improves user controllability.

According to the first aspect or any implementation of the first aspect, the user enables a wireless local area network function by tapping a wireless local area network on/off control, and the terminal starts to perform active scanning, and displays, on a seventh interface, a control that is of an SSID of an available wireless local area network and that is obtained through scanning. The available wireless local area network includes the first wireless local area network, and the seventh interface displays a control of an SSID of the first wireless local area network and an identifier indicating signal strength of the first wireless local area network. The user taps the control of the SSID of the first wireless local area network, and the terminal sends the first message to request to access the first wireless local area network.

According to the first aspect or any implementation of the first aspect, if a quantity of times for which the terminal requests to access the first wireless local area network is greater than or equal to N, the terminal determines that the terminal cannot access the first wireless local area network, where N is an integer. N is an integer such as 3, 4, 5, 6, or 7, Through a plurality of attempts, this avoids a case in which the first wireless local area network cannot be accessed due to an accidental factor such as blocking or a poor signal, and increases a possibility of accessing the first wireless local area network.

According to the first aspect or any implementation of the first aspect, the identification information of each of the first, second, and third wireless local area networks includes a service set identifier (service set identifier, SSID) or/and a basic service set identifier (basic service set identifier. BSSID).

According to the first aspect or any implementation of the first aspect, the first message, the second message, the third message, the fourth message, and the fifth message each include a probe request frame, an authentication request frame, or an association request frame. In this way, the terminal uses a virtual MAC address not only in a scanning phase, but also in a link authentication phase, an association phase, and an access authentication phase.

According to the first aspect or any implementation of the first aspect, the first operation, the second operation, the third operation, the first selection operation, and the second selection operation include a tap operation, a touch operation, a double-tap operation, or a slide operation. In this way, the user may make a selection according to a requirement and preference. This improves user controllability.

According to a second aspect, this application provides a method for accessing a wireless local area network. The method includes: A terminal receives type information of a first wireless local area network and identification information of the first wireless local area network that are sent by a first access point. The first wireless local area network is provided by the first access point. The terminal determines a type of the first wireless local area network based on the type information of the first wireless local area network. The terminal sends a first message to the first access point if the terminal determines that the type of the first wireless local area network is a type II. The first message is used to request to access the first wireless local area network, the first message carries a first virtual MAC address, the first virtual MAC address is used to identify the terminal, and the first virtual MAC address is different from a device MAC address of the terminal. The terminal sends a second message to the first access point if the terminal determines that the terminal cannot access the first wireless local area network. The second message is used. to request to access the first wireless local area network, and the second message carries the device MAC address of the terminal. The terminal stores the identification information of the first wireless local area network after the terminal accesses the first wireless local area network.

In this way, when the terminal still fails to access a specific type of wireless local area network for a plurality of times by using a random MAC address, the terminal attempts to access the wireless local area network by using device MAC as a device address. On the basis of preventing the device MAC address of the terminal from being easily obtained by a third party, the terminal further considers compatibility of the wireless local area network. This avoids a case in which the terminal cannot access a wireless local area network because a whitelist is set in an access point.

In a possible implementation of the second aspect, the virtual MAC address includes a random MAC address, a function MAC address, or the like. The random MAC address is generated by a processor, and a format of the random MAC address is XX-XX-XX-XX-XX-XX. A first byte is X2, X6, XA, or XE, and X ranges from 0 to The function MAC address is a MAC address having a specific function rule, for example, 01-02-03-04-05-06 or 01-02-04-08-16-32.

According to the second aspect or any implementation of the second aspect, a correspondence between the identification information of the first wireless local area network and the first virtual MAC address may be a mapping relationship between an SSID of the wireless local area network and a random MAC address, or may be a mapping relationship between an SSID of the wireless local area network, a BSSID of the access point, and a random MAC address, or may be a mapping relationship between a BSSID of the access point and a random MAC address.

According to the second aspect or any implementation of the second aspect, after the terminal accesses the first wireless local area network, the method further includes: The terminal stores a correspondence between the identification information of the first wireless local area network and the device MAC address; the terminal leaves the first wireless local area network; the terminal receives again the type information of the first wireless local area network and the identification information of the first wireless local area network that are sent by the first access point; and the terminal sends the second message to the first access point based on the correspondence between the identification information of the first wireless local area network and the device MAC address. In this way, when the terminal accesses a wireless local area network again by using a same device address used to identify the terminal, the terminal does not need to perform determining again based on a type of the wireless local area network, but selects a to-be-used device address based on a stored record.

According to the second aspect or any implementation of the second aspect, before the terminal sends the second message to the first access point if the terminal determines that the terminal cannot access the first wireless local area network, the method further includes: If the terminal accesses the first wireless local area network, the terminal stores a correspondence between the identification information of the first wireless local area network and the first virtual MAC address after the terminal accesses the first wireless local area network; the terminal leaves the first wireless local area network; the terminal receives again the type information of the first wireless local area network and the identification information of the first wireless local area network that are sent by the first access point; and the terminal sends the first message to the first access point based on the correspondence between the identification information of the first wireless local area network and the first virtual MAC address. In this way, when the terminal accesses a wireless local area network again by using a same device address used to identify the terminal, the terminal does not need to perform determining again based on a type of the wireless local area network, but selects a to-be-used device address based on a stored record.

According to the second aspect or any implementation of the second aspect, the type II includes a shared-key WEP network, a WPA network, a WPA2-PSK network, a WPA3-PSK only personal encryption network, a WPA/WPA3-PSK compatible personal encryption network, a SPA-802.1x enterprise encryption network, or a WPA3-Enterprise encryption network.

According to the second aspect or any implementation of the second aspect, the method further includes: If a quantity of times for which the terminal requests to access the first wireless local area network is greater than or equal to N, the terminal determines that the terminal cannot access the first wireless local area network, where N is an integer. N is an integer such as 3, 4, 5, 6, or 7. Through a plurality of attempts, this avoids a case in which the first wireless local area network cannot be accessed due to an accidental factor such as blocking or a poor signal, and increases a possibility of accessing the first wireless local area network.

According to the second aspect or any implementation of the second aspect, before the terminal sends the second message to the first access point if the terminal determines that the terminal cannot access the first wireless local area network, the method further includes: The terminal displays a first interface. The first interface includes a reminder message, and the reminder message is used to remind a user to select to access the first wireless local area network by using device MAC. The terminal displays a second interface. The second interface includes a control of the identification information of the first wireless local area network and an identifier indicating signal strength of the first wireless local area network. The terminal detects a first operation performed by the user on the control of the identification information of the first wireless local area network. The terminal displays a third interface in response to the first operation. The third interface includes a control using virtual MAC and a control using device MAC, the control using virtual MAC is in a selected state, and that the control using virtual MAC is in a selected state indicates that the terminal accesses the first wireless local area network by using a virtual MAC address. The terminal detects a first selection operation performed by the user on the control using device MAC. The terminal displays a fourth interface in response to the first selection operation. The fourth interface includes the control using virtual MAC and the control using device MAC, the control using device MAC is in a selected state, and that the control using device MAC is in a selected state indicates that the terminal accesses the first wireless local area network by using the device MAC address. The terminal sends the second message to the first access point. This improves user controllability, and the user may independently select, according to a requirement and preference, a device address used to identify the terminal.

According to the second aspect or any implementation of the second aspect, the user enables a wireless local area network function by using a control, and the terminal starts to perform active scanning, and displays, on an interface, a control that is of an SSID of an available wireless local area network and that is obtained through scanning. The interface includes a control of an SSID of the first wireless local area network and an identifier indicating signal strength of the first wireless local area network. Before the terminal sends the second message to the first access point if the terminal determines that the terminal cannot access the first wireless local area network the terminal displays a first interface. The first interface includes a reminder message, and the reminder message is used to remind the user to select to access the first wireless local area network by using device MAC. After the first interface disappears, the terminal displays a second interface. The second interface displays a control that is of an SSID of an available wireless local area network and that is obtained through scanning, and the second interface includes the control of the SSID of the first wireless local area network and the identifier indicating the signal strength of the first wireless local area network. The terminal detects a first operation performed by the user on the control of the SSID of the first wireless local area network, and the terminal displays a third interface in response to the first operation. The third interface includes a network details interface of the first wireless local area network. The interface includes an IP setting control, a control indicating whether to use a proxy, or/and a privacy control. The privacy control includes a control using virtual MAC and a control using device MAC, and the control using virtual MAC is in a selected state. The user taps the control using device MAC, and the terminal displays a fourth interface in response to the foregoing tap operation. The fourth interface also includes the IP setting control, the control indicating whether to use a proxy, or/and the privacy control. A difference between the fourth interface and the third interface is that the control using device MAC is in a selected state. The terminal switches back to display the second interface after the user taps a control "Save", or the terminal automatically switches back to display the second interface. The terminal leaves the first wireless local area network, and sends a message that carries the device MAC address to the first access point to request to access the first wireless local area network.

According to the second aspect or any implementation of the second aspect, before the terminal sends the first message to the first access point if the terminal determines that the type of the first wireless local area network is the type II, the method further includes: The terminal determines that a correspondence between the identification information of the first wireless local area network and a virtual MAC address is not stored. In this way, if the terminal does not store the correspondence between the identification information of the first wireless local area network and the virtual MAC address, the terminal needs to perform determining only when the terminal accesses the first wireless local area network. This reduces a time of accessing a wireless local area network by the user, and helps the user access the wireless local area network.

According to the second aspect or any implementation of the second aspect, after the terminal accesses the first wireless local area network, the method further includes: The terminal displays a fifth interface. The fifth interface includes the control of the identification information of the first wireless local area network, an identifier indicating that the first wireless local area network is in a connected state, and the identifier indicating the signal strength of the first wireless local area network. The terminal detects a second operation performed by the user on the control of the identification information of the first wireless local area network. The terminal displays a fourth interface in response to the second operation. The fourth interface includes the control using virtual MAC and the control using device MAC, the control using device MAC is in a selected state, and that the control using device MAC is in a selected state indicates that the terminal accesses the first wireless local area network by using the device MAC address. The terminal detects a second selection operation performed by the user on the control using virtual MAC. The terminal displays a third interface in response to the second selection operation. The third interface includes the control using virtual MAC and the control using device MAC, the control using virtual MAC is in a selected state, and that the control using virtual MAC is in a selected state indicates that the terminal accesses the first wireless local area network by using a virtual MAC address. The terminal leaves the first wireless local area network. The terminal sends the first message to the first access point. The first message is used to request to access the first wireless local area network, and the first message carries the first virtual MAC address. In this way, after the terminal accesses the first wireless local area network, the user may change, according to a requirement or preference, a device address that is used to identify the terminal and that is used to access the first wireless local area network, so that the terminal automatically accesses the first wireless local area network by using a device address obtained after changing by the user.

According to the second aspect or any implementation of the second aspect, the user enables a wireless local area network function by using a control, and the terminal starts to perform active scanning, and displays, on an interface, a control that is of an SSID of an available wireless local area network and that is obtained through scanning. The interface includes a control of an SSID of the first wireless local area network and an identifier indicating signal strength of the first wireless local area network. After the terminal accesses the first wireless local area network, the method further includes: The terminal displays a fifth interface. The fifth interface displays not only the control of the SSID of the first wireless local area network and the identifier indicating the signal strength of the first wireless local area network, but also an identifier indicating that the first wireless local area network is in a connected state. The user taps the control of the SSID of the first wireless local area network to enter a fourth interface, that is, a network details interface of the first wireless local area network. The interface includes an IP setting control, a control indicating whether to use a proxy, or/and a privacy control. The privacy control includes a control using virtual MAC and a control using device MAC, and the control using device MAC is in a selected state. The user taps the control using virtual MAC, and the terminal displays a third interface in response to the foregoing tap operation. The third interface also includes the IP setting control, the control indicating whether to use a proxy, or/and the privacy control. A difference between the third interface and the fourth interface is that the control using virtual MAC is in a selected state. The terminal switches back to display the fifth interface after the user taps a control "Save", or the terminal automatically switches back to display the fifth interface. The terminal leaves the first wireless local area network, and sends a message that carries the device MAC address to the first access point to request to access the first wireless local area network.

According to the second aspect or any implementation of the second aspect, after the terminal accesses the first wireless local area network, the method further includes: The terminal displays a sixth interface. The sixth interface includes the control of the identification information of the first wireless local area network, the identifier indicating that the first wireless local area network is in a connected state, the identifier indicating the signal strength of the first wireless local area network, and a control of identification information of a second wireless local area network, and the second wireless local area network is provided by a second access point. The terminal detects a third operation performed by the user on the control of the identification information of the second wireless local area network. The terminal displays a seventh interface in response to the third operation. The seventh interface includes the control using virtual MAC and the control using device MAC, the control using virtual MAC is in a selected state, and that the control using virtual MAC is in a selected state indicates that the terminal accesses the second wireless local area network by using a virtual MAC address. The terminal detects a third selection operation performed by the user on the control using device MAC. The terminal displays an eighth interface in response to the third selection operation. The eighth interface includes the control using virtual MAC and the control using device MAC, the control using device MAC is in a selected state, and that the control using device MAC is in a selected state indicates that the terminal accesses the second wireless local area network by using the device MAC address. The terminal detects a fourth operation performed by the user on the control of the identification information of the second wireless local area network. The terminal leaves the first wireless local area network in response to the fourth operation. The terminal sends a third message to the second access point. The third message is used to request to access the second wireless local area network, and the third message carries the device MAC address of the terminal. In this way, after the terminal accesses the first wireless local area network, the user may change, according to a requirement or preference, a device address that is used to identify the terminal and that is not used to access the second wireless local area network. Because the terminal is accessing the first wireless local area network, user triggering is required to enable the terminal to start to access the second wireless local area network by using a specified device address. This improves user controllability.

According to the second aspect or any implementation of the second aspect, the user enables a wireless local area network function by using a control, and the terminal starts to perform active scanning, and displays, on an interface, a control that is of an SSID of an available wireless local area network and that is obtained through scanning. The interface includes a control of an SSID of the first wireless local area network, a control of an SSID of a second wireless local area network, and an identifier indicating signal strength of the first wireless local area network. After the terminal accesses the first wireless local area network, the method further includes: The terminal displays a sixth interface. The sixth interface displays not only the control of the SSID of the first wireless local area network, the control of the SSID of the second wireless local area network, and the identifier indicating the signal strength of the first wireless local area network, but also an identifier indicating that the first wireless local area network is in a connected state. The user taps the control of the SSID of the second wireless local area network to enter a seventh interface, that is, a network details interface of the second wireless local area network. The seventh interface includes an IP setting control, a control indicating whether to use a proxy, or/and a privacy control. The privacy control includes a control using virtual MAC and a control using device MAC, and the control using virtual MAC is in a selected state. The user taps the control using device MAC, and the terminal displays an eighth interface in response to the foregoing tap operation. The eighth interface also includes the IP setting control, the control indicating whether to use a proxy, or/and the privacy control. A difference between the eighth interface and the seventh interface is that the control using device MAC is in a selected state. The terminal switches back to display the sixth interface after the user taps a control "Save", or the terminal automatically switches back to display the sixth interface. On the sixth interface, the user taps the control of the SSID of the second wireless local area network, and the terminal leaves the first wireless local area network in response to the foregoing tap operation. The terminal sends a message that carries the device MAC address to a second access point to request to access the second wireless local area network.

According to the second aspect or any implementation of the second aspect, after the terminal accesses the first wireless local area network, the method further includes: The terminal displays a ninth interface. The ninth interface includes a control of the identification information of the first wireless local area network, a control of identification information of a third wireless local area network, an identifier indicating that the first wireless local area network is in a connected state, and an identifier indicating signal strength of the first wireless local area network. The terminal detects a fifth operation performed by a user on the control of the identification information of the third wireless local area network. The terminal leaves the first wireless local area network in response to the fifth operation. The terminal sends a fourth message to a third access point if the terminal determines that a type of the third wireless local area network is the type II. The fourth message is used to request to access the third wireless local area network, the fourth message carries a second virtual MAC address, the second virtual MAC address is used to identify the terminal, the second virtual MAC address is different from the first virtual MAC address and the device MAC address of the terminal, and the third wireless local area network is different from the first wireless local area network. The terminal sends a fifth message to the third access point if the terminal determines that the terminal cannot access the third wireless local area network. The fifth message is used to request to access the third wireless local area network, and the fifth message carries the device MAC address of the terminal. For different wireless local area networks, there are different virtual MAC addresses of the terminal. In this case, even if the third party can track a virtual MAC address of the terminal through a wireless local area network, the third party may obtain different virtual MAC addresses. Because there is no association relationship between virtual MAC addresses, the third party cannot associate the virtual MAC addresses to obtain a complete activity track of the terminal. This avoids a case in which the third party may obtain the complete activity track of the terminal by tracking the device MAC address of the terminal. It can be learned that the method effectively protects security of location information of the user using the terminal. After the terminal accesses the first wireless local area network, or when the terminal is accessing the first wireless local area network, or before the terminal accesses the first wireless local area network, the terminal receives type information of the third wireless local area network and the identification information of the third wireless local area network that are sent by the third access point.

According to the second aspect or any implementation of the second aspect, before the terminal sends the fourth message to the third access point if the terminal determines that the type of the third wireless local area network is the type II, the method further includes: The terminal determines that a correspondence between the identification information of the third wireless local area network and a virtual MAC address is not stored. In this way, if the terminal does not store the correspondence between the identification information of the third wireless local area network and the virtual MAC address, the terminal needs to perform determining only when the terminal accesses the third wireless local area network. This reduces a time of accessing a wireless local area network by the user, and helps the user access the wireless local area network.

According to the second aspect or any implementation of the second aspect, the terminal sends the first message to the first access point if the terminal determines that the type of the first wireless local area network is a type i. The first message is used to request to access the first wireless local area network, and the first message carries the first virtual MAC address of the terminal. The terminal stores the identification information of the first wireless local area network after the terminal accesses the first wireless local area network. In this way, for different types of wireless local area networks, different types of manners are used to ensure that the device MAC address of the terminal is not obtained by the third party as much as possible.

According to the second aspect or any implementation of the second aspect, the type includes an open (OPEN) network or a WPA3 enhanced open network.

According to the second aspect or any implementation of the second aspect, after the terminal sends the second message to the first access point if the terminal determines that the terminal cannot access the first wireless local area network, the terminal stores the identification information of the first wireless local area network if the terminal determines that the terminal cannot access the first wireless local area network; the terminal leaves the first wireless local area network; the terminal receives again the type information of the first wireless local area network and the identification information of the first wireless local area network that are sent by the first access point; and the terminal does not send the first message. In this way, the terminal still cannot access the first wireless local area network by using the device MAC address. Subsequently, even if the terminal obtains the wireless local area network through scanning, the terminal does not access the wireless local area network. This avoids a security problem of forging an access point.

According to the second aspect or any implementation of the second aspect, the terminal receives the type information of the first wireless local area network and the identification information of the first wireless local area network that are sent by the first access point. The first wireless local area network is provided by the first access point. The terminal receives the type information of the third wireless local area network and the identification information of the third wireless local area network that are sent by the third access point. The third wireless local area network is provided by the third access point. After the terminal sends the fourth message to the first access point, the terminal determines that the terminal cannot access the first wireless local area network. The terminal determines the type of the third wireless local area network based on the type information of the third wireless local area network. The terminal sends the fourth message to the third access point if the terminal determines that the type of the third wireless local area network is the type II. The fourth message is used to request to access the third wireless local area network, the fourth message carries the second virtual MAC address, the second virtual MAC address is used to identify the terminal, and the second virtual MAC address is different from the device MAC address of the terminal. For different wireless local area networks, there are different virtual MAC addresses of the terminal. In this case, even if the third party can track a virtual MAC address of the terminal through a wireless local area network, the third party may obtain different virtual MAC addresses. Because there is no association relationship between virtual MAC addresses, the third party cannot associate the virtual MAC addresses to obtain a complete activity track of the terminal. This avoids a case in which the third party may obtain the complete activity track of the terminal by tracking the device MAC address of the terminal. It can be learned that the method effectively protects security of location information of the user using the terminal.

According to the second aspect or any implementation of the second aspect, before the terminal sends the first message to the first access point if the terminal determines that the type of the first wireless local area network is the type II, the method further includes: The terminal displays a sixth interface. The sixth interface includes a control of the identification information of the first wireless local area network and an identifier indicating signal strength of the first wireless local area network. The terminal detects a fourth operation performed by the user on the control of the identification information of the first wireless local area network. The terminal sends the first message to the first access point if the terminal determines that the type of the first wireless local area network is the type II. In this way, the user selects the first wireless local area network, then the terminal accesses the first wireless local area network, and the user may make a selection according to a requirement of the user and a current case. This improves user controllability.

According to the second aspect or any implementation of the second aspect, the identification information of each of the first, second, and third wireless local area networks includes a service set identifier service set identifier, SSID) or/and a basic service set identifier (basic service set identifier. BSSID).

According to the second aspect or any implementation of the second aspect, the first message, the second message, the third message, and the fourth message each include a probe request frame, an authentication request frame, or an association request frame. In this way, the terminal uses a virtual MAC address not only in a scanning phase, but also in a link authentication phase, an association phase, and an access authentication phase.

According to the second aspect or any implementation of the second aspect, the first operation, the second operation, the third operation, the fourth operation, the first selection operation, and the second selection operation include a tap operation, a touch operation, a double-tap operation, or a slide operation. In this way, the user may make a selection according to a requirement and preference. This improves user controllability.

In addition, for any implementation of the second aspect and technical effects brought by the implementations of the second aspect, refer to any implementation of the first aspect and technical effects brought by the implementations of the first aspect. Details are not described herein again.

According to a third aspect, this application provides a method for accessing a wireless local area network. The method includes: A terminal receives type information of a first wireless local area network and identification information of the first wireless local area network that are sent by a first access point. The first wireless local area network is provided by the first access point. The terminal determines a type of the first wireless local area network based on the type information of the first wireless local area network. The terminal sends a first message to the first access point if the terminal determines that the type of the first wireless local area network is a type III. The first message is used to request to access the first wireless local area network, and the first message carries a device MAC address of the terminal. The terminal stores the identification information of the first wireless local area network after the terminal accesses the first wireless local area network. In this way, when the terminal accesses a wireless local area network with relatively high security, the device MAC address of the terminal is directly used to identify the terminal. This avoids a case in which the terminal cannot access a wireless local area network because a whitelist is set, and reduces a user time.

In a possible implementation of the third aspect, after the terminal accesses the first wireless local area network, the method further includes: The terminal stores a correspondence between the identification information of the first wireless local area network and the device MAC address; the terminal leaves the first wireless local area network; the terminal receives again the type information of the first wireless local area network and the identification information of the first wireless local area network that are sent by the first access point; and the terminal sends the first message to the first access point based on the correspondence between the identification information of the first wireless local area network and the device MAC address. In this way, when the terminal accesses a wireless local area network again by using a same device address used to identify the terminal, the terminal does not need to perform determining again based on a type of the wireless local area network, but selects a to-be-used device address based on a stored record.

According to the third aspect or any implementation of the third aspect, before the terminal accesses the first wireless local area network, the method further includes: The terminal sends a second message to a second access point if the terminal determines that the terminal cannot access the first wireless local area network. The second message is used to request to access a second wireless local area network, and the second wireless local area network is provided by the second access point. In this way, after determining that the first wireless local area network cannot be accessed, the terminal switches to access the second wireless local area network. This reduces a time of accessing a wireless local area network by the user, and helps the user access the wireless local area network.

According to the third aspect or any implementation of the third aspect, before the terminal accesses the first wireless local area network, the method further includes: The terminal stores the identification information of the first wireless local area network if the terminal determines that the terminal cannot access the first wireless local area network; the terminal receives again the type information of the first wireless local area network and the identification information of the first wireless local area network that are sent by the first access point; and the terminal does not send the first message. In this way, the terminal still cannot access the first wireless local area network by using the device MAC address. Subsequently, even if the terminal obtains the wireless local area network through scanning, the terminal does not access the wireless local area network. This avoids a security problem of forging an access point.

According to the third aspect or any implementation of the third aspect, before the terminal sends the first message to the first access point if the terminal determines that the type of the first wireless local area network is the type III, the method further includes: The terminal determines that the correspondence between the identification information of the first wireless local area network and the device MAC address is not stored. In this way, if the terminal does not store the correspondence between the identification information of the first wireless local area network and the device MAC address, the terminal needs to perform determining only when the terminal accesses the first wireless local area network. This reduces a time of accessing a wireless local area network by the user, and helps the user access the wireless local area network.

According to the third aspect or any implementation of the third aspect, the type III includes a WPA-802.1x enterprise encryption network or a WPA3-Enterprise encryption network.

According to the third aspect or any implementation of the third aspect, after the terminal accesses the first wireless local area network, the method further includes: The terminal displays a first interface. The first interface includes a control of the identification information of the first wireless local area network, an identifier indicating that the first wireless local area network is in a connected state, and an identifier indicating signal strength of the first wireless local area network. The terminal detects a first operation performed by a user on the control of the identification information of the first wireless local area network. The terminal displays a second interface in response to the first operation. The second interface includes a control using virtual MAC and a control using device MAC, the control using device MAC is in a selected state, and that the control using device MAC is in a selected state indicates that the terminal accesses the first wireless local area network by using the device MAC address. The terminal detects a first selection operation performed by the user on the control using virtual MAC. The terminal displays a third interface in response to the first selection operation. The third interface includes the control using virtual MAC and the control using device MAC, the control using virtual MAC is in a selected state, and that the control using virtual MAC is in a selected state indicates that the terminal accesses the first wireless local area network by using a virtual MAC address. The terminal leaves the first wireless local area network. The terminal sends a second message to the first access point. The second message is used to request to access the first wireless local area network, and the second message carries a first virtual MAC address. In this way, after the terminal accesses the first wireless local area network, the user may change, according to a requirement or preference, a device address that is used to identify the terminal and that is used to access the first wireless local area network, so that the terminal automatically accesses the first wireless local area network by using a device address obtained after changing by the user.

According to the third aspect or any implementation of the third aspect, after the terminal accesses the first wireless local area network, the method further includes: The terminal displays a fourth interface. The fourth interface includes a control of the identification information of the first wireless local area network, an identifier indicating that the first wireless local area network is in a connected state, an identifier indicating signal strength of the first wireless local area network, and a control of identification information of a third wireless local area network, and the third wireless local area network is provided by a third access point. The terminal detects a second operation performed by a user on the control of the identification information of the third wireless local area network. The terminal displays a fifth interface in response to the second operation. The fifth interface includes a control using virtual MAC and a control using device MAC, the control using virtual MAC is in a selected state, and that the control using virtual MAC is in a selected state indicates that the terminal accesses the third wireless local area network by using a virtual MAC address. The terminal detects a second selection operation performed by the user on the control using device MAC. The terminal displays a sixth interface in response to the second selection operation. The sixth interface includes the control using virtual MAC and the control using device MAC, the control using device MAC is in a selected state, and that the control using device MAC is in a selected state indicates that the terminal accesses the third wireless local area network by using the device MAC address. The terminal detects a third operation performed by the user on the control of the identification information of the third wireless local area network. The terminal leaves the first wireless local area network in response to the third operation. The terminal sends a third message to the third access point. The third message is used to request to access the third wireless local area network, and the third message carries the device MAC address of the terminal. In this way, after the terminal accesses the first wireless local area network, the user may change, according to a requirement or preference, a device address that is used to identify the terminal and that is not used to access the second wireless local area network. Because the terminal is accessing the first wireless local area network, user triggering is required to enable the terminal to start to access the second wireless local area network by using a specified device address. This improves user controllability.

According to the third aspect or any implementation of the third aspect, the terminal sends a second message to the first access point if the terminal determines that the type of the first wireless local area network is a type I. The second message is used to request to access the first wireless local area network, the second message carries a first virtual MAC address, the first virtual MAC address is used to identify the terminal, and the first virtual MAC address is different from the device MAC address of the terminal. The terminal stores the identification information of the first wireless local area network after the terminal accesses the first wireless local area network. In this way, for different types of wireless local area networks, different types of manners are used to ensure security of location information of the user. For different wireless local area network types, different device addresses used to identify the terminal are used. Even if a third party can track movement tracks of a virtual MAC address and a device MAC address of the terminal through a wireless local area network, the virtual MAC address and the device MAC address cannot be associated. This avoids a case in which the third party may obtain a complete activity track of the terminal by tracking the device MAC address of the terminal. It can be learned that the method effectively protects security of location information of the user using the terminal.

According to the third aspect or any implementation of the third aspect, the type I includes an open (OPEN) network, a WPA3 enhanced open network, a shared-key WEP network, a WPA network, a WPA2-PSK network, a WPA3-PSK only personal encryption network, or a WPA2/WPA3-PSK compatible personal encryption network.

According to the third aspect or any implementation of the third aspect, the virtual MAC address includes a random MAC address, a function MAC address, or the like. The random MAC address is generated by a processor, and a format of the random MAC address is XX-XX-XX-XX-XX-XX. A first byte is X2, X6, XA, or XE, and X ranges from 0 to F. The function MAC address is a MAC address having a specific function rule, for example, 01-02-03-04-05-06 or 01-02-04-08-16-32.

According to the third aspect or any implementation of the third aspect, before the terminal sends the first message to the first access point if the terminal determines that the type of the first wireless local area network is the type III, the method further includes: The terminal displays a seventh interface. The seventh interface includes a control of the identification information of the first wireless local area network and an identifier indicating signal strength of the first wireless local area network. The terminal detects a fourth operation performed by the user on the control of the identification information of the first wireless local area network. The terminal sends the first message to the first access point if the terminal determines that the type of the first wireless local area network is the type 144. In this way, the user selects the first wireless local area network, then the terminal accesses the first wireless local area network, and the user may make a selection according to a requirement of the user and a current case. This improves user controllability.

According to the third aspect or any implementation of the third aspect, the identification information of each of the first, second, and third wireless local area networks includes a service set identifier (service set identifier, SSID) or/and a basic service set identifier (basic service set identifier, BSSID).

According to the third aspect or any implementation of the third aspect, a correspondence between the identification information of the first wireless local area network and the first virtual MAC address may be a mapping relationship between an SSID of the wireless local area network and a random MAC address, or may be a mapping relationship between an SSID of the wireless local area network, a BSSID of the access point, and a random MAC address, or may be a mapping relationship between a BSSID of the access point and a random MAC address.

According to the third aspect or any implementation of the third aspect, the first message, the second message, and the third message each include a probe request frame, an authentication request frame, or an association request frame.

According to the third aspect or any implementation of the third aspect, the first operation, the second operation, the third operation, the fourth operation, the first selection operation, and the second selection operation include a tap operation, a touch operation, a double-tap operation, or a slide operation. In this way, the user may make a selection according to a requirement and preference. This improves user controllability.

According to the third aspect or any implementation of the third aspect, the method further includes: If a quantity of times for which the terminal requests to access the first wireless local area network is greater than or equal to N, the terminal determines that the terminal cannot access the first wireless local area network, where N is an integer. N is an integer such as 3, 4, 5, 6, or 7. Through a plurality of attempts, this avoids a case in which the first wireless local area network cannot be accessed due to an accidental factor such as blocking or a poor signal, and increases a possibility of accessing the first wireless local area network.

In addition, for any implementation of the third aspect and technical effects brought by the implementations of the third aspect, refer to any implementation of the first aspect and technical effects brought by the implementations of the first aspect. Details are not described herein again.

According to a fourth aspect, this application provides a method for accessing a wireless local area network. The method includes: A terminal receives type information of a first wireless local area network and identification information of the first wireless local area network that are sent by a first access point. The first wireless local area network is provided by the first access point. The terminal displays a first interface. The first interface includes a control of the identification information of the first wireless local area network and an identifier indicating signal strength of the first wireless local area network. The terminal detects a first operation performed by a user on the control of the identification information of the first wireless local area network. The terminal displays a second interface in response to the first operation. The second interface includes a control using virtual MAC and a control using device MAC, the control using virtual MAC is in a selected state, and that the control using virtual MAC is in a selected state indicates that the terminal accesses the first wireless local area network by using a first virtual MAC address. The terminal detects a first selection operation performed by the user on the control using device MAC. The terminal displays a third interface in response to the selection operation. The third interface includes the control using virtual MAC and the control using device MAC, the control using device MAC is in a selected state, and that the control using device MAC is in a selected state indicates that the terminal accesses the first wireless local area network by using the device MAC address. The terminal detects a second operation performed by the user on the control of the identification information of the first wireless local area network. The terminal sends a first message to the first access point in response to the second operation. The first message is used to request to access the first wireless local area network, and the first message carries the device MAC address of the terminal. The terminal stores the identification information of the first wireless local area network after the terminal accesses the first wireless local area network. In this way, after a scanning phase, the terminal displays an available wireless local area network on an interface, and the user may make a selection, set a selected wireless local area network, and select a device address used to identify the terminal. This improves user controllability, and the user may make a selection according to a specific requirement, a specific case, and a sequence number.

In a possible implementation of the fourth aspect, before the terminal receives the type information of the first wireless local area network and the identification information of the first wireless local area network that are sent by the first access point, the method further includes: The terminal displays a fourth interface. The fourth interface includes a WLAN on/off control and a virtual MAC address on/off control, and the WLAN on/off control and the virtual MAC address on/off control each are in an off state. The terminal detects a first turn-on operation performed by the user on the virtual MAC address on/off control. The terminal turns on the virtual MAC address on/off control in response to the first turn-on operation. The terminal detects a second turn-on operation performed by the user on the WLAN on/off control. The terminal turns on the WLAN on/off control in response to the second turn-on operation. The terminal adds a virtual MAC address to a message that is sent by the terminal to each access point and that is used to request to access a wireless local area network. The virtual MAC address is used to identify the terminal. In this way, when the WLAN on/off control is turned off, unified setting is performed, and after the WLAN on/off control is turned on, the terminal accesses a wireless local area network in a unified user setting manner by using a specified device address used to identify the terminal.

According to the fourth aspect or any implementation of the fourth aspect, before the terminal receives the type information of the first wireless local area network and the identification information of the first wireless local area network that are sent by the first access point, the method further includes: The terminal displays a fourth interface. The fourth interface includes a WLAN on/off control and a virtual MAC address on/off control, and the WLAN on/off control and the virtual MAC address on/off control each are in an off stale. The terminal detects a second turn-on operation performed by the user on the SWAN on/off control. The terminal turns on the WLAN on/off control in response to the second turn-on operation. The terminal sends a message used to request to access a wireless local area network. The message used to request to access a wireless local area network carries the device MAC address. The terminal detects a first turn-on operation performed by the user on the virtual MAC address on/off control. The terminal turns on the virtual MAC address on/of control in response to the first turn-on operation. The terminal sends again the message used to request to access a wireless local area network. The message used to request to access a wireless local area network carries a virtual MAC address, and the virtual MAC address is used to identify the terminal. In this way, the user performs unified setting in a scanning phase of the terminal but before connection, and after the user setting, a specified device address used to identify the terminal is used to access a wireless local area network.

According to the fourth aspect or any implementation of the fourth aspect, after the terminal accesses the first wireless local area network, the method further includes: The terminal displays a fifth interface. The fifth interface includes the control of the identification information of the first wireless local area network, the identifier indicating the signal strength of the first wireless local area network, and an identifier indicating that the first wireless local area network is in a connected state. The terminal detects a third operation performed by the user on the control of the identification information of the first wireless local area network. The terminal displays the third interface in response to the third operation. The third interface includes the control using virtual MAC and the control using device MAC, and the control using device MAC is in a selected state. The terminal detects a second selection operation performed by the user on the control using virtual MAC. The terminal displays the second interface in response to the second selection operation. The second interface includes the control using virtual MAC and the control using device MAC, and the control using virtual MAC is in a selected state. The terminal leaves the first wireless local area network. The terminal sends a second message to the first access point. The second message is used to request to access the first wireless local area network, and the second message carries the first virtual MAC address of the terminal. In this way, after the terminal accesses the first wireless local area network, the user may change, according to a requirement or preference, a device address that is used to identify the terminal and that is used to access the first wireless local area network, so that the terminal automatically accesses the first wireless local area network by using a device MAC address obtained after changing by the user.

According to the fourth aspect or any implementation of the fourth aspect, after the terminal accesses the first wireless local area network, the method further includes: The terminal displays a sixth interface. The sixth interface includes the control of the identification information of the first wireless local area network, the identifier indicating the signal strength of the first wireless local area network, an identifier indicating that the first wireless local area network is in a connected state, and a control of identification information of a second wireless local area network, and the second wireless local area network is provided by a second access point. The terminal detects a fourth operation performed by the user on the control of the identification information of the second wireless local area network. The terminal displays a seventh interface in response to the fourth operation. The seventh interface includes the control using virtual MAC and the control using device MAC, the control using virtual MAC is in a selected state, and that the control using virtual MAC is in a selected state indicates that the terminal accesses the second wireless local area network by using a second virtual MAC address. The terminal detects a third selection operation performed by the user on the control using device MAC. The terminal displays an eighth interface in response to the third selection operation. The eighth interface includes the control using virtual MAC and the control using device MAC, the control using device MAC is in a selected state, and that the control using device MAC is in a selected state indicates that the terminal accesses the second wireless local area network by using the device MAC address. The terminal detects a fifth operation performed by the user on the identification information of the second wireless local area network. The terminal leaves the first wireless local area network in response to the fifth operation. The terminal sends a third message to the second access point. The third message is used to request to access the second wireless local area network, and the third message carries the device MAC address of the terminal. In this way, after the terminal accesses the first wireless local area network, the user may change, according to a requirement or preference, a device address that is used to identify the terminal and that is not used to access the second wireless local area network. Because the terminal is accessing the first wireless local area network, user triggering is required to enable the terminal to start to access the second wireless local area network by using a specified device MAC address. This improves user controllability.

According to the fourth aspect or any implementation of the fourth aspect, the virtual MAC address includes a random MAC address, a function MAC address, or the like. The random MAC address is generated by a processor, and a format of the random MAC address is XX-XX-XX-XX-XX-XX. A first byte is X2, X6, XA, or XE, and X ranges from 0 to F. The function MAC address is a MAC address having a specific function rule, for example, 01-02-03-04-05-06 or 01-02-04-08-16-32.

In addition, for any implementation of the fourth aspect and technical effects brought by the implementations of the fourth aspect, refer to any implementation of the first aspect and technical effects brought by the implementations of the first aspect. Details are not described herein again.

According to a fifth aspect, this application provides a terminal, including one or more touchscreens, one or more memories, and one or more processors. The one or more memories store one or more programs, and when the one or more processors execute the one or more programs, the terminal is enabled to implement the method according to any one of the implementations of the first aspect to the fourth aspect. According to the foregoing, terminal, the foregoing functions may be implemented.

According to a sixth aspect, this application provides a graphical user interface (GUI). The graphical user interface is stored in a terminal, the terminal includes a touchscreen, a memory, and one or more processors, the one or more processors are configured to execute one or more computer programs stored in the memory, and the graphical user interface includes: a first GUI displayed on the touchscreen, where the first GUI includes a control of identification information of a first wireless local area network and an identifier indicating signal strength of the first wireless local area network; a second GUI displayed on the touchscreen in response to a first touch event for the control of the identification information of the first wireless local area network, where the second GUI includes a control using virtual MAC and a control using device MAC, the control using virtual MAC is in a selected state, and that the control using virtual MAC is in a selected state indicates that the terminal accesses the first wireless local area network by using a virtual MAC address; a third GUI displayed on the touchscreen in response to a second touch event for the control using device MAC, where the third GUI includes the control using virtual MAC and the control using device MAC, the control using device MAC is in a selected state, and that the control using device MAC is in a selected state indicates that the terminal accesses the first wireless local area network by using the device MAC address; and a fourth GUI displayed on the touchscreen in response to a third touch event for the control of the identification information of the first wireless local area network, where the fourth GUI includes an identifier indicating that the first wireless local area network is in a connected state. According to the foregoing graphical user interface, a user may implement a control function and a function used to identify a device address of the terminal. This improves a capability of intelligent interaction between the terminal and the user.

In a possible implementation of the sixth aspect, the virtual MAC address includes a random MAC address, a function MAC address, or the like. The random MAC address is generated by a processor, and a format of the random MAC address is XX-XX-XX-XX-XX-XX. A first byte is X2, X6, XA, or XE, and X ranges from 0 to F. The function MAC address is a MAC address having a specific function rule, for example, 01-02-03-04-05-06 or 01-02-04-08-16-32.

In addition, for any implementation of the sixth aspect and technical effects brought by the implementations of the sixth aspect, refer to any implementation of the first aspect and technical effects brought by the implementations of the first aspect. Details are not described herein again.

According to a seventh aspect, this application provides a computer-readable storage medium, including instructions. When the instructions are run on an electronic device, the electronic device is enabled to perform the method according to any one of the implementations of the first aspect to the fourth aspect. According to the foregoing computer-readable storage medium, the foregoing functions may be implemented.

According to the foregoing methods, a virtual MAC address is used to replace a device MAC address to identify a terminal device, and the virtual MAC address is different from the device MAC address. This resolves a technical problem that the device MAC address of the terminal can be tracked through a local area network.

BRIEF DESCRIPTION OF DRAWINGS

FIG. 14A and FIG. 14B to FIG. 17A and FIG. 17B are schematic diagrams of human-computer interaction according to embodiments of this application.

DESCRIPTION OF EMBODIMENTS

The following describes the embodiments of this application with reference to the accompanying drawings in the embodiments of this application.

Figure 1:
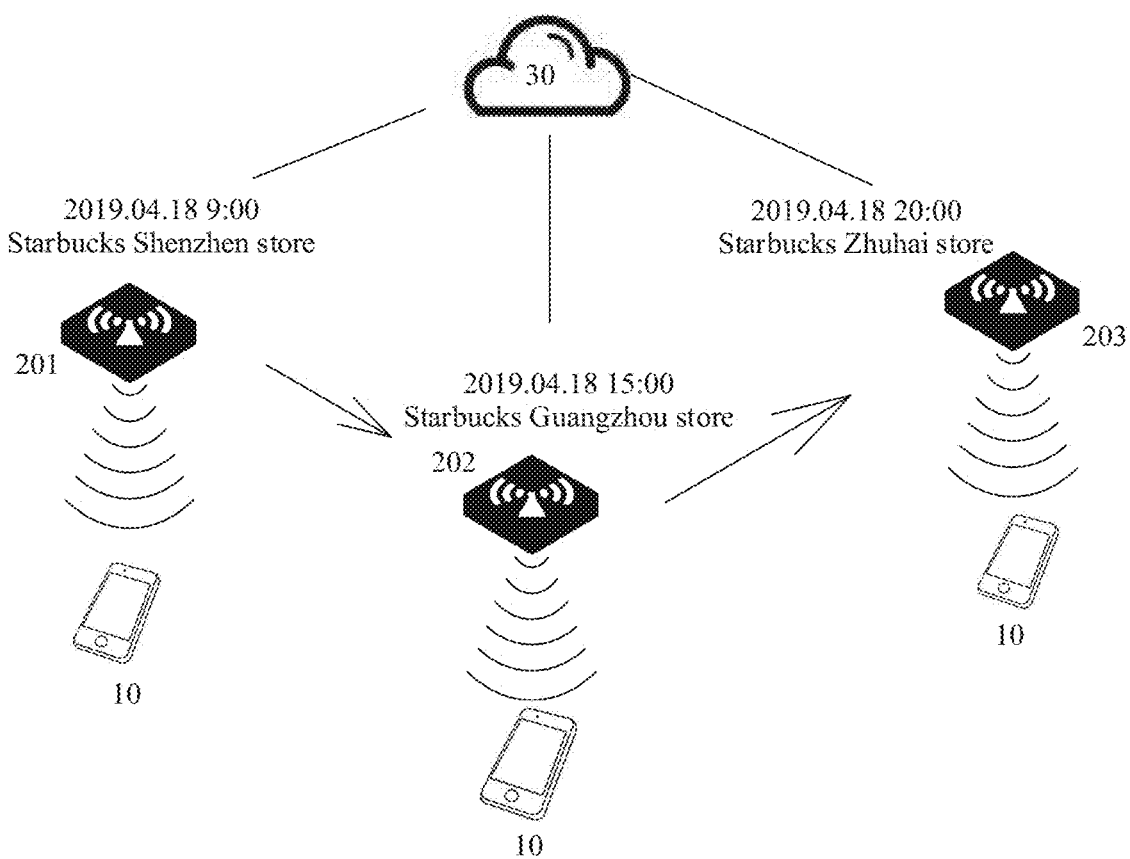
FIG. 1 is a schematic diagram of a use scenario of a terminal according to an embodiment of this application.

The IEEE 802.11 standard defines an access point (access point, AP) and a station (station, STA) in a Wi-Fi network. FIG. 1 is a schematic diagram of a use scenario of a terminal according to an embodiment of this application. As shown in FIG. 1, an example in which a STA is a terminal 10 is used. Tom is on a business trip on Apr. 18, 2019. The user is near a Starbucks Shenzhen store at 9:00 a.m and uses the terminal 10 to connect to Wi-Fi that is named Wi-Fi 201 and that is provided by a service provider A; is near a Starbucks Guangzhou store at 15:00 and uses the terminal 10 again to connect to Wi-Fi that is named Wi-Fi 202 and that is provided by a service provider B; and is near a Starbucks Zhuhai store at 20:00 and uses the terminal 10 again to connect to Wi-Fi that is named 203 and that is provided by a service provider C, to view Twitter. In a process of establishing a connection to these Wi-Fi access points, the terminal 10 usually sends a MAC address of the terminal 10 to the Wi-Fi access points, and a server 30 nay obtain information about an activity track of the terminal 10 by using access points AP 201, AP 202, and AP 203 that are distributed in a plurality of locations. The activity track of the terminal 10 may be considered as an activity track of the user, so as to learn of location information of the user. In another scenario, even if the terminal does not establish a Wi-Fi connection to the AP, because a probe request carries the MAC address of the terminal, a third party may further obtain the MAC address of the terminal by monitoring a probe request frame periodically sent by the terminal, so that the third party can track the user. Consequently, the location information of the user cannot be protected. The location information of the user may alternatively be tracked in another manner. This is not limited herein.

Figure 2:
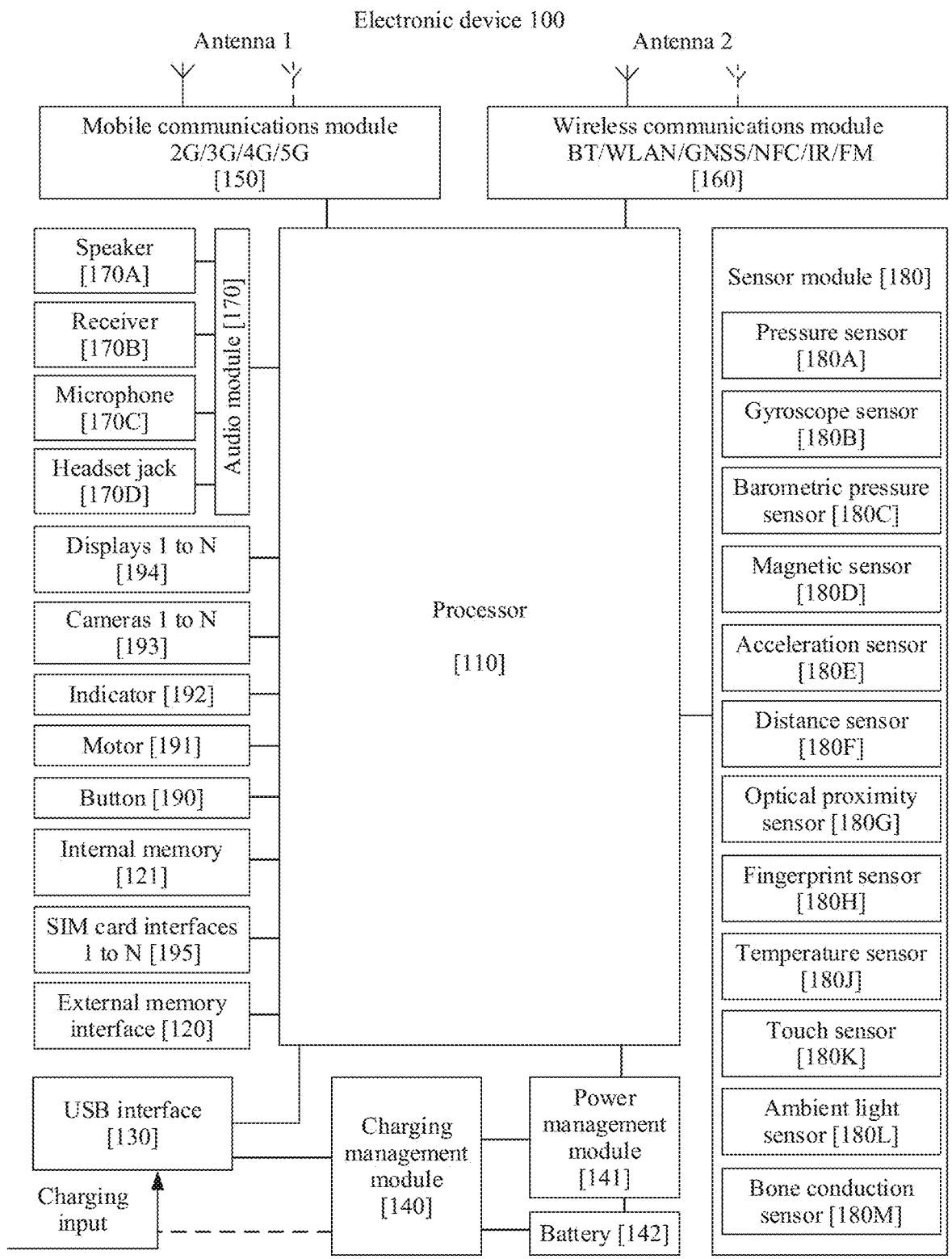
FIG. 2 is a schematic diagram of a structure of a terminal according to an embodiment of this application.

A method provided in the embodiments of this application is applicable to a Wi-Fi network, and may be applied to a terminal 100 shown in FIG. 2. FIG. 2 is a schematic diagram of a structure of the terminal 100.

The terminal 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 1700, a headset jack 170D, a sensor module 180, a button 190, a motor 191, an indicator 192, a camera 193, a display 194, a subscriber identity module (subscriber identity module. SIM) card interface 195, and the like. The sensor module 180 may include a pressure sensor 180A, a gyroscope sensor 180B, a barometric pressure sensor 1800, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 1801, a bone conduction sensor 180M, and the like.

It can be understood that the structure shown in this embodiment of this application does not constitute a specific limitation on the terminal 100. In some other embodiments of this application, the terminal 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor, a modem processor, a graphics processing unit (graphics processing unit, iPU), an image signal processor (image signal processor, ISP), a controller, a video codec, a digital signal processor (digital signal processor, DSP), a baseband processor, and/or a neural network processing unit (neural network processing unit, NPU). Different processing units may be independent devices, or may be integrated into one or more processors.

In some embodiments of this application, the processor generates a virtual MAC address to replace a device MAC address in a Wi-Fi connection process. The virtual MAC address includes a random MAC address, a function MAC address, or the like. The random MAC address is generated by the processor, and a format of the random MAC address is XX-XX-XX-XX-XX-XX. A first byte is X2, X6, XA, or XE, and X ranges from 0 to F. The function MAC address is a MAC address having a specific function rule, for example, 01-02-03-04-05-06 or 01-02-04-08-16-32.

The controller may generate an operation control signal based on an instruction operation code and a time sequence signal, to control instruction fetching and instruction execution.

A memory may be further disposed in the processor 110 to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency. In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronous serial bus, and includes a serial data line (serial data line, SDA) and a serial clock line (serial clock line, SCL). In some embodiments, the processor 110 may include a plurality of I2C buses. The processor 110 may be coupled to the touch sensor 180K, a charger, a flash, the camera 193, and the like separately through different I2C bus interfaces. For example, the processor 110 may be coupled to the touch sensor 180K through the I2C interface, and the processor 110 communicates with the touch sensor 180K through the I2C bus interface, to implement a touch function of the terminal 100.

The I2S interface may be configured to perform audio communication. In some embodiments, the processor 110 may include a plurality of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to perform audio communication, and sample, quantize, and encode an analog signal. In some embodiments, the audio module 170 may be coupled to the wireless communications module 160 through the PCM bus interface. In some embodiments, the audio module 170 may also transmit an audio signal to the wireless communications module 160 through the PCM interface, to implement a function of answering a call by using a Bluetooth headset. Both the I2S interface and the PCM interface may be configured to perform audio communication.

The UART interface is a universal serial data bus used for asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral device such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the terminal 100. The processor 110 communicates with the display 194 through the DSI interface, to implement a display function of the terminal 100.

The GPIO interface may be configured by using software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, and the like. The GPIO interface may be alternatively configured as an I2C interface, an I2S interface, a UART interface, an MN interface, or the like.

The USB interface 130 is an interface that conforms to a USB standard specification, and may be specifically a mini USB interface, a micro USB interface, a USB Type-C interface, or the like. The USB interface 130 may be configured to connect to a charger for charging the terminal 100, may be configured to transmit data between the terminal 100 and a peripheral device, and may also be configured to connect to a headset to play audio through the headset. The interface may be further configured to connect to another terminal such as an AR device.

It can be understood that an interface connection relationship between the modules illustrated in this embodiment of this application is merely an example for description, and does not constitute a limitation on the structure of the terminal 100. In Kale other embodiments of this application, the terminal 100 may alternatively use an interface connection manner that is different from that in the foregoing embodiment, or a combination of a plurality of interface connection manners.

The charging management module 140 is configured to receive a charging input from the charger.

The power management module 141 is configured to connect to the battery 142, the charging management module 140, and the processor 110.

A wireless communication function of the terminal 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the terminal 100 may be configured to cover one or more communication bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communications module 150 can provide a solution, applied to the terminal 100, to wireless communication including 2G, 3G, 4G, 5G, and the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transfer a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules in the mobile communications module 150 may be disposed in the processor 110. In some embodiments, at least some function modules in the mobile communications module 150 and at least some modules in the processor 110 may be disposed in a same device.

The modem processor may include a modulator and a demodulator. The modulator is configured to modulate a to-be-sent low frequency baseband signal into a medium and high frequency signal. The demodulator is configured to demodulate a received electromagnetic wave signal into a low frequency base band signal. Then, the demodulator transmits the low frequency baseband signal obtained through demodulation to the baseband processor for processing. The baseband processor processes the low frequency baseband signal, and then transfers a processed signal to the application processor. The application processor outputs a sound signal through an audio device (which is not limited to the speaker 170A, the receiver 170B, or the like), or displays an image or a video through the display 194. In some embodiments, the modem processor may be an independent device. In some other embodiments, the modem processor may be independent of the processor 110, and is disposed in a same device as the mobile communications module 150 or another function module.

The wireless communications module 160 may provide a solution, applied to the terminal 100, to wireless communication including a wireless local area network (wireless local area network, MILAN) (fair example, a wireless fidelity (Wireless Fidelity, Wi-Fi) network), Bluetooth (Bluetooth. BT), a global navigation satellite system (global navigation satellite system, GLASS), frequency modulation (frequency modulation, FM), a near field communication (near field communication, NFC) technology, an infrared (infrared, IR) technology, or the like. The wireless communications module 160 may be one or more components that integrate at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments of this application, the wireless communications module sends information such as a probe request frame that carries a device MAC address or a random MAC address of the terminal to the AP, and receives information such as a service set identifier (service set identifier, SSID) and a basic service set identifier (basic service set identifier, BSSID) sent by the AP.

In some embodiments, in the terminal 100, the antenna 1 is coupled to the mobile communications module 150, and the antenna 2 is coupled to the wireless communications module 160, so that the terminal 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, (DMA), wideband code division multiple access (wideband code division multiple access, WCDMA), time-division code division multiple access (time-division code division multiple access, TD-SCDMA), long term evolution (long term evolution, LTE), BT, a. GNSS, a WLAN, NFC, FM, an IR technology, and or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The terminal 100 implements the display function through the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode. AMOLED), a flexible light-emitting diode (flexible light-emitting diode FLED), a mini-LED, a micro-LED, a micro-OLED, a quantum dot light emitting diode (quantum dot light emitting diode, QLFD), or the like. In some embodiments, the terminal 100 may include one or N displays 194, where N is a positive integer greater than 1.

The terminal 100 may implement the photographing function through the ISP, the camera 193, the video codec, the GPU, the display 194, the application processor, and the like. The ISP is configured to process data fed back by the camera 193. The camera 193 is configured. to capture a static image or a video. The digital signal processor is configured to process a digital signal, and may further process another digital signal in addition to the digital image signal. The video codec is configured to compress or decompress a digital video. The NPU is a neural network (neural network, NN) computing processor that rapidly processes input information by referring to a structure of a biological neural network.

The external memory interface 120 may be configured to connect to an external memory card, for example, a micro SD card, to extend a storage capability of the terminal 100.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (such as audio data and a phone hook) and the like created when the terminal 100 is used. In addition, the internal memory 121 may include a high-speed random access memory, or may include a nonvolatile memory; for example, at least one magnetic disk storage device, a flash memory, or a universal flash storage (universal flash storage, UFS). The processor 110 runs the instructions stored in the internal memory 121 and/or the instructions stored in the memory disposed in the processor, to perform various function applications of the terminal 100 and data processing.

In some embodiments of this application, the internal memory 121 stores a device MAC address of the terminal. The device MAC address is stored in the internal memory 121 during production by a terminal device manufacturer. The internal memory 121 is further configured to store a virtual MAC address generated by the processor, and the terminal may use different virtual MAC addresses when accessing different APs.

In a scenario in which the terminal accesses a wireless local area network, both the device MAC address and the virtual MAC address may be used to identify the terminal 100. When information that carries a device address of the terminal needs to be sent in a process in which the terminal establishes a connection to the AP and in a process in which the terminal is connected to a wide area network by using the AP, the processor invokes the device MAC address or the virtual MAC address and sends the device MAC address or the virtual MAC address to the AP, so as to identify the terminal.

In some embodiments of this application, the internal memory 121 further stores a correspondence between identification information of a wireless local area network and a virtual MAC address. The correspondence between the identification information of the wireless local area network and the virtual MAC address may be a mapping relationship between an SSID of the wireless local area network and a random MAC address, or may be a mapping relationship between an SSID of the wireless local area network, a BSSID of the access point, and a random MAC address, or may be a mapping relationship between a BSSID of the access point and a random MAC address. The SSID may be further used as the identification information of the wireless local area network.

The terminal 100 may implement audio functions such as music playing and recording through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The speaker 170A, also referred to as a "horn", is configured to convert an audio electrical signal into a sound signal. The terminal 100 may listen to music or answer a call in a hands-free mode over the speaker 170A, The receiver 170B, also referred to as an "earpiece", is configured to convert an audio electrical signal into a sound signal. The microphone 170C, also referred to as a "mike" or a "microphone", is configured to convert a sound signal into an electrical signal. The headset jack 170D is configured to connect to a wired headset.

The pressure sensor 180A is configured to sense a pressure signal, and may convert the pressure signal into an electrical signal. In some embodiments, the pressure sensor 180A may be disposed on the display 194. The gyroscope sensor 180B may be configured to determine a motion posture of the terminal 100. The barometric pressure sensor 180C is configured to measure barometric pressure. The magnetic sensor 180D includes a Hall sensor. The terminal 100 may detect opening and closing of a flip cover through the magnetic sensor 180D. The acceleration sensor 180E may detect magnitudes of accelerations in various directions (usually on three axes) of the terminal 100. The distance sensor 180F is configured to measure a distance. The optical proximity sensor 180G may include, for example, a light-emitting diode (LED) and an optical detector such as a photodiode. The ambient light sensor 180L is configured to sense ambient light brightness.

The fingerprint sensor 180H is configured to collect a fingerprint. The terminal 100 may use a feature of the collected fingerprint to implement fingerprint-based unlocking, application lock access, fingerprint-based photographing, fingerprint-based call answering, and the like.

The temperature sensor 180J is configured to detect a temperature. The touch sensor 180K is also referred to as a "touch device". The touch sensor 180K may be disposed on the display 194, and the touch sensor 180K and the display 194 constitute a touchscreen, which is also referred to as a "touch screen". The touch sensor 180K is configured to detect a touch operation on or near the touch sensor. The touch sensor may transfer the detected touch operation to the application processor, to determine a type of a touch event. The display 194 may provide a visual output related to the touch operation. In some other embodiments, the touch sensor 180K may alternatively be disposed on a surface of the terminal 100 at a location different from that of the display 194.

The bone conduction sensor 180M may obtain a vibration signal.

The button 190 includes a power button, a volume button, and the like. The button 190 may be a mechanical button, or may be a touch button. The terminal 100 may receive a key input, and generate a key signal input related to a user setting and function control of the terminal 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder scenario, an information receiving scenario, an alarm clock scenario, and a game scenario) may also correspond to different vibration feedback effects. The touch vibration feedback effect may also be customized.

The indicator 192 may be an indicator light, may be configured to indicate a charging status and a power change, and may also be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the terminal 100. The terminal 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may also be compatible with different types of SIM cards. The SIM card interface 195 may also be compatible with the external storage card. The terminal 100 interacts with a network by using the SIM card, to implement a call function, a data communication function, and the like. In some embodiments, the terminal 100 uses an eSIM, that is, an embedded SIM card. The eSIM card may be embedded in the terminal 100, and cannot be separated from the terminal 100.

A software system of the terminal 100 may use a layered architecture, an event-driven architecture, a microkernel architecture, a micro service architecture, or a cloud architecture. In an embodiment of this application, an Android system with a layered architecture is used as an example to describe a software structure of the terminal 100.

Figure 3:
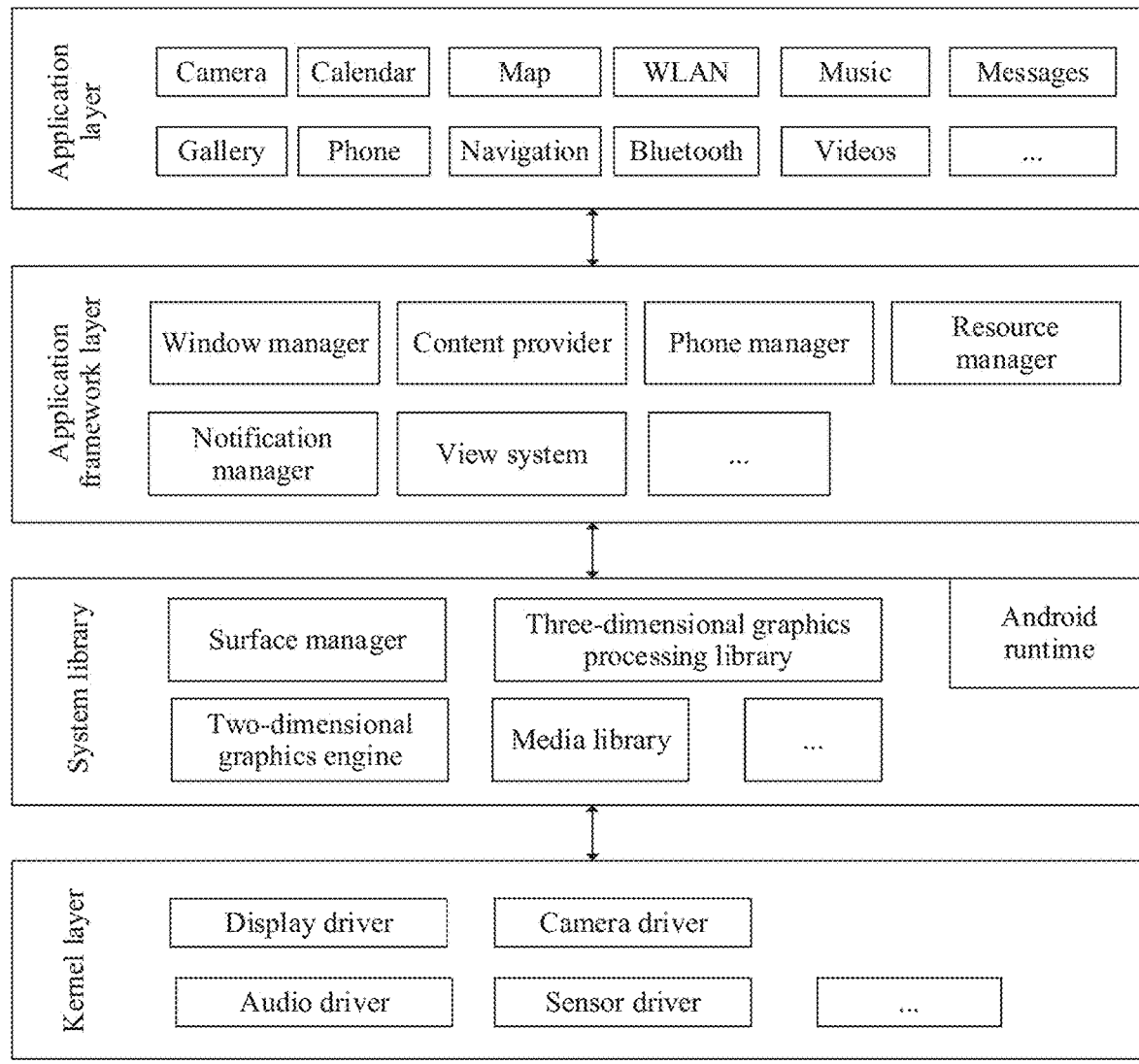
FIG. 3 is a block diagram of a software structure of a terminal according to an embodiment of this application.

FIG. 3 is a block diagram of the software structure of the terminal 100 according to an embodiment of this application.

In the layered architecture, software is divided into several layers, and each layer has a clear role and task. The layers communicate with each other through a software interface. In some embodiments, the Android system is divided into four layers: an application layer, an application framework laver, an Android runtime (Android runtime) and system library, and a kernel layer from top to bottom.

The application layer may include a series of application packages.

As shown in FIG. 3, the application packages may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 3, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and answered, a browsing history and a bookmark, a phone book, and the like.

The view system includes visual controls, such as a control for displaying a text and a control for displaying an image. The view system may be configured to construct an application. A display interface may include one or more views. For example, a display interface including an SMS message notification icon may include a text display view and a picture display view.

The phone manager is configured to provide a communication function of the terminal 100, for example, management of a call status (including answering or declining).

The resource manager provides various resources for an application, such as a localized character string, an icon, a picture, a layout file, and a video file.

The notification manager enables an application to display notification information a status bar, and may be configured to convey a notification type message. The notification manager may automatically disappear after a short pause without user interaction. For example, the notification manager is configured to notify download completion and provide a message notification. The notification manager may alternatively be a notification that appears in a top status bar of the system in a form of a graph or a scroll bar text, for example, a notification of an application running on the background or a notification that appears on the screen in a form of a dialog window. For example, text information is displayed in the status bar, an alert sound is played, the terminal vibrates, or the indicator light blinks.

The Android runtime includes a kernel library and a virtual machine. The Android runtime is responsible for scheduling and management of the Android system.

The kernel library includes two parts: a function that needs to be called in Java language, and a kernel library of Android.

The application layer and the application framework layer run on the virtual machine. The virtual machine executes Java files at the application layer and the application framework layer as binary files. The virtual machine is configured to perform functions such as object life cycle management, stack management, thread management, security and exception management, and garbage collection.

The system library may include a plurality of function modules, for example, a surface manager (surface manager), a media library (Media Library), a three-dimensional graphics processing library (for example. OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Figure 6:
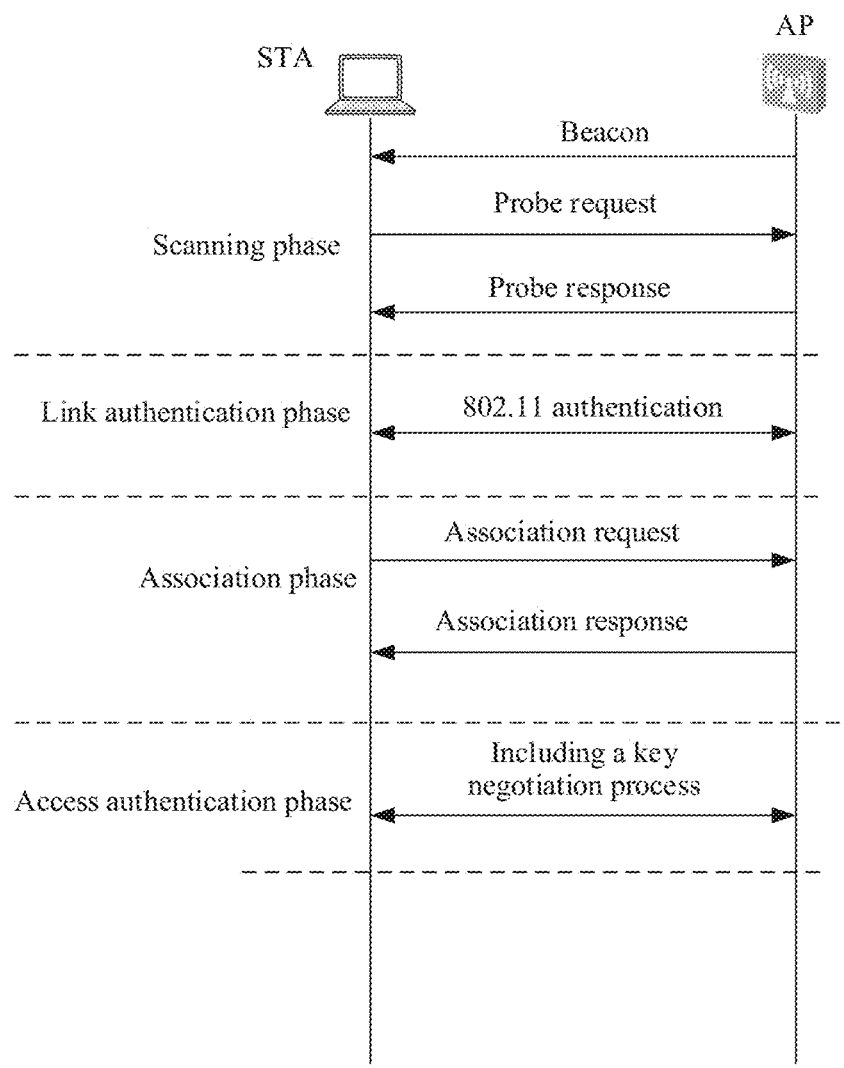
FIG. 6 is a schematic diagram of a method for accessing a wireless local area network according to an embodiment of this application.

FIG. 6 is a schematic flowchart of a method for accessing a wireless local area network according to the conventional technology. According to related content defined in the IEEE 802.11 standards, a STA needs to perform the following three phases to establish a connection to an AP.

1. Scanning (scanning) phase: There are usually two scanning modes: passive scanning and active scanning.

During passive scanning, the STA continuously switches between channels listed in a channel list and waits for a beacon frame sent by the P. The beacon frame carries basic information of the corresponding AP, including parameters such as an SSE) and a BSSID.

During active scanning, on each channel, the STA sends a probe request (probe request) frame to request the AP to respond. When the probe request frame is sent, carried information includes a MAC address of the STA, and the like. After receiving the probe request frame, the AP sends a probe response (probe response) frame to give a reply response. The probe response frame includes information such as the SSID and the BSSID of the AP.

Figure 4:
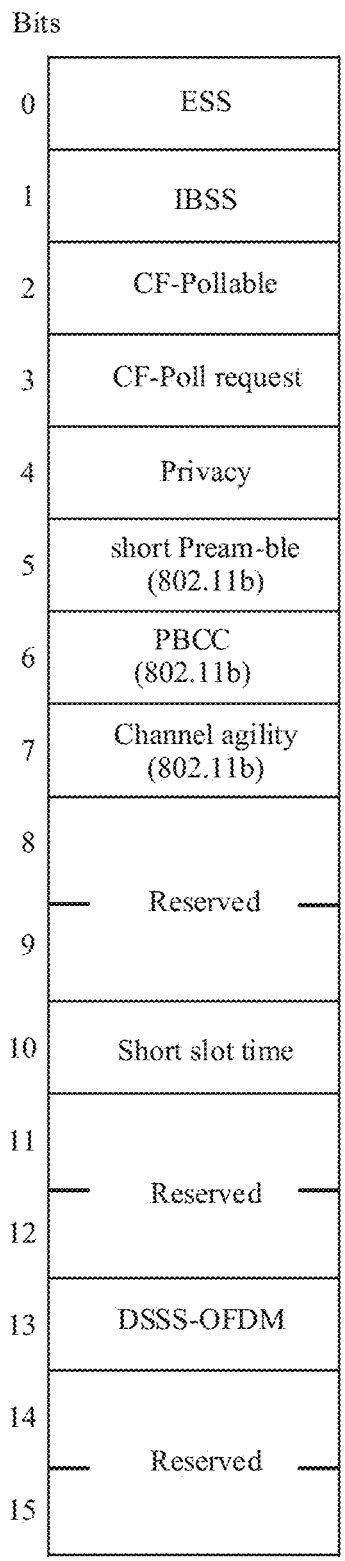
FIG. 4 is a schematic diagram of a capability information (capability information) bit according to an embodiment of this application.

A capability information (capability information) bit is marked in both the beacon frame and the probe response frame. FIG. 4 shows a field of a capability information bit. The capability information bit is 16 bits, and is used to notify performance of a network to which the STA belongs. A privacy field is used to indicate whether a network uses an encryption mode. If a bit value of the privacy field is 0, it indicates that the network is not encrypted; or if a bit value is 1, it indicates that the network is encrypted. For another field, refer to section 8.4.1.4 in IEEE Std 802.11™-2012, Details are not described herein again.

Figure 5:
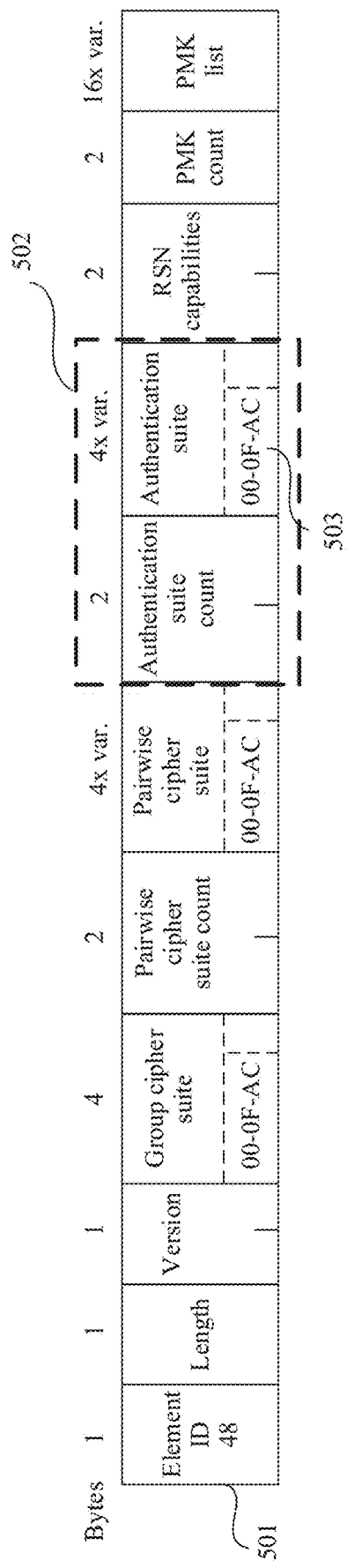
FIG. 5 is a schematic diagram of a robust security network information element according to an embodiment of this application.

To improve network security, two new link layer encryption protocols and key generation and transmission mechanisms are designed in 802.11i. For some network types such as WPA2-PSK and WPA-802.1x networks, a robust security network (robust security network, RSN) information element, that is, an RSN information element, is defined in the beacon/probe response frame, and is used to identify a network security information element. As shown in FIG. 5, entire information 501 in FIG. 5 represents an RSN information element. The RSN information element includes information such as a version (version), a group cipher suite (group cipher suite), a pairwise cipher suite (count+list) (pairwise cipher suite (count+list)), and a link authentication and key management suite (count+list) (authentication and key management (AKM) suite (count+list)). In FIG. 5, 502 indicates an AKM field in the RSN information element, and the AKM includes one OUI (503 in FIG. 5 indicates an OUI field) and a group of type numbers (not shown in the figure) that identify a link authentication type of a subsequent step. An access authentication manner corresponding to a network may be determined based on an OUI field, a type number, and the like in an AKM field of the network.

2. Link authentication (authentication) phase: After selecting the AP, the STA initiates link authentication to the AP.

According to definitions of the IEEE 802.11 standard, the STA needs to perform identity confirmation before association.

In 802.11, the STA sends a first frame to the AP as a link authentication request (authentication request) frame by using the MAC address as an identity. During open system link authentication, the AP processes the link authentication request and then returns a result. WEP needs to be used during shared-key link authentication (shared-key authentication). A theoretical basis is: If the STA can successfully respond to the returned challenge information, it indicates that the STA has a shared key.

3. Association (Association) phase: After the link authentication is completed, the STA may establish a connection to the AP (or establish a connection to a new AP) to obtain full network access.

According to the definitions of the IEEE 802.11 standard, the association is a recording program to establish a mapping relationship between an AP and a STA, and the association process is initiated by the STA. After the STA and the AP complete the link authentication, the STA may send an association request (association request) frame. Then the AP processes the association request, responds to the request, and sends an association response (association response) frame to establish a connection.

On many existing networks, a connection between a STA and an AP can still be established by performing only the foregoing three processes, and then the STA may access a wide area network by using the AP. An example in which the STA is a terminal is used for description.

For example, for an open (OPEN) network, the terminal uses a device MAC address of the terminal for authentication during link authentication. After this type of network is connected, a packet is directly sent without being encrypted during packet transmission. As shown in FIG. 6, in a process of establishing a connection to an AP, the terminal needs to complete the three steps: the scanning phase, the link authentication phase, and the association phase. The terminal may access a wide area network by using the AP, without a human-machine interaction step such as a step of entering a password or downloading a certificate by a user. In this embodiment of this application, the open (OPEN) network belongs to a type I.

Figure 7A:
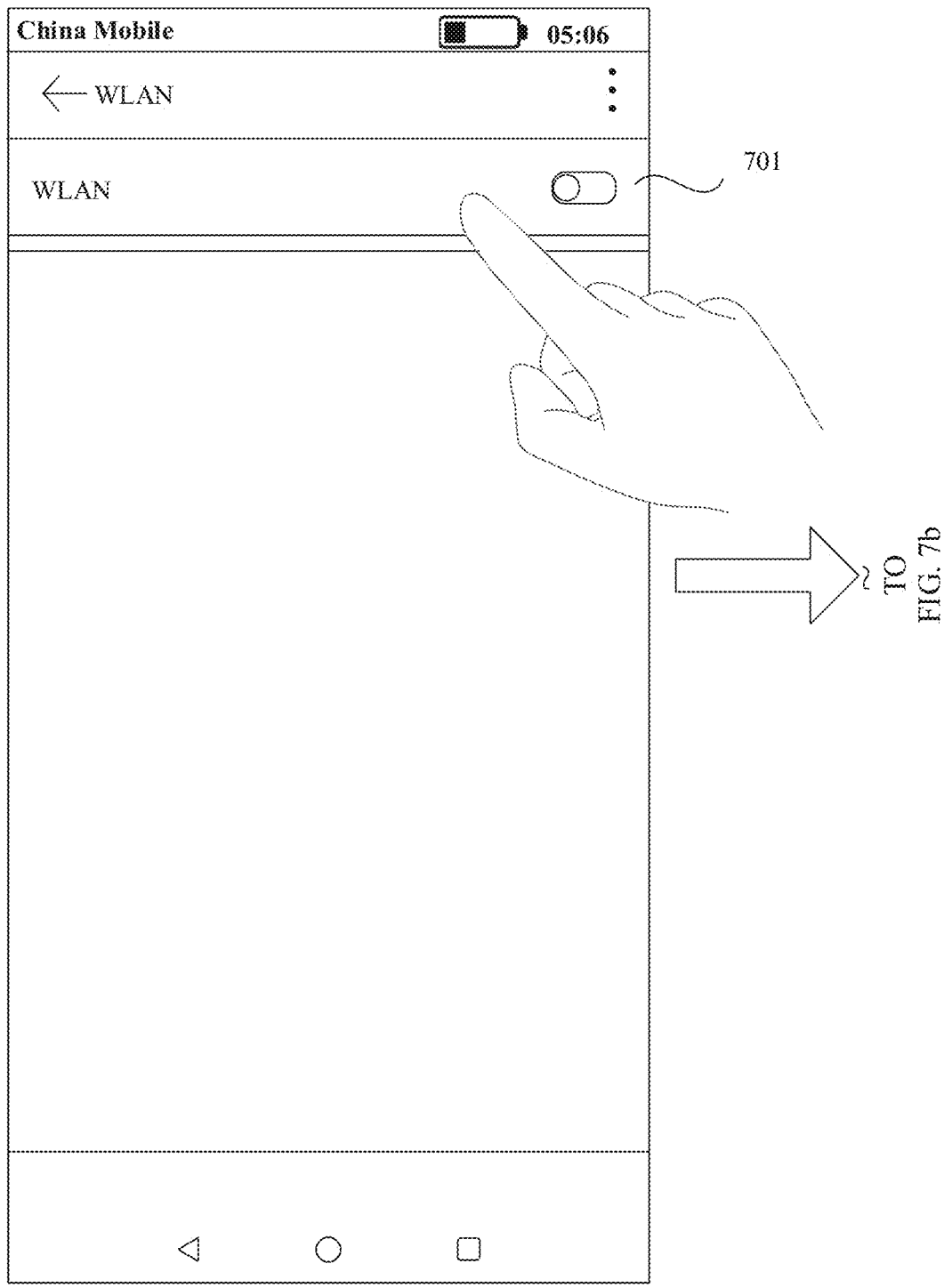
FIG. 7a to FIG. 7c to FIG. 9a and FIG. 9b are schematic diagrams of human-computer interaction according to embodiments of this application.
Figure 7B:
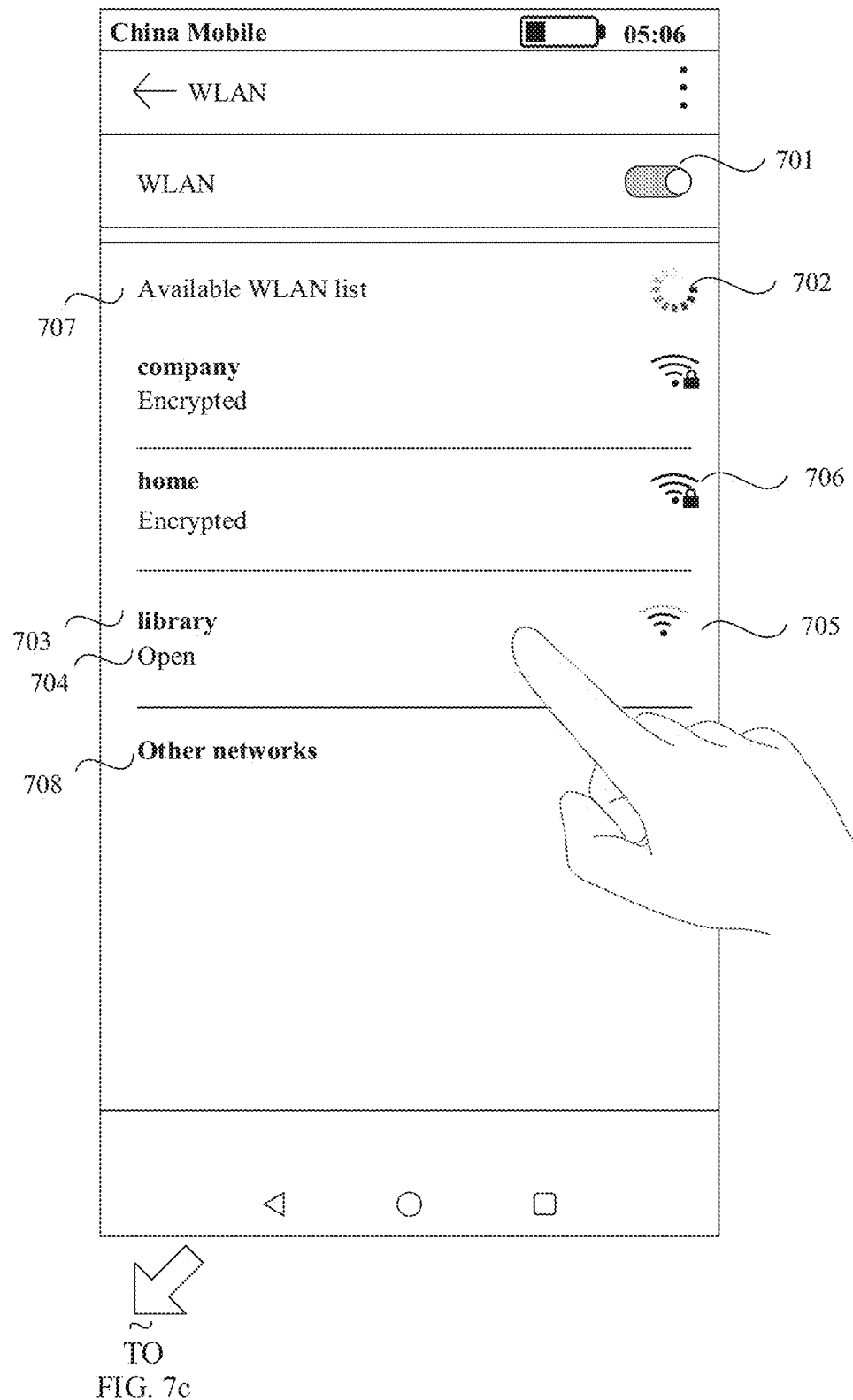
Figure 7C:
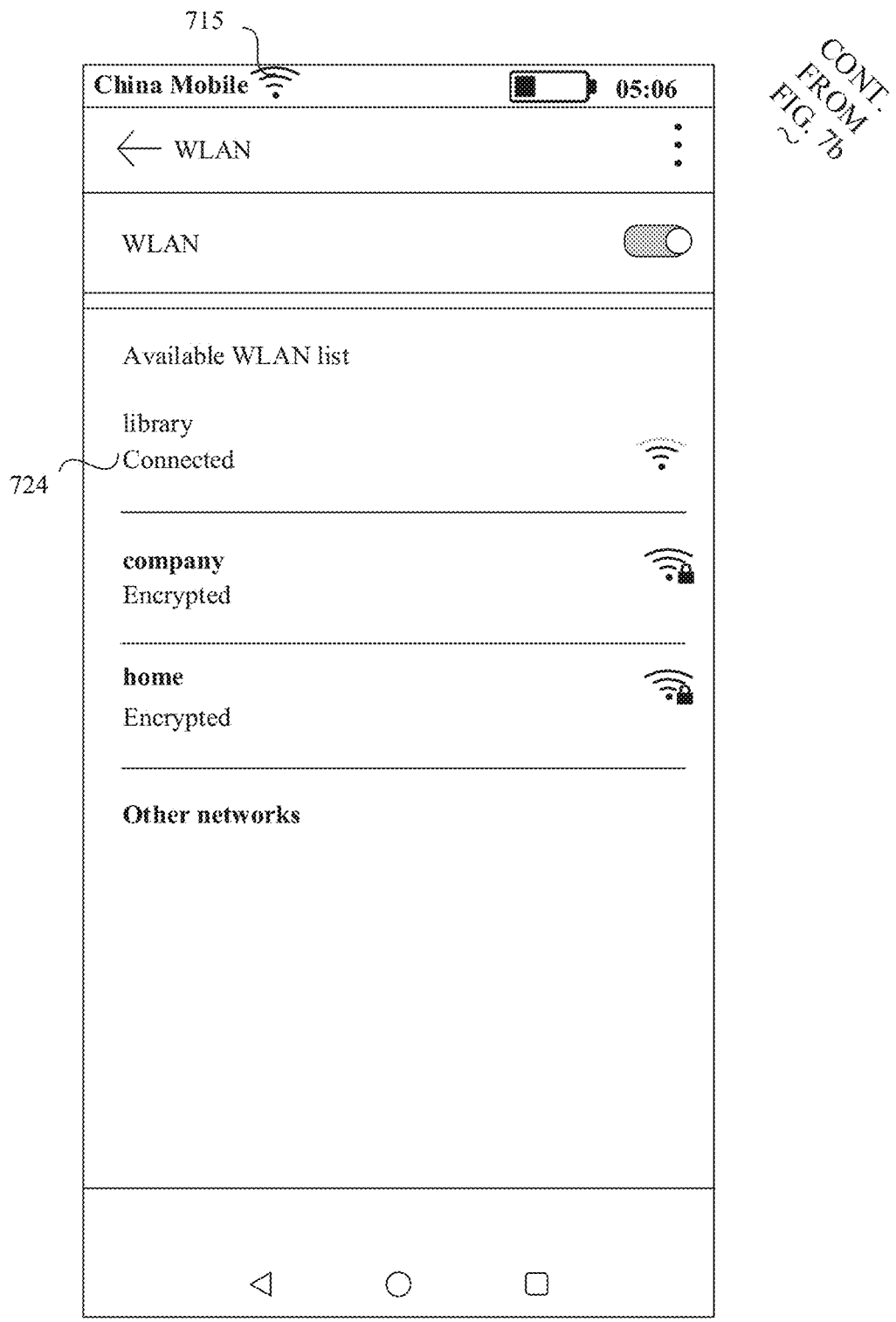

For example, FIG. 7a to FIG. 7c show an embodiment of a method in which a user enables a terminal to access an open (OPEN) network.

As shown in FIG. 7a, a display of the terminal displays a WLAN setting interface. The interface includes a MILAN on/off control 701. The on/off control 701 indicates a status indicating whether a Wi-Fi function is enabled. The user may enable or disable the Wi-Fi function by operating the control 701. The user operation may be a tap operation performed by the user on the WLAN on/off control 701. In some embodiments, in addition to the setting interface, a system output interface may further include a system-level interface element, for example, a status bar or a navigation bar. The status bar may include an operator name (for example, China Mobile), a time, a Wi-Fi icon, signal strength, a current residual capacity, and the like. The navigation bar may include a back button icon, a home screen button icon, a menu button icon, and the like.

As shown in FIG. 7b, in response to the tap operation performed by the user on the option WLAN on/off control 701 on the setting interface, the terminal starts to perform active scanning, and 702 displayed on the display of the terminal indicates that the terminal scans nearby available Wi-Fi. Specifically, a processor 110 of the terminal invokes a device MAC address, and sends a probe request frame that carries the device MAC address to an AP by using a wireless communications module 160. The terminal receives a probe response frame from the AR. The probe response frame includes capability information and an RSN information element. The wireless communications module 160 sends the signal received from the AP to the processor 110 of the terminal. The processor 110 parses the foregoing signal, and determines a link authentication manner, an access authentication manner, and the like that are required for accessing the AR Then, the display of the terminal displays an SSID of a BSS (library, home, and company are SSIDs of corresponding BSSs in FIG. 7b) and a type (for example, open or encrypted) for the user to select. For example, as shown in FIG. 7b, an available WLAN list 707 lists an SSID of a BSS that can be accessed by the terminal, and the SSID of the BSS is displayed on the display of the terminal. For example, 703 indicates that the SSID of the BSS is library. 704 and 705 may indicate that a type of the AP is an open type or an encrypted type. 704 is directly represented by using a text, and 705 uses an icon to more intuitively identify a type of the AP and signal strength of Wi-Fi provided by the AP. For example, 705 in FIG. 7b indicates that the AP is open, in addition, 706 includes a lock mark, and indicates that the AP is encrypted. A fan pattern in 705 may indicate the signal strength. If one bar in the fan pattern in 705 is in a gray state, it indicates that Wi-Fi whose SSID is library is weaker than a Wi-Fi signal whose SSID is home. 708 indicates that the user may manually add an AP with a known SSID by tapping the control.

As shown in FIG. 7c, in response to a tap operation performed by the user on the AP whose SSID is library on the setting interface, the terminal starts to establish a connection to the AP. Specifically, the terminal initiates link authentication to the AP by adding the device MAC address. After the link authentication, the terminal still sends an association request frame that carries the device MAC address information to the AP, and receives an association response frame sent by the AP. The terminal successfully establishes the connection to the AP, the terminal may access a wide area network by using the AP, and a connection success identifier is displayed on the display of the terminal. For example, as shown in FIG. 7c, 702 disappears, and 724 indicates that the type of the AP is changed to "connected", and is used to indicate a status in which the terminal has established a connection to the AP.

On an existing network such as a shared-key WEP network, the terminal performs authentication by using the device MAC address in the link authentication phase, and a process in which the terminal accesses the AP may also be implemented by performing the three steps: the scanning phase, the link authentication phase, and the association phase. However, a difference from the open (OPEN) network is that the user needs to enter a password for human-machine interaction before the link authentication phase and a packet in the link authentication phase needs to be encrypted using WEP, In this embodiment of this application, the shared-key WEP network belongs to a type II.

Because a security problem is improved, according to definitions of WI. AN security standards in 802.11i, a STA that succeeds in 802.11 link authentication by using a shared key is not allowed to connect to a robust security network (robust security network, RSN). It can be understood that, for the robust security network, the access authentication phase further needs to be performed after the association phase, and the terminal may access the wide area network by using the AP after the connection is established.

A future network such as a WPA3 enhanced open network is the same as the open (OPEN) network. In a process of establishing a connection between the terminal and the AP, the scanning phase, the link authentication phase, and the association phase are performed. However, a difference is that an access authentication phase of four-way handshake between the terminal and the AP further needs to be performed. In addition, in the association phase, the terminal and the AP negotiate a connection key. The connection key is used for packet encryption of the four-way handshake and packet transmission encryption after the terminal accesses the AP. In the foregoing process, although the terminal and the AP negotiate a connection key, the user does not learn of the connection key. In this embodiment of this application, the network belongs to the type I. A process of establishing a connection between the terminal and the AP is the same as the step shown in FIG. 7a to FIG. 7c, and a human-machine interaction step of entering a password or downloading a certificate does not need to be performed by the user.

For existing networks such as a WPA network and a PA2-PSK network, future WPA3-PSK only personal encryption networks, and WPA2/WPA3-PSK compatible personal encryption networks, the access authentication phase is performing access authentication through EAPOL four-way handshake between the terminal and the AP. After the access authentication succeeds, a packet between the terminal and the AP is encrypted and then is sent. In this embodiment of this application, the foregoing four networks belong to the type II. As shown in FIG. 6, in a process of establishing a connection between the terminal and the AP, four steps need to be completed: a scanning phase, a link authentication phase, an association phase, and an access authentication phase. After the connection is established, the terminal may access a wide area, network by using the AP. Before the link authentication phase, the user needs to enter a password for human-machine interaction.

For example, FIG. 8a to FIG. 8d show an embodiment of a method in which a user enables a terminal to access Wi-Fi that belongs to a WPA2-PSK network and whose SSID is home. For descriptions of FIG. 8a and FIG. 8b, refer to the descriptions of FIG. 7a, and FIG. 7b. Details are not described herein again.

Figure 8A:
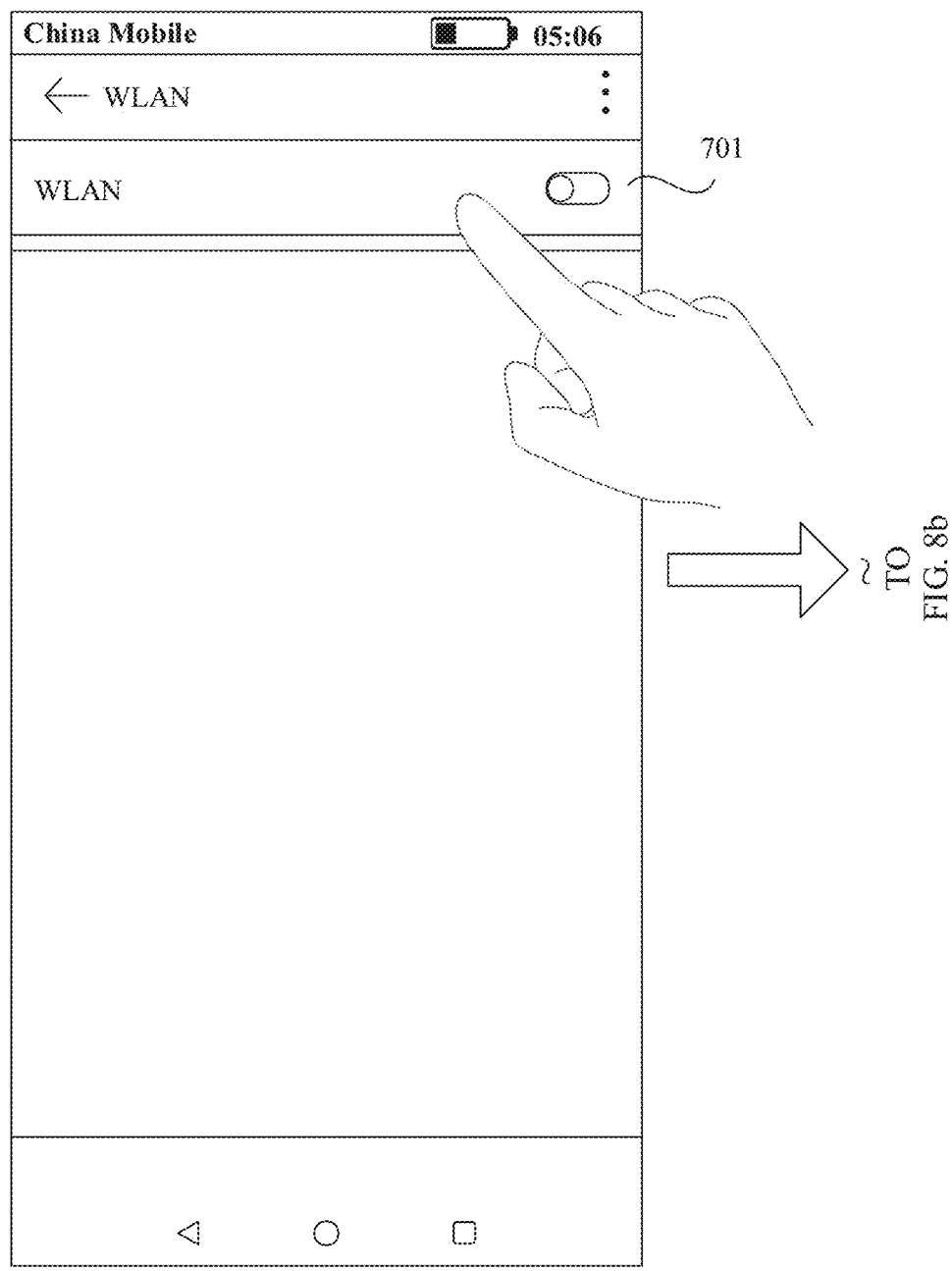
Figure 8B:
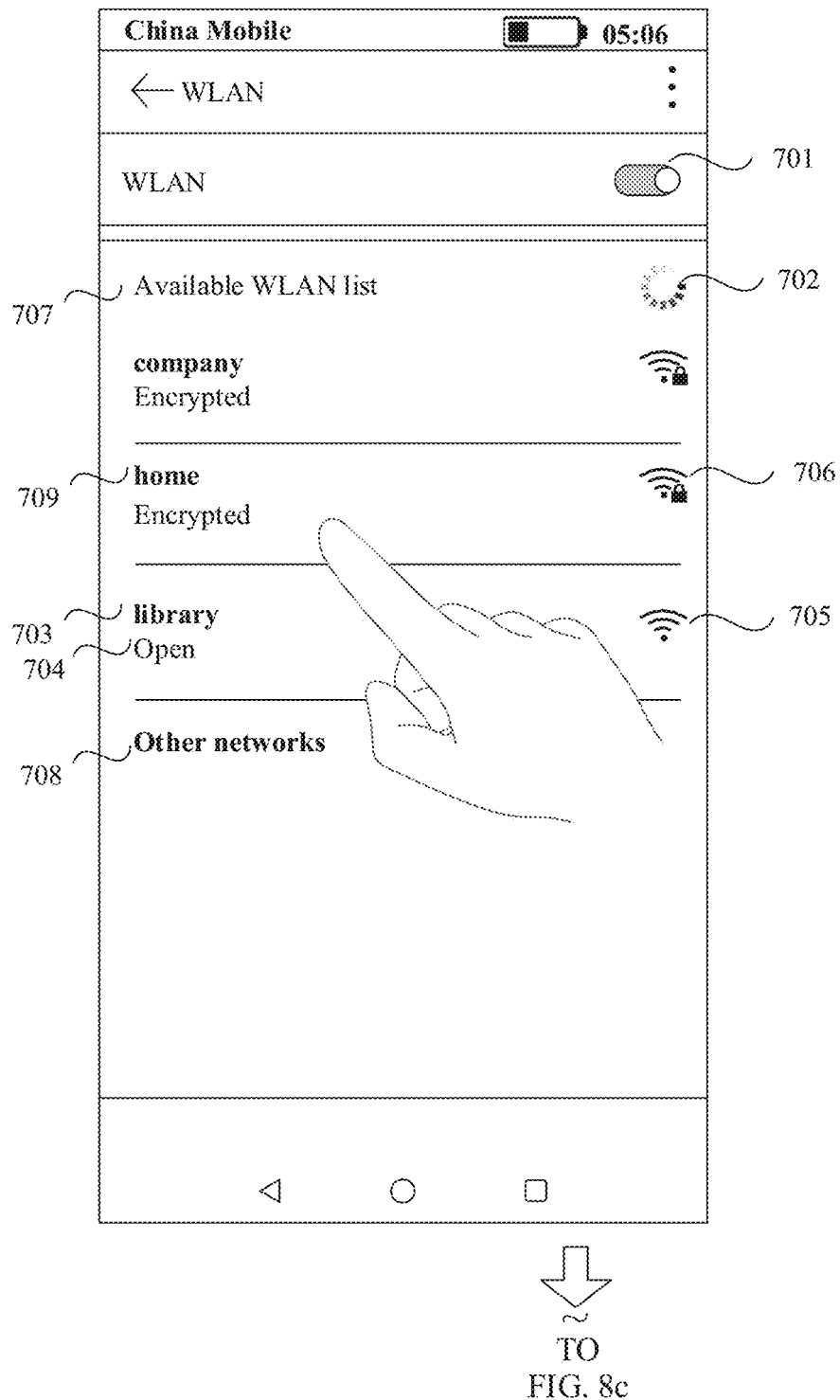
Figure 8C:
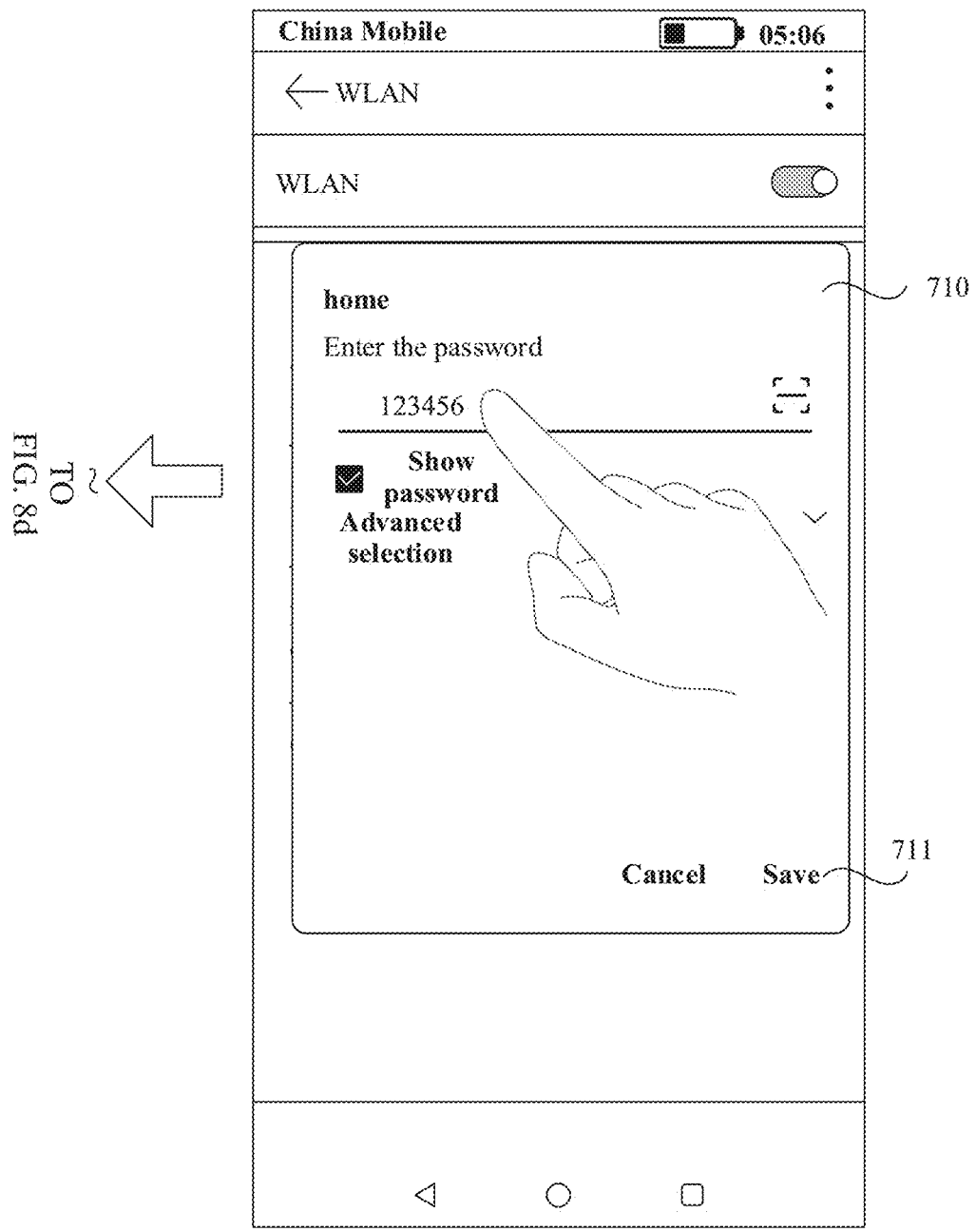
Figure 8D:
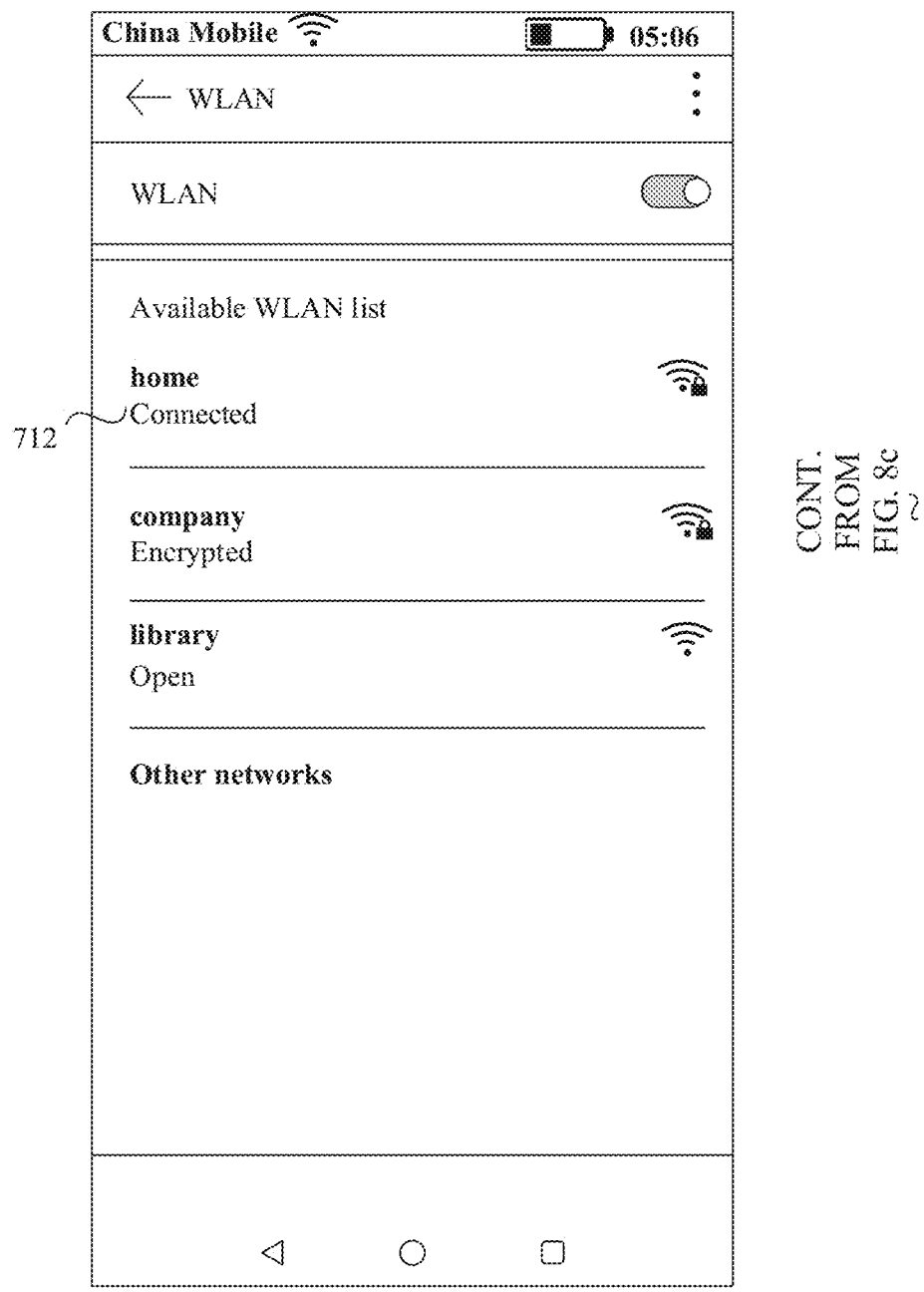

As shown in FIG. 8c, in response to a tap operation performed by the user on an option AP 709 whose SSID is home on the setting interface, the terminal starts to establish a connection to the AP, and prompts the user to enter a password on a display interface 710 of the display. The user enters the password, for example, 123456, and then taps an option "Save" 711 on the interface 710. In response to the operation performed by the user on the interface 710, the terminal stores the password in an internal memory 121. The terminal initiates link authentication to the AP by adding device MAC address information invoked by the processor. After the link authentication, the terminal sends an association request frame that carries the device MAC address information to the AP, and receives an association response frame sent by the AP. The terminal again adds the MAC address information to initiate access authentication to the AP, and an access authentication phase is completed between the terminal and the AP. After the authentication succeeds, the terminal may access a wide area network by using the AP, and a connection success identifier is displayed on the display of the terminal. For example, as shown in FIG. 8d, 712 indicates a status in which the terminal has established a connection to the AP.

On an existing network such as a WPA-802.1.x enterprise encryption network and a future WPA3-Enterprise encryption network, the foregoing network system is a typical client/server structure. In an access authentication phase of the network system, an extensible authentication protocol (Extensible Authentication Protocol, EAP) is used to exchange authentication information between a client, a device, and an authentication server. After the access authentication succeeds, a packet is sent through encryption. In this embodiment of this application, the foregoing two networks belong to a type III. As shown in FIG. 6, in a process of establishing a connection between the terminal and the AP, four steps need to be completed: a scanning phase, a link authentication phase, an association phase, and an access authentication phase. After the connection, the terminal may access a wide area network by using the AR A difference from the type II is that the user needs to download a certificate or enter identity information for human-machine interaction in the access authentication phase.

Figure 9A:
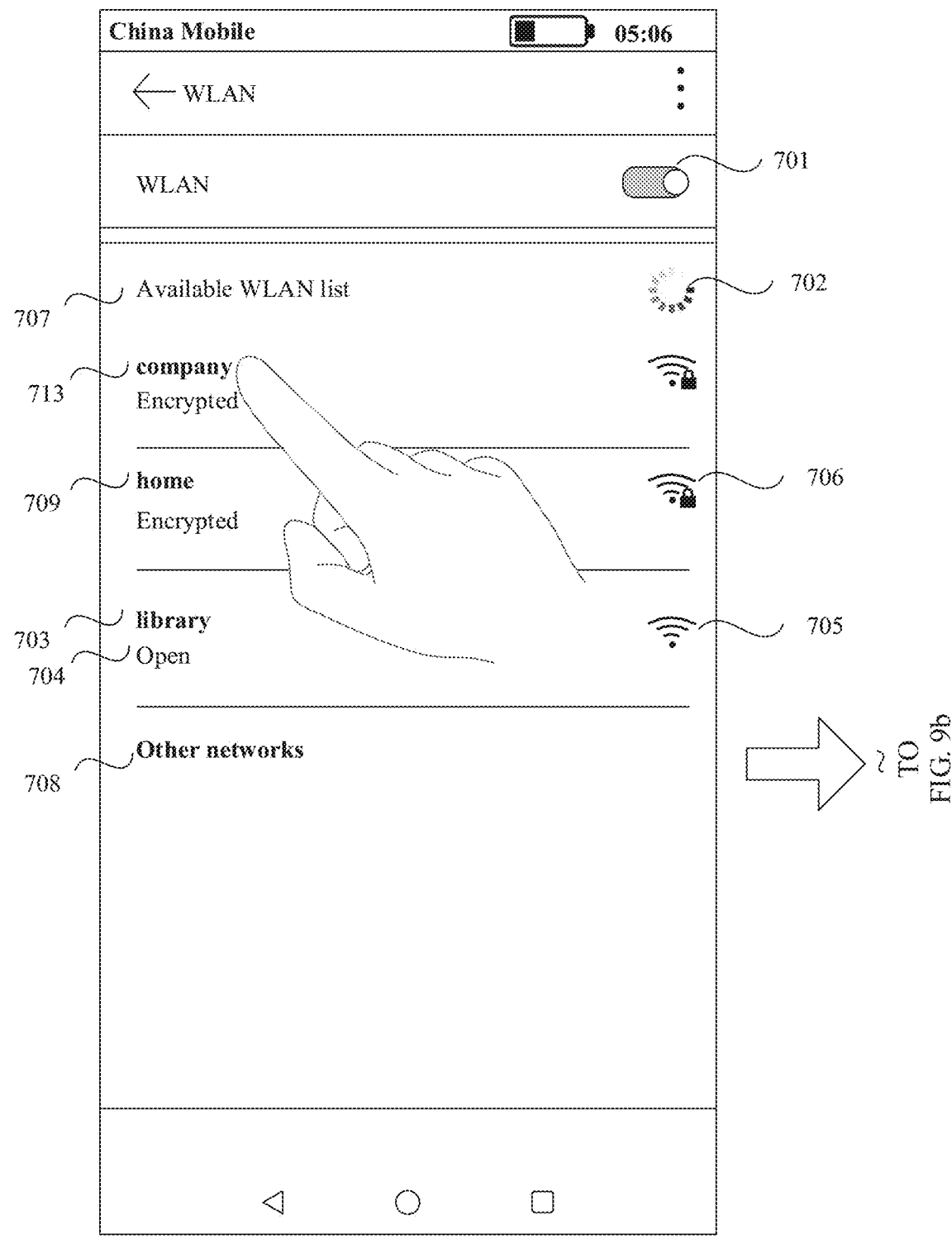
Figure 9B:
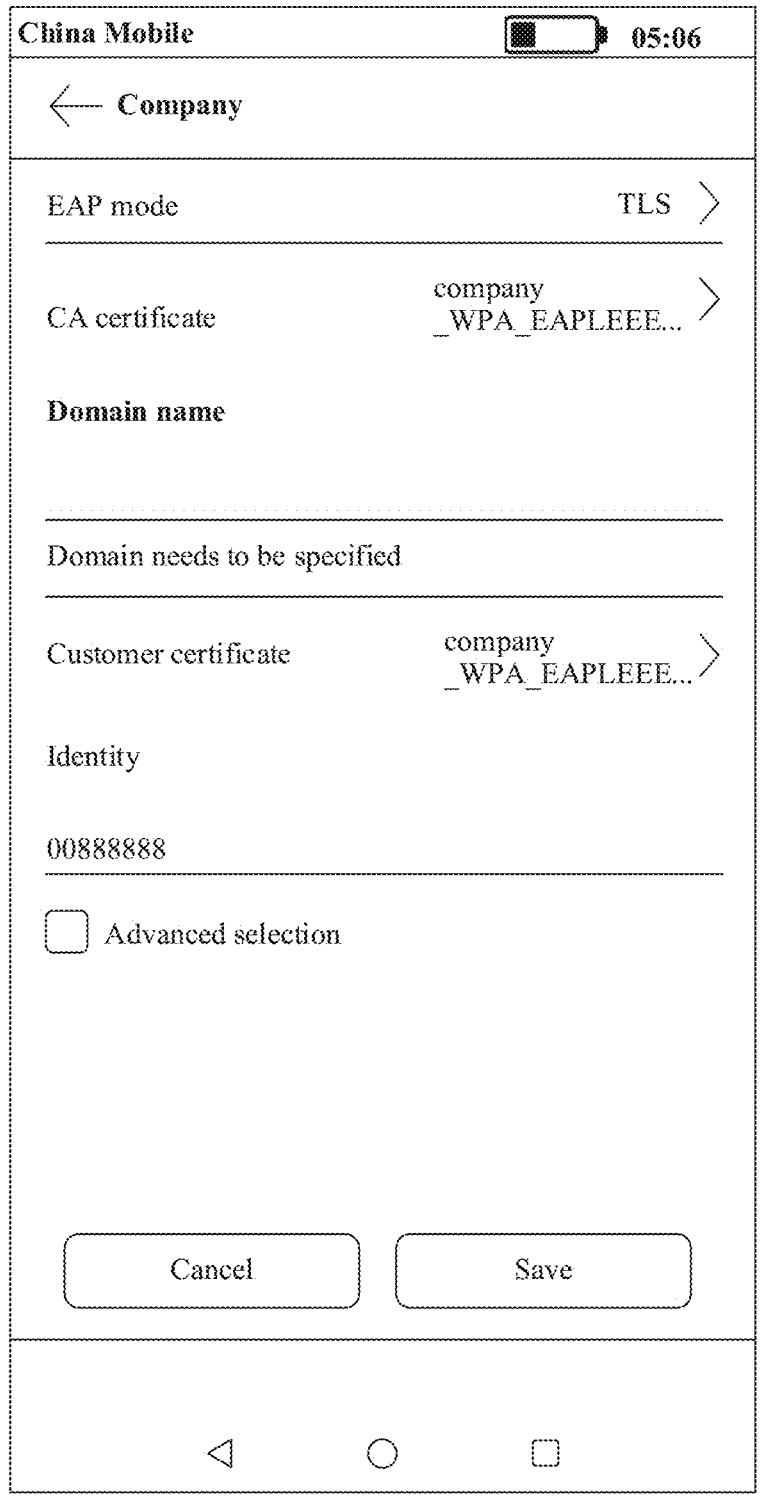

For example, FIG. 9a and FIG. 9b show a possible method in which a user enables a terminal to access Wi-Fi that belongs to a type III and whose SSID is company. An access process thereof is similar to that of the type II, and a difference is that the display of the terminal displays different interfaces to the user in an access authentication phase. In response to a tap operation performed by the user on an option AP 713 whose SSID is company on the setting interface, the terminal selects, in an access authentication phase in a process in which the terminal establishes a connection to the AP, an interface displayed by the terminal to the user. As shown in FIG. 9b, the user needs to download a certificate and fill identity information (such as a user identifier). After the terminal succeeds in the access authentication, the terminal may access a wide area network by using the AP.

In the conventional technology, in the scanning phase, the terminal sends a probe request frame that carries a random MAC address to the AP. The random MAC address is used to identify a device. The terminal receives probe response frames and beacon frames from all APs. To ensure AP compatibility, after the terminal selects to access Wi-Fi provided by an AP 0, the terminal sends a probe request frame again that carries the device MAC address and an SSID 0 (that is, the SSID 0 of Wi-Fi provided by the AP 0), and completes the scanning phase, the link authentication phase, and the association phase to access Wi-Fi provided by the AP 0. However, in the foregoing process, the device MAC address of the terminal may still be obtained. For example, some Wi-Fi allows to pass the scanning phase and the link authentication phase, but rejects, in the association phase, the association request frame sent by the terminal. Therefore, Wi-Fi may still obtain the device MAC address of the terminal. Consequently, user location privacy leakage is caused. In the embodiments of this application, it can be ensured that Wi-Fi cannot obtain a device MAC address, AP compatibility can also be considered, user experience is good, and a user time is reduced. For different APs, different random MAC addresses are used to identify the terminal. Therefore, in the scenario in FIG. 1, user location information cannot be obtained by using the device MAC address or the random MAC address of the terminal. This effectively protects the user location information.

The terminal in this application is not limited to a mobile phone, but may also be another portable electronic device, such as a tablet computer, a notebook computer, a vehicle-mounted device, a wearable electronic device (such as a smartwatch) having a Wi-Fi communication function, or the like. The AP is not Limited to a router, but may also be another electronic device that provides an access point, such as a mobile hotspot. This is not limited herein.

An example in which a STA is a terminal, an: P is a router, and a random MAC address is used as a virtual MAC address is used below to describe a method for accessing a wireless local area network provided in an embodiment of this application with reference to the accompanying drawings.

Figure 10:
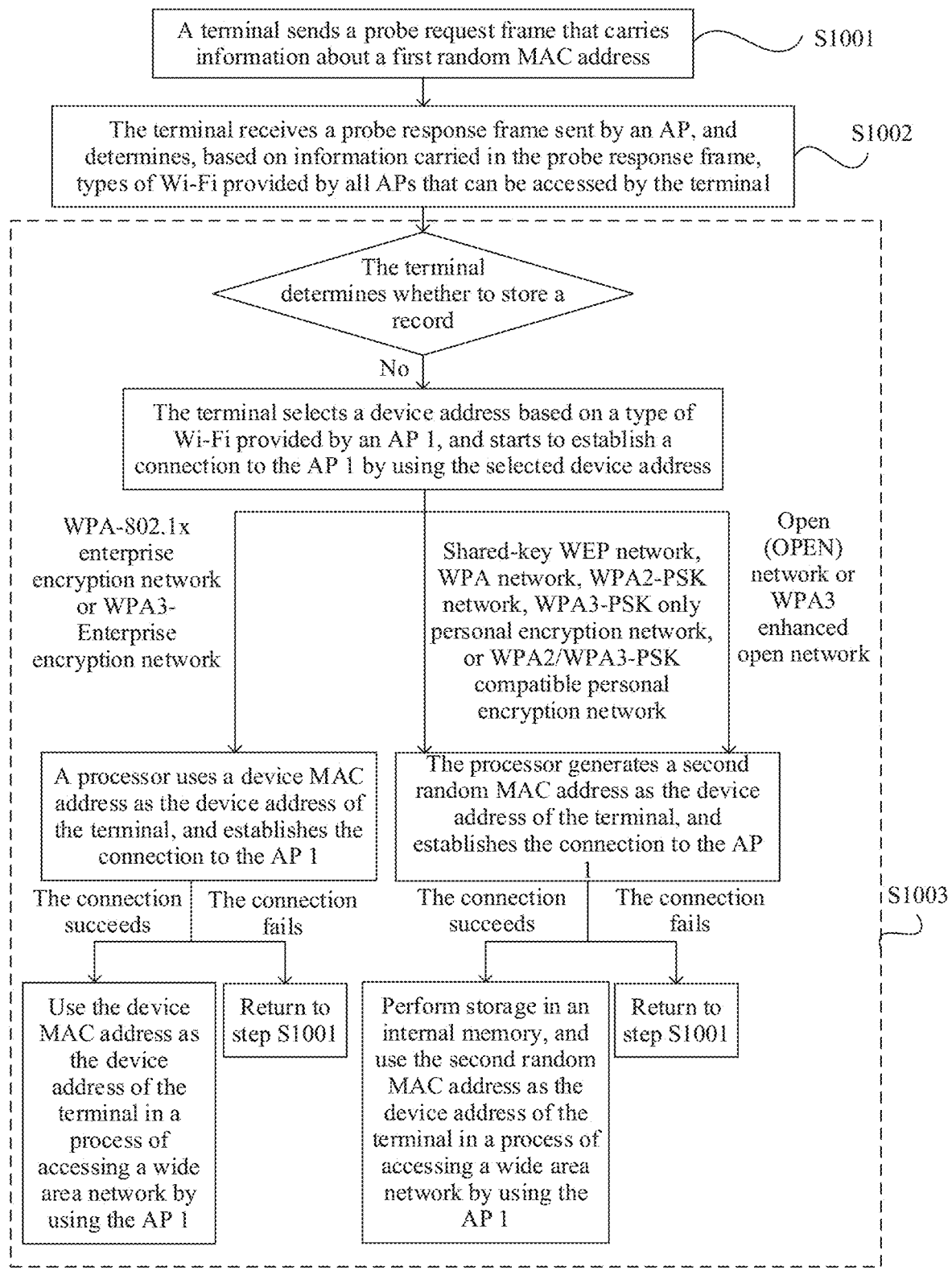
FIG. 10 is a schematic flowchart of a method for accessing a wireless local area network according to an embodiment of this application.

FIG. 10 is a schematic flowchart of a method for accessing a wireless local area network according to an embodiment of this application. As shown in FIG. 10, the method includes the following steps.

S1001: A terminal sends a probe request frame that carries information about a first random MAC address.

As shown in FIG. 7b or FIG. 8b, a user may enable a Wi-Fi function by operating the control 701. This is the same as the conventional technology. The terminal sends the probe request frame that carries the information about the first random MAC address. The first random MAC address is used as a device address of the terminal to identify the terminal. However, a difference is that a processor 110 of the terminal in this application may generate the first random MAC address after the user enables the Wi-Fi function or before the user enables the function. Optionally, an application processor of the terminal generates the first random MAC address.

S1002: The terminal receives a probe response frame sent by an AP, and determines, based on information carried in the probe response frame, types of Wi-Fi provided by all APs that can be accessed by the terminal.

The AP replies with the probe response frame by using the first random MAC address as a destination address. This is the same as the conventional technology. The probe response frame carries information such as an SSID of Wi-Fi provided by the AP, and a BSSID, capability information element, and an RSN information element of the AP. The processor 110 determines, based on the information carried in the probe response frame, the types of Wi-Fi provided by all the APs that can be received by the terminal. As shown in FIG. 7b, the display displays, to the user in the available WLAN list 707, SSIDs (library, home, and company in FIG. 7b all are SSIDs of Wi-Fi provided by corresponding APs) and types (for example, open or encrypted) of provided by all APs that can be connected to the terminal.

A difference from the conventional technology is that the terminal reads a historical record in an internal memory, and determines whether Wi-Fi that is provided by all the APs and that can be received are stored. For example, the processor of the terminal reads the historical record in the memory, and compares a received SSID of an AP with the historical record stored in the memory. After the comparison, if the historical record does not exist, step S1003 is performed, There may be another determining manner. This is not limited in this embodiment of this application.

If the historical record exists, the terminal automatically starts to establish a connection to the AP by using a device MAC address or a second random MAC address that corresponds to the AP and that is used to identify the terminal in the historical record. If there are a plurality of APs that have successfully established connections, the terminal automatically selects a provided AP with a strongest Wi-Fi signal to start to establish a connection, or the terminal automatically selects an AP with a largest quantity of connection establishment success times to start to establish a connection.

For Wi-Fi for which a historical record is not stored in the internal memory, the terminal waits for the user to select an AP to which a connection is to be established, and the user may perform selection by operating an SSID on the display. The user operation may be a tap operation performed by the user on an SSID of an AP. If all received Wi-Fi is not stored in the internal memory; the terminal may also automatically select a provided AP 1 with a strongest Wi-Fi signal or may use another selection manner. This is not limited in this embodiment of this application.

If the terminal automatically starts to establish a connection to an AP 0, in a connection establishment process or in a process in which a connection to the AP 0 has been established, the user may perform modification by operating an SSID on the display, for example, reselect Wi-Fi provided by the AP 1 to be connected. The user operation may be a tap operation performed by the user on an SSID of Wi-Fi provided by the AP 1.

S1003: If a historical record is not stored for Wi-Fi provided by the AP 1 accessed by the terminal, the terminal selects a device address based on a type of Wi-Fi provided by the AP 1, and starts to establish a connection to the AP 1 by using the selected device address.

The user taps the SSID on the display to select Wi-Fi provided by the AP 1 to be accessed, and the terminal detects the user operation and starts to establish a connection to the AP 1. Alternatively, the terminal automatically selects the AP 1 that provides a strongest Wi-Fi and starts to establish a connection to the AP 1.

If provided by the AP 1 to be accessed by the terminal is a WPA-802.1x enterprise encryption network or a WPA3-Enterprise encryption network (in other words, belongs to a type based on the foregoing determining result, the processor invokes the device MAC address stored in the internal memory 121, and sends a probe request frame that carries the device MAC address and information about an SSID 1 to the AP 1. The SSID 1 corresponds to the AP 1. In a scanning phase, a link authentication phase, an association phase, and an access authentication phase in a process of establishing a connection to the AP 1, and in a process of accessing a wide area network by using the AP 1, the device MAC address is used as the device address to identify the terminal. For specific implementation thereof, refer to related implementation in the conventional technology. This is not limited in this embodiment of this application. After accessing the AP 1, the terminal stores, in the internal memory, the SSID 1 of Wi-Fi provided by the AP 1. Further, a mapping relationship between the SSID 1 and the device MAC address is stored. The mapping relationship indicates that the device MAC address corresponds to the AP 1 and is used as the device address of the terminal to identify the terminal.

If Wi-Fi provided by the AP 1 to be accessed by the terminal is an open (OPEN) network, a WPA3 enhanced open network, a shared-key WEP network, a WPA network, a WPA2-PSK network, a WPA3-PSK only personal encryption network, or a WPA2/WPA3-PSK compatible personal encryption network (in other words, belongs to a type I or a type II), the processor generates the second random MAC address. There is a mapping relationship between the second random MAC address and the AP 1. The second random MAC address may be the same as or different from the first random MAC address. The terminal sends the probe request frame that carries the second random MAC address and the information about the SSID 1 to the AP 1. The SSID 1 corresponds to the AP 1. If Wi-Fi provided by the AP 1 and selected by the user is the open (OPEN) network or the shared-key WEP network, in a scanning phase, a link authentication phase, and an association phase in a process of establishing a connection to the AP 1, and in a process of accessing a wide area network by using the AP 1, the second random MAC address is used as the device address to identify the terminal. For specific implementation thereof refer to related implementation in the conventional technology. This is not limited in this embodiment of this application. If Wi-Fi provided by the AP 1 and selected by the user is the WPA3 enhanced open network, the WPA network, the WPA2-PSK network, the WPA3-PSK only personal encryption network, or the WPA2/WPA3-PSK compatible personal encryption network, in a scanning phase, a link authentication phase, an association phase, and an access authentication phase in a process of establishing a connection to the AP 1, and in a process of accessing a wide area network by using the AP 1, the second random MAC address is used as the device address to identify the terminal. For specific implementation thereof, refer to related implementation in the conventional technology. This is not limited in this embodiment of this application. After accessing the AP 1, the terminal stores, in the internal memory, the SSID 1 of Wi-Fi provided by the AP 1. Further, a mapping relationship between the SSID 1 and the random MAC address is stored. The mapping relationship indicates that the second random MAC address corresponds to the AP 1 and is used as the device address of the terminal to identify the terminal.

Optionally, the application processor of the terminal generates the second random MAC address.

The internal memory 121 stores N second random MAC addresses, and further stores N SSIDs that are of Wi-Fi provided by N APs and that respectively have a mapping relationship with the second random. MAC addresses. In other words, one SSID corresponds to one second random MAC address.

In an optional implementation, if the terminal cannot access Wi-Fi 1 provided by the AP 1, the terminal automatically selects to access another Wi-Fi, or accesses another Wi-Fi in response to user selection, or automatically restarts scanning (for example, returns to step S1001).

It should be noted that, if Wi-Fi provided by the AP 1 and selected by the user belongs to the type I network and the type II network, before the processor generates the second random MAC address, the processor compares the SSID 1 of Wi-Fi provided by the AP 1 with the N SSIDs stored in the historical record of the internal memory 121. If the N stored SSIDs include the SSID 1, a second random MAC address that has a mapping relationship with the SSID 1 is directly obtained; or if the stored content does not include the SSID 1, the processor generates a new second random MAC address. The foregoing mapping relationship may be represented in a plurality of manners, such as a list or an identifier. This is not limited in this embodiment of this application.

For example, after the terminal accesses the AP 1, the historical record is stored in the internal memory. The historical record includes the SSID 1 of Wi-Fi provided by the AP 1 and the device MAC address or the second random MAC address used by the terminal to identify the terminal. When scanning the AP 1 again, the terminal automatically selects to access the AP, and uses the device MAC address or the second random MAC address included in the historical record to identify the terminal.

In an optional implementation, the terminal uses the second random MAC address as the device address to identify the terminal. If access still fails when a quantity of access tines in an access process is equal to N (N is an integer), step S1001 is returned. N may be selected from 3, 4, 5, 6, 7, or the like, and is set by a terminal vendor based on aspects such as user experience and comfort.

In an optional implementation, if the terminal cannot access Wi-Fi provided by the AP 1, the terminal stores the SSID 1 of Wi-Fi provided by the AP 1. When scanning Wi-Fi again provided by the AP 1, the terminal does not send the probe request frame to request to access the AP 1.

In a possible implementation, the internal memory, 121 stores N second random MAC addresses, and further stores BSSIDs of N APs and SSIDs of Wi-Fi provided by the N APS that have a mapping relationship with the N second random MAC addresses. In other words, one BSSID and one SSID correspond to one second random MAC address. In this case, if Wi-Fi provided by the AP 1 and selected by the user belongs to the type I network and the type II network, before the processor generates the second random MAC address, the processor compares a BSSID 1 of the AP 1 and the SSID 1 of Wi-Fi provided by the AP 1 with the N BSSIDs and the N SSIDs stored in the internal memory 121. If the stored content includes the SSID 1 and the BSSID 1, a second random MAC address that has a mapping relationship with the SSID 1 and the BSSID 1 is directly invoked; or if the stored content does not include the SSID 1, the processor generates a second random MAC address. If the stored content includes the SSID 1 and the BSSID 11, the processor finds a difference after comparison, and the processor generates the second random MAC address. The foregoing mapping relationship may be represented in a plurality of manners, such as a list or an identifier. This is not limited in this embodiment of this application.

A MAC address is generally represented in a 6-byte hexadecimal format, for example, XX-XX-XX-XX-XX-XX. A least significant bit of a first byte is used to indicate whether the MAC address is a multicast address or a unicast address. If the bit is 0, the MAC address is a unicast address; or if the bit is 1, the MAC address is a multicast address. If a second least significant bit of the first byte is 0, it indicates that the MAC address is uniformly managed and delivered by the IEEE or if the second least significant bit of the first byte is 1, it indicates that the MAC address is not uniformly managed and delivered by the IEEE. For the terminal in this embodiment of this application, a least significant bit of a first byte of the second random MAC address generated by the processor is 0, and a second least significant bit is 1. In other words, the first byte of the second random MAC address can be used to identify the terminal only when the first byte is X2, 6, XA, or XE. Herein, X ranges from 0 and F. If the processor determines that the first byte of the generated second random MAC address is X2, X6, XA, or XE, the second random MAC address is stored in the internal memory 121 for use in a subsequent step; or if not, random generation needs to be performed until the first byte is X2, X6, XA, or XE.

In a possible implementation, the terminal may obtain a random MAC address by invoking getRandomizedMacAddress( ) to retrieve a random MAC address allocated to specific Wi-Fi. The terminal may obtain the device MAC address by invoking getWifiMacAddress( ).

According to the method in this embodiment of this application, for the type III network, the device MAC address is used to identify the terminal. This avoids a possibility that the terminal cannot access Wi-Fi due to compatibility, and reduces a user operation time. For the type I network and the type II network, a random MAC address is used. This prevents the device MAC address from being easily obtained by a third party. Further, different Wi-Fi corresponds to different random MAC addresses. In other words, for different Wi-Fi, the terminal has different identifiers. Even if the third party obtains location information of each virtual MAC address through the wireless local area network, because there is no association relationship between virtual MAC addresses, a complete activity track of the terminal cannot be obtained through association. This avoids a case in which the third party tracks the complete activity track of the terminal by tracking the device MAC address of the terminal and further tracks user location information, and effectively protects security of location information of the user using the terminal. N is set to be greater than 1. This avoids a network access failure caused by blocking or a weak signal, and increases a probability of successfully accessing Wi-Fi by using a random MAC address.

An embodiment of this application provides another method for accessing a wireless local area network. In the method, in a manner in which a user selects setting, a terminal directly determines a device address used to identify the terminal, so that the user can independently perform selection on the terminal.

On a network details interface, the user can select a device MAC address or a random MAC address as the device address to identify the terminal. For example, in FIG. 11a and FIG. 11b, on a network details interface in which an SSID is home, the terminal uses a random MAC address as a terminal identifier by default, and the user may tap a control 1102 to change to use device MAC, and tap "Save". In response to the foregoing user operation, the terminal starts to establish a connection to the AP, and sends a probe request frame that carries device MAC and the SSID of Wi-Fi provided by the AP. In a scanning phase, a link authentication phase, an association phase, and an access authentication phase in a process of establishing a connection to the AP, and in a process in which the terminal accesses a wide area network by using the AP, during interaction with the AP, the device MAC address is used to identify the terminal and send information. Likewise, the user may further change device MAC to random MAC on an interface shown in FIG. 11a.

Alternatively, the user may select, by enabling a privacy protection mode, a device address used to identify the terminal. After the user enables the privacy protection mode, in response to the foregoing user operation, when accessing all Wi-Fi, the terminal uses the random MAC address as the device address to identify the terminal, instead of using the device MAC as the device address to identify the terminal. The privacy protection mode is described below. Details are not described herein again. Alternatively, a random MAC address on/off control may be set in the terminal. After the user turns on the control, in response to the foregoing user operation, when accessing all Wi-Fi, the terminal uses the random MAC address as the device address to identify the terminal.

When the user selects the device address to identify the terminal, setting may be performed before the Wi-Fi on/off control is turned on. For example, in FIG. 7a, setting is performed by enabling the privacy protection mode when the MILAN on/off control 701 is in an off state.

After scanning on the terminal is performed, when the display displays Wi-Fi provided by all accessible APs, the user may select network details of an SSID of Wi-Fi provided by an AP for independent selection and setting. For example, as shown in FIG. 8b, in response to an operation that the user taps the control 705 or 706 of the SSID of Wi-Fi provided by the AP, the terminal displays a network details interface of the SSID.

Figure 11A:
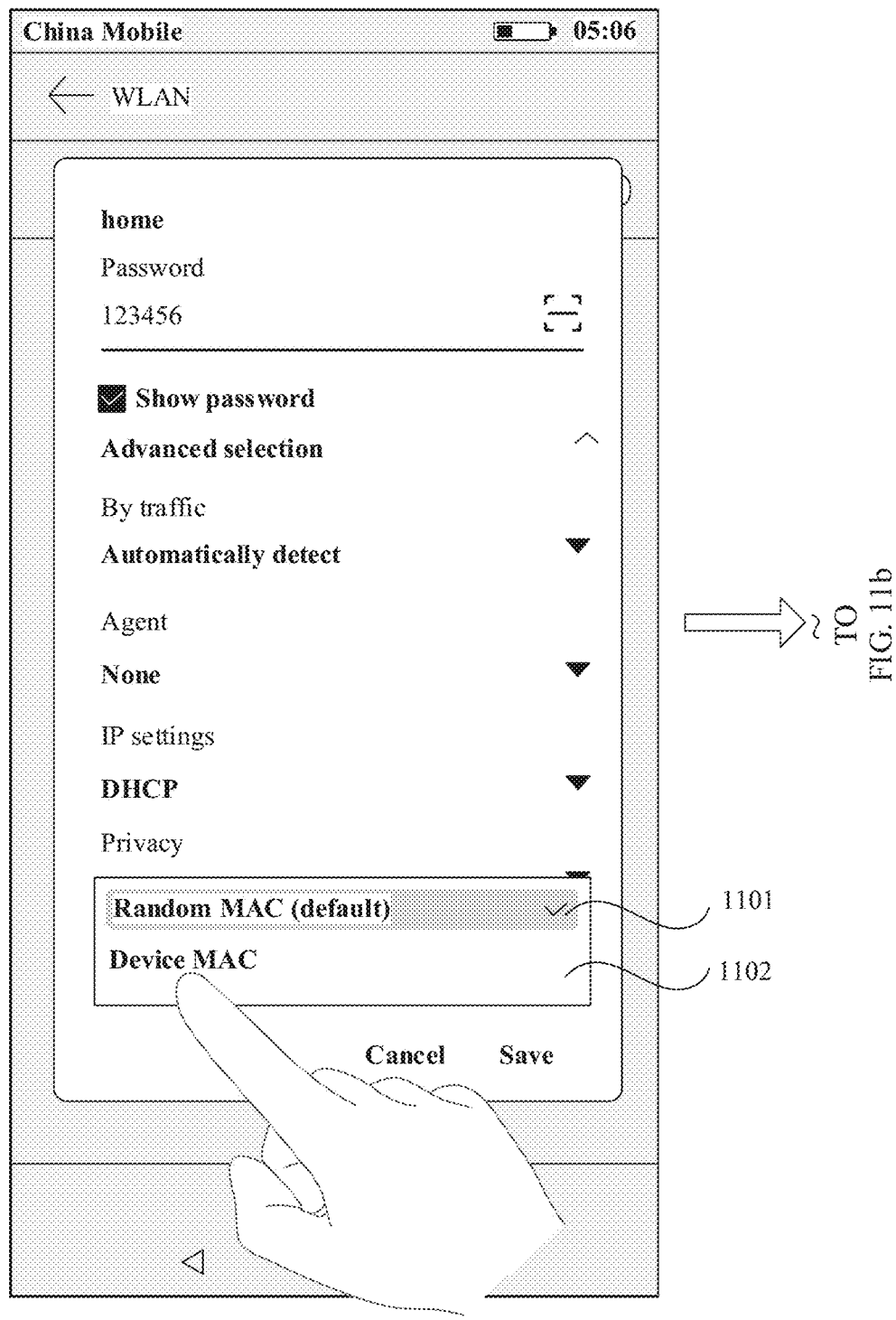
FIG. 11a and FIG. 11b are a schematic diagram of human-computer interaction according to an embodiment of this application.
Figure 11B:
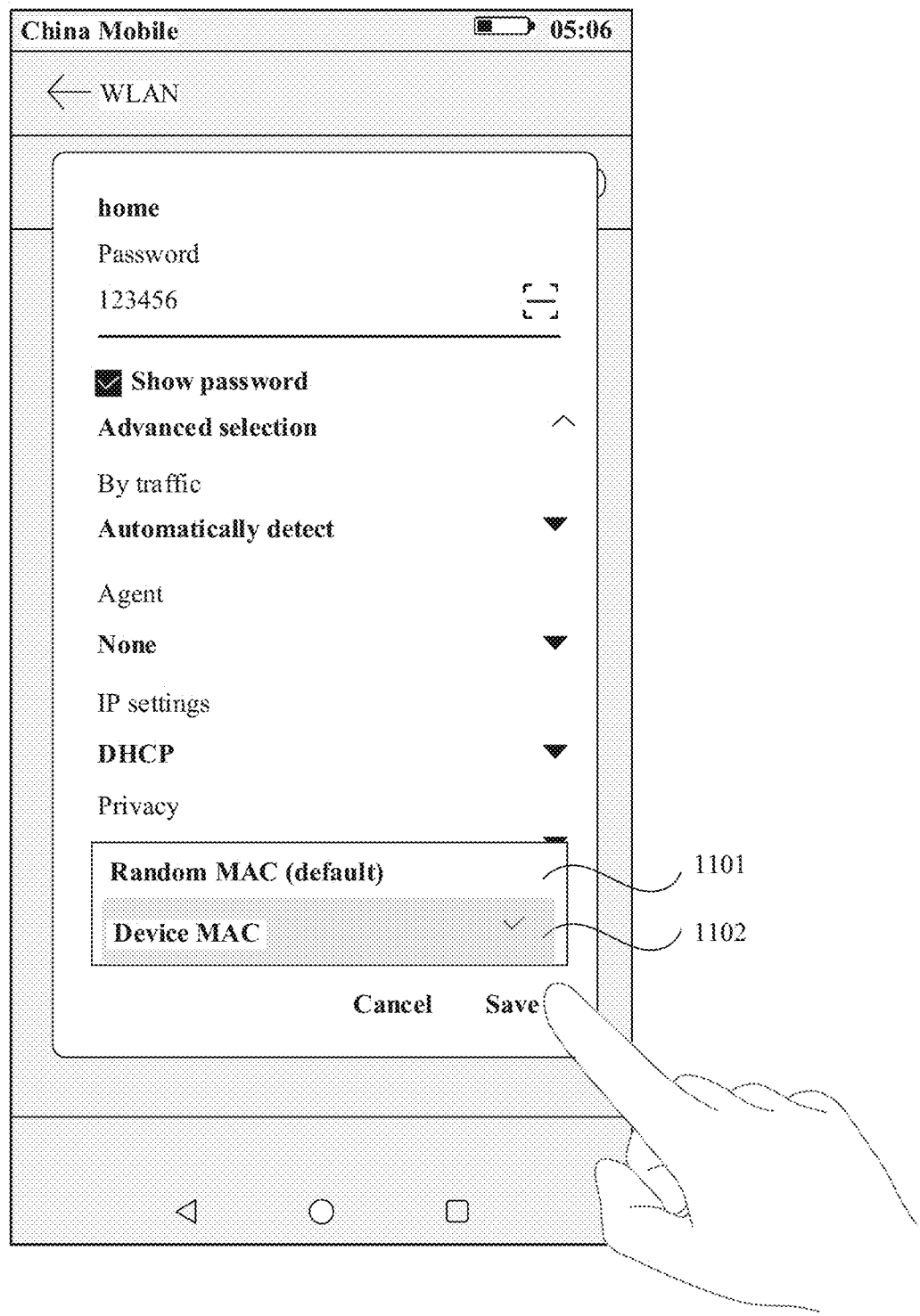

In a process in which the terminal accesses specific Wi-Fi (for example, in the scanning phase, the link authentication phase, the association phase, or the access authentication phase) or when the terminal accesses a wide area network by using an AP after establishing a connection to the AP, the user may select and set currently accessed Wi-Fi or select and set another Wi-Fi on the network details interface, or the user may enable or disable the privacy protection mode for setting. After the user selects and sets another Wi-Fi, the selection and setting take effect when the terminal accesses 0. For example, when the terminal accesses a wide area network through Wi-Fi whose SSID is library, as shown in FIG. 11a and FIG. 11b, the user performs an operation on Wi-Fi whose SSID is home in FIG. 11a, and FIG. 11b. After the user taps "Save", the terminal displays an available WLA1 list, the user taps a control (for example, the control 709 in FIG. 8b) whose SSID is home, and the terminal starts to establish a connection to a corresponding AP. In a process in which the terminal accesses Wi-Fi whose SSID is home (for example, in the scanning phase, the link authentication phase, the association phase, or the access authentication phase) or in a process in which the terminal accesses the wide area network by using the AP after establishing a connection to the AR the terminal uses the device MAC as the device address to identify the terminal.

Alternatively, the user may turn off the Wi-Fi on/off control at any moment. For example, the user turns off the WLAN on/off control 701 in FIG. 7a. In response to the foregoing user operation, the terminal stops interacting with the AP.

The user is dissatisfied with Wi-Fi currently accessed by the terminal or wants to access another Regardless of whether the terminal is in a process of establishing a connection to the AP or the terminal accesses the wide area network by using the AP after the terminal establishes a connection to the AP, the user may tap the SSID in the available WLAN list 707 shown in FIG. 7b to perform selection. In response to the user operation, the terminal starts to establish a connection to another P.

According to the foregoing method, operability and controllability of the user on the terminal are ensured, the user may perform selection setting according to preference, a requirement, and a situation of the user, and user experience is good.

Figure 12A:
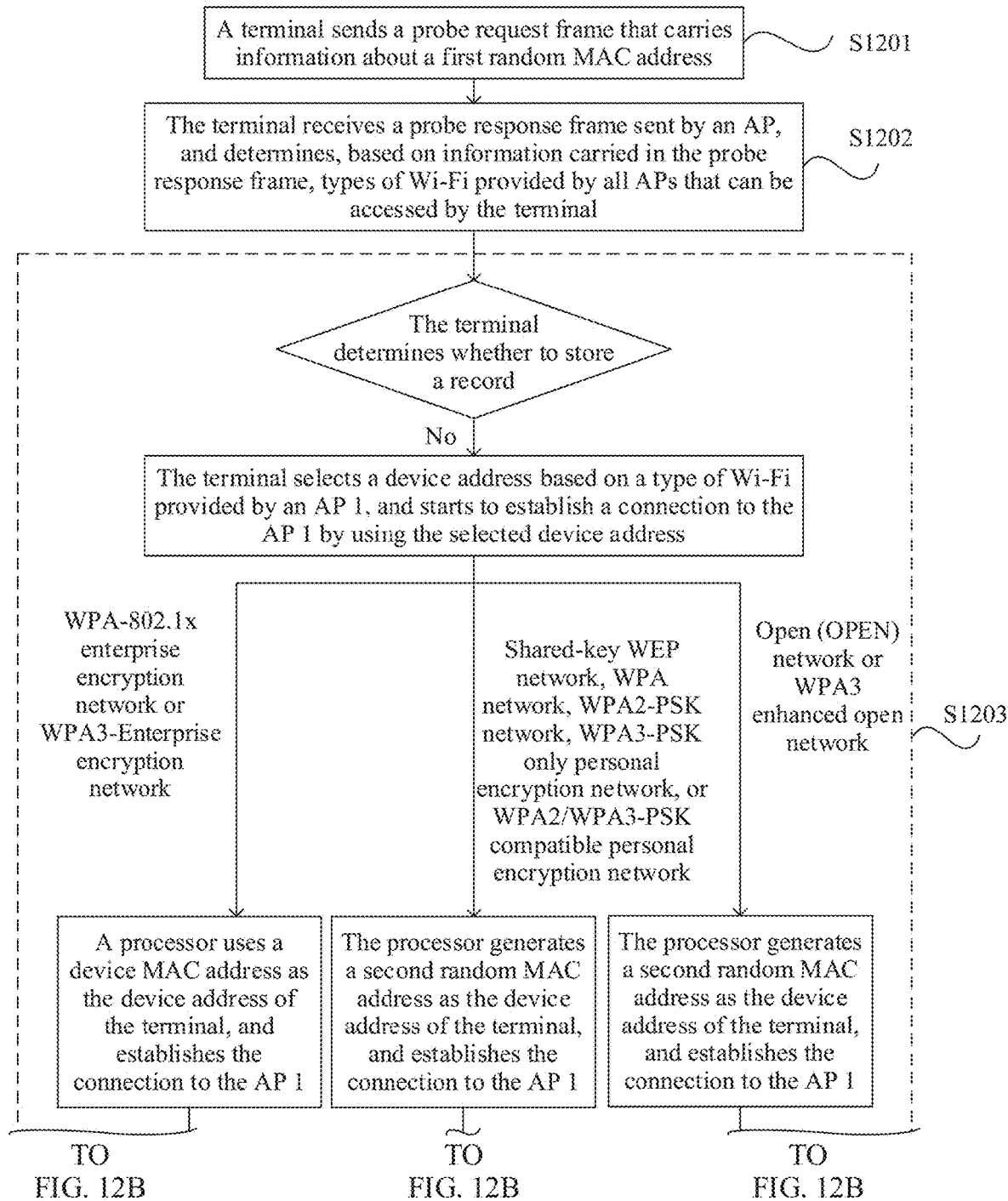
FIG. 12A and FIG. 12B are a schematic flowchart of another method for accessing a wireless local area network according to an embodiment of this application.
Figure 12B:
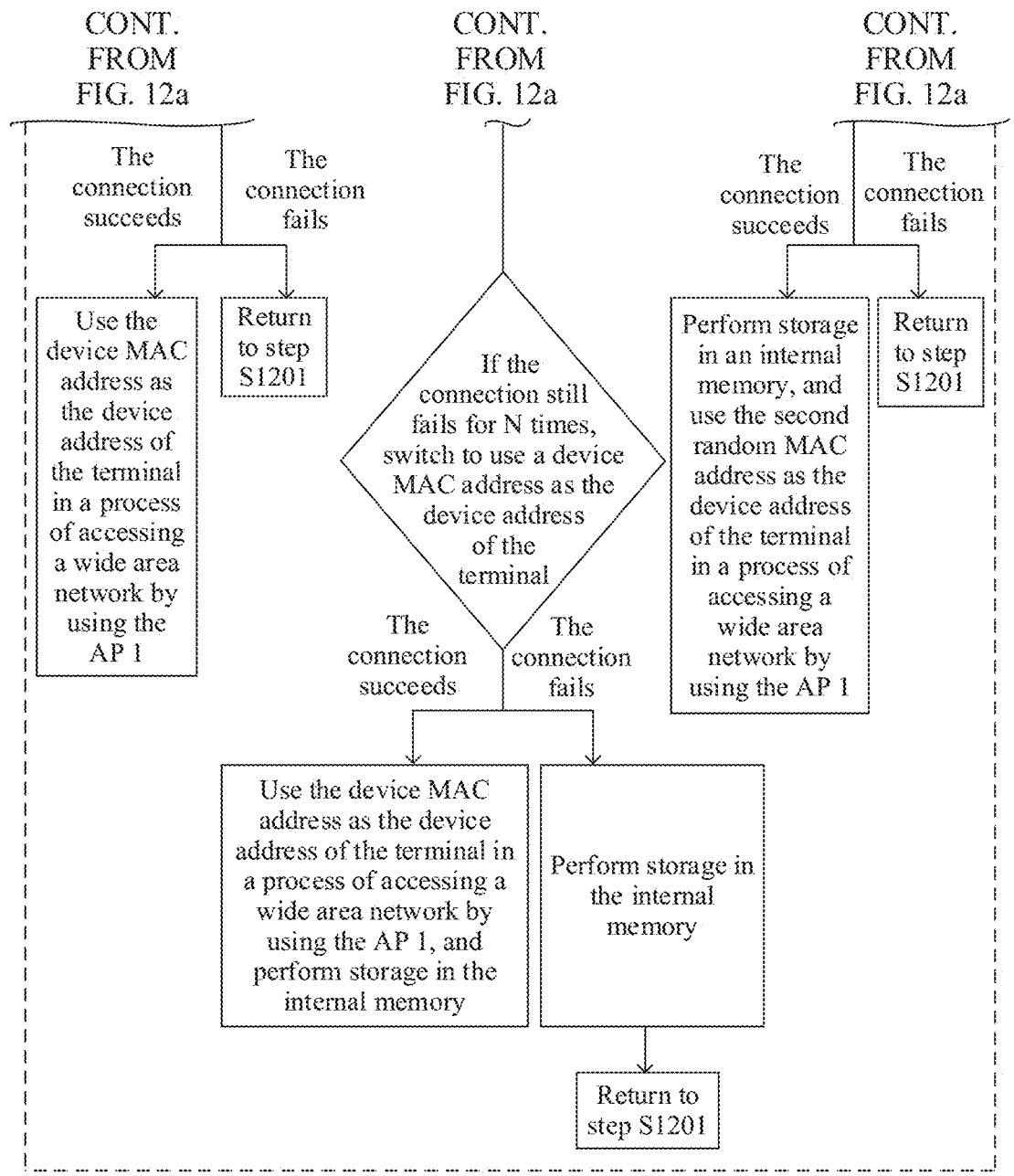

FIG. 12A and FIG. 12B are a schematic flowchart of another method for accessing a wireless local area network according to an embodiment of this application. As shown in FIG. 12A and FIG. 12B, the method includes the following steps.

S1201: A terminal sends a probe request frame that carries information about a first random MAC address.

For specific explanations, refer to the corresponding descriptions in step S1001. Details are not described herein again.

S1202: The terminal receives a probe response frame sent by an AR and determines, based on information carried in the probe response frame, types of Wi-Fi provided by all APs that can be received by the terminal.

For specific explanations, refer to the corresponding descriptions in step S1002. Details are not described herein again.

S1203: If a historical record is not stored for Wi-Fi provided by an AP 1 accessed by the terminal, the terminal selects a device address based on a type of Wi-Fi provided by the AP 1, and starts to establish a connection to the AP 1 by using the selected device address.

A difference from step S1003 is that, if Wi-Fi provided by the AP 1 selected by the user belongs to a type II network, in a process of establishing a connection to the AP 1, the terminal generates, by using the processor, a second random MAC address used to identify the terminal. In an access process, if access still fails when a quantity of access times is equal to N (N is an integer), the processor invokes a device MAC address stored in an internal memory 121 to identify the terminal, sends the probe request frame that carries information about the device MAC address to the AP 1, and attempts to establish a connection to the AP 1, If the connection is successfully established, the historical record is stored in the internal memory. The historical record indicates that the device address that is used by the terminal to identify the terminal and that corresponds to the AP 1 is the device MAC address. If access fails, the historical record is stored in the internal memory. The historical record indicates that the device address that is used by the terminal to identify the terminal and that corresponds to the AP 1 is the second random MAC address. Alternatively, if access fails, the SSID 1 of the AP 1 is stored, and when the terminal scans the AP 1 again, the terminal does not perform sending to access the AP 1 (for example, does not send the probe request frame to the AP 1).

For other specific explanations, refer to the corresponding descriptions in step S1003. Details are not described herein main.

N may be selected from 3, 4, 5, 6, 7, or the like, and is set by a terminal vendor based on aspects such as user experience and comfort.

According to the method in this embodiment of this application, for the type II network, if access still fails by using a random MAC address for a plurality of times, a connection to an AP is attempted to be established by using device MAC as a device address. This avoids a case in which the terminal cannot perform access because a whitelist is set by the AP. In the method, both a random MAC address and a device MAC address are set by the terminal to identify the terminal. This reduces a possibility that a third party obtains a complete activity track of the terminal by using the device MAC of the terminal, and also considers a case in which Wi-Fi cannot be accessed due to AP compatibility. If the AP is a risky pseudo AP, although the terminal attempts to perform access by using the device MAC address, for the pseudo AP, when the terminal finds the pseudo AP again after attempt access fails, the device address of the terminal is a random MAC address or the terminal does not access the pseudo AP to avoid access to an AP with poor security.

Figure 13A:
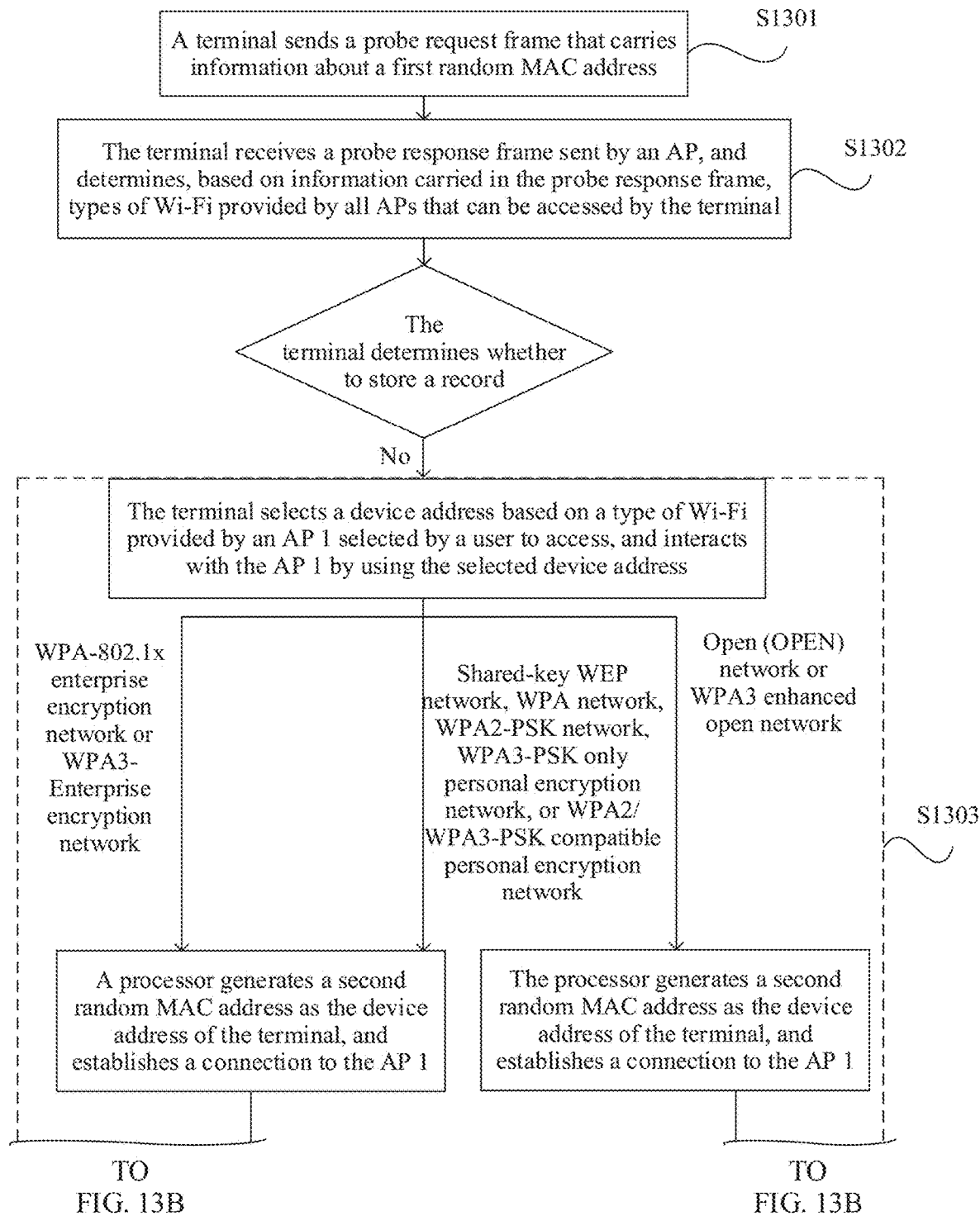
FIG. 13A and FIG. 13B are a schematic flowchart of another method for accessing a wireless local area network according to an embodiment of this application.
Figure 13B:
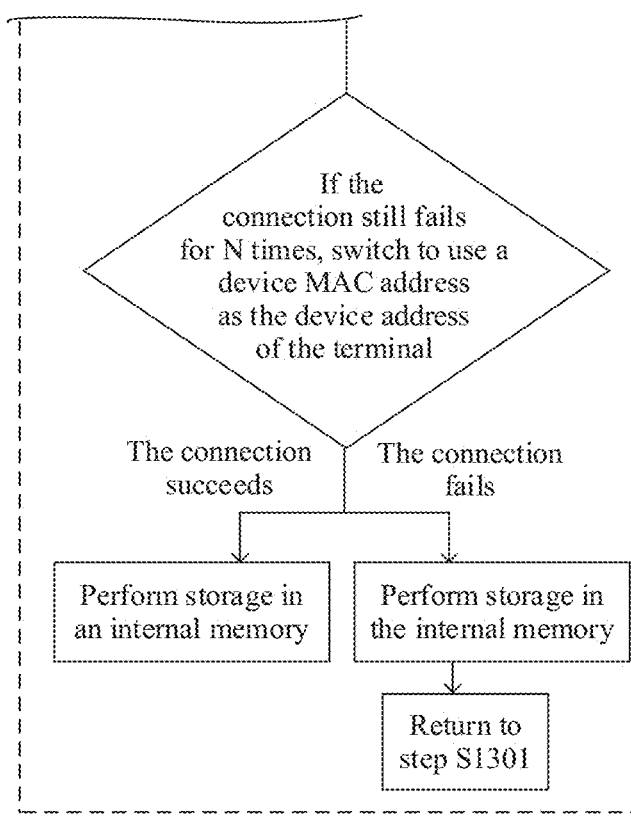
Figure 13B:
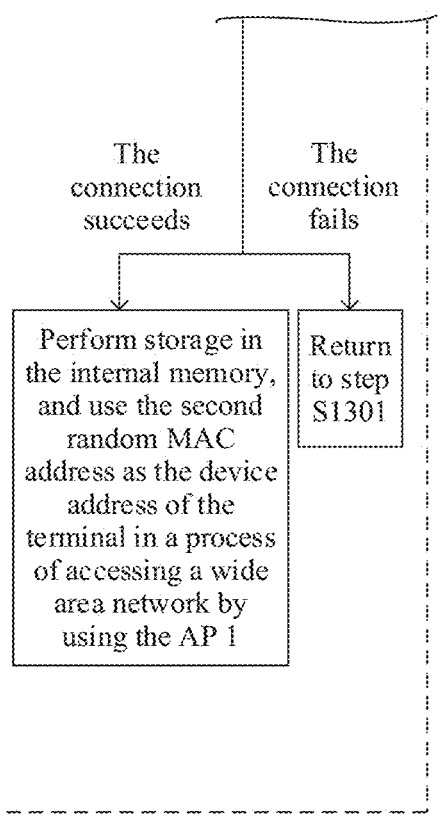

FIG. 13A and FIG. 13B are a schematic flowchart of another method for accessing a wireless local area network according to an embodiment of this application. As shown in FIG. 13A and FIG. 13B, the method includes the following steps.

S1301: A terminal sends a probe request frame that carries information about a first random MAC address.

For specific explanations, refer to the corresponding descriptions in step S1001. Details are not described herein again.

S1302: The terminal receives a probe response frame sent by an AP, and determines, based on information carried in the probe response frame, types of Wi-Fi provided by all APs that can be received by the terminal.

For specific explanations, refer to the corresponding descriptions in step S1002. Details are not described herein again.

S1303: If a historical record is not stored for Wi-Fi provided by an AP 1 accessed by the terminal, the terminal selects a device address based on a type of Wi-Fi provided by the AP 1, and starts to establish a connection to the AP 1 by using the selected device address.

A difference from step S1203 is that, if Wi-Fi provided by the AP 1 selected by the user belongs to a type III network, in a process of establishing a connection to the AP 1, the terminal uses a same processing method as the type II network in S1203. For specific explanations, refer to step S1203. Details are not described herein.

In another optional implementation, the terminal on the type 11 network may use the processing method of the type II network in step S1003. Details are not described herein again.

According to the method in this embodiment of this application, for the type III network, a random MAC address is attempted to be used as a device address. If access succeeds, the random MAC address is used as the device address. If access fails, the terminal further uses a device MAC address as the device address, Both the random MAC address and the device MAC address are set to identify the terminal. This reduces a possibility that a third party obtains the device MAC address of the terminal. If the random MAC address can be used to access Wi-Fi, the random MAC address is used to identify the terminal device. In this way, a third party cannot obtain a complete activity track of the terminal by using the device MAC address of the terminal, and a case in which the terminal cannot access Wi-Fi due to AP compatibility is also considered.

In some embodiments of this application, the terminal may be provided with a privacy protection mode, and the user may enable the privacy protection triode as required. For example, after enabling the privacy protection mode, the terminal uses a random MAC address in a Wi-Fi access process.

Figure 14A:
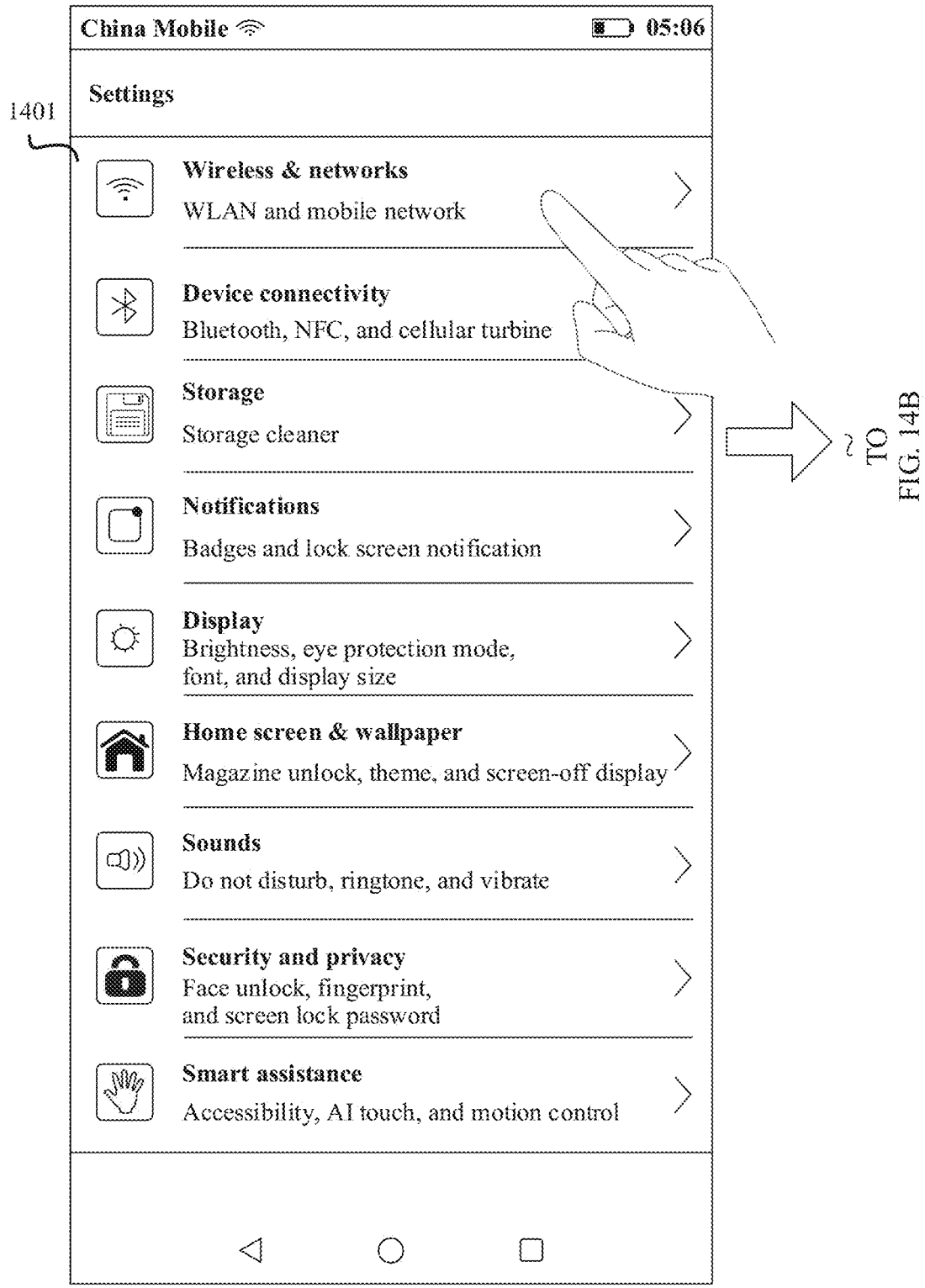
Figure 14B:
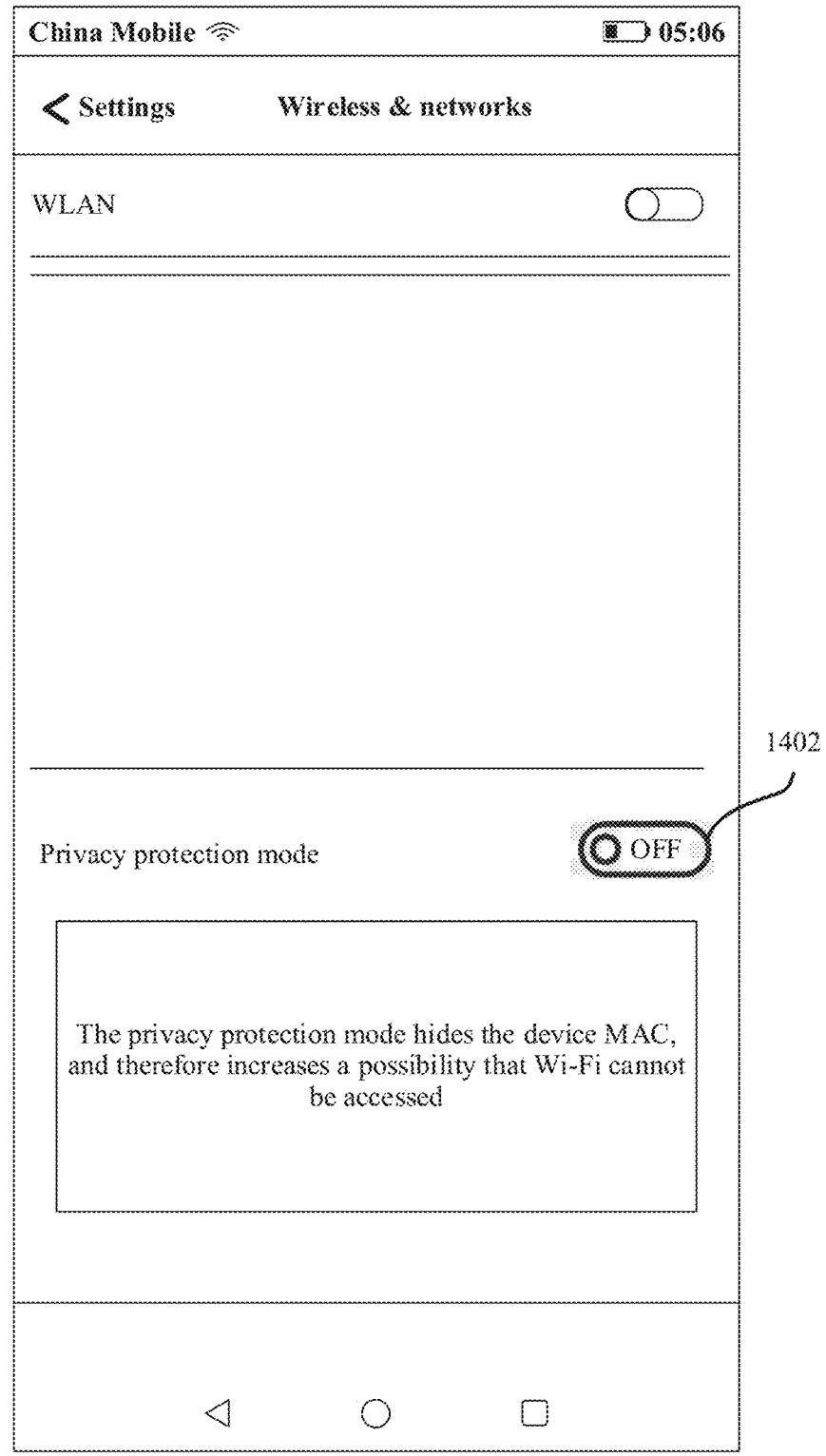

For example, FIG. 14A and FIG. 14B show a possible method for enabling a privacy protection mode by a user. As shown in FIG. 14A, the display of the terminal displays an interface that is currently output by the system, and the interface includes a setting interface. In some embodiments, the interface that is output by the terminal is output by the terminal in response to an input user operation, and the user operation may include a tap operation performed by the user on a setting icon on a desktop displayed by the terminal. As shown in FIG. 14A, the setting interface may include a plurality of setting options (for example, "Wireless & networks", "Device connectivity", "Storage", "Notifications", "Display", "Home screen & wallpaper", "Sounds", "Security and privacy", and "Smart assistance"), and the user may tap any setting option to perform a corresponding setting (for example, go to a device connection setting to enable Bluetooth, or go to a display setting to adjust display brightness.)

In some embodiments, in addition to the setting interface, a system output interface may further include a system-level interface element, for example, a status bar or a navigation bar. The status bar may include an operator name (for example, China Mobile), a time, a Wi-Fi icon, signal strength, a current residual capacity, and the like. The navigation bar may include a back button icon, a home screen button icon, a menu button icon, and the like.

As shown in FIG. 14B, in response to a tap operation performed by the user on the option "Wireless & networks" 1401 on the setting interface, the display of the terminal displays a "Wireless & networks" setting interface. As shown in FIG. 14B, the "Wireless & networks" setting interface may include an on/off control 1402 of a privacy protection mode and a description of the privacy protection mode. In FIG. 14B, the privacy protection mode is in a disabled state, and the user may tap the on/off control 1402 to enable the privacy protection mode. The description of the privacy protection mode may briefly introduce a function of the privacy protection mode to the user. For example, as shown in FIG. 14B, the privacy protection mode may be described as follows: The privacy protection mode hides device MAC. This increases a possibility that Wi-Fi cannot be accessed. In some possible implementations, the description of the privacy protection mode may further include more abundant information, for example, a specific measure taken after the terminal enables the privacy protection mode.

In some embodiments, an interface displayed on a leftmost screen of the terminal includes an icon of the privacy protection mode, and the user taps the icon to enable and disable the privacy protection mode. For example, the user may directly tap the icon, and the terminal enables the privacy protection mode in response to the tap operation performed by the user. When the privacy protection mode is enabled, the user taps the icon, and the terminal disables the privacy protection mode in response to the tap operation performed by the user. The privacy protection mode may be enabled and disabled in another manner. This is not limited herein.

After the user enables the privacy protection mode, the terminal uses the random MAC address generated by the processor as the device address to access Wi-Fi, instead of using the device MAC as the device address. In this way, user operability is improved, and the user of the terminal performs independent selection according to different requirements and different environments.

Figure 15A:
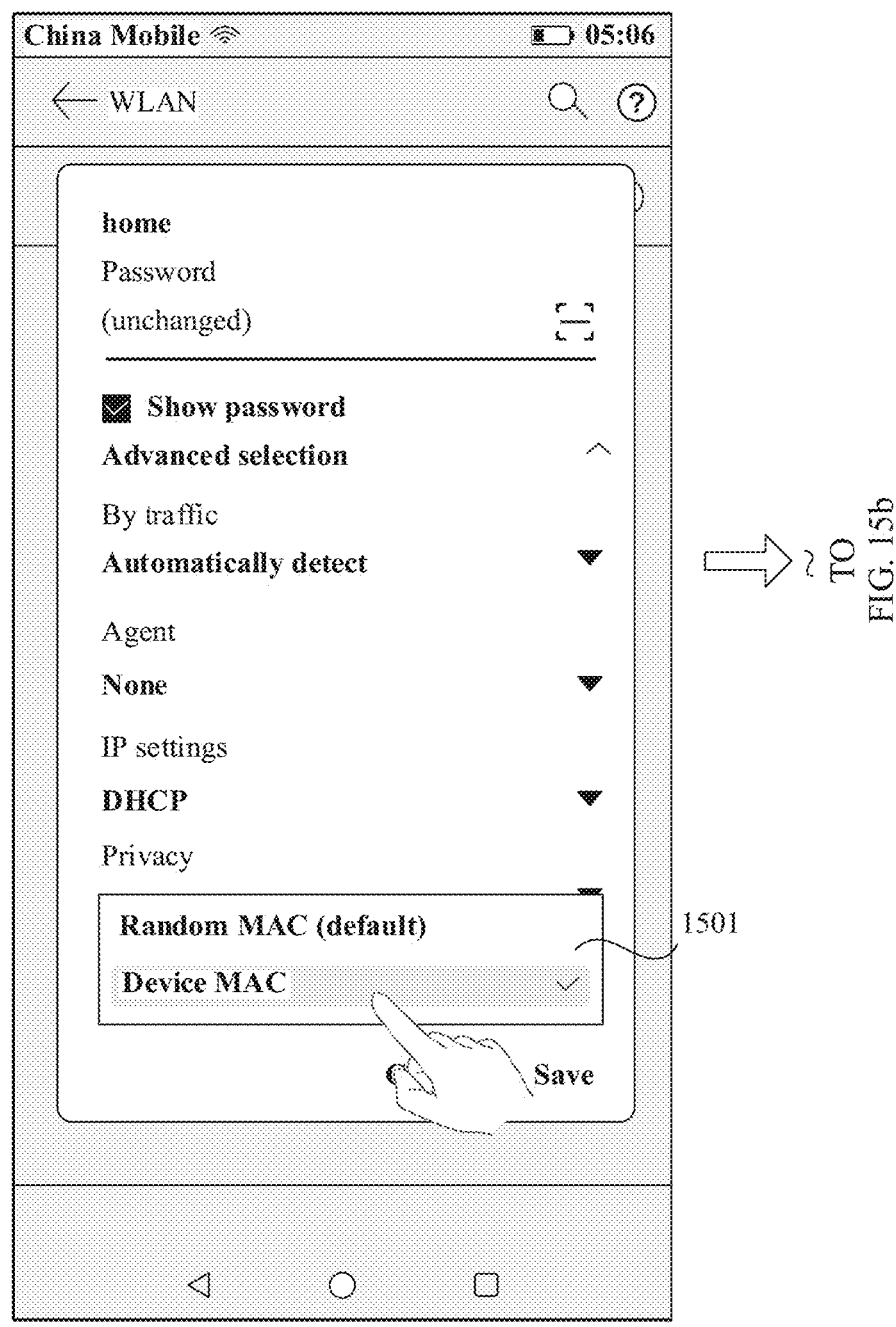
Figure 15B:
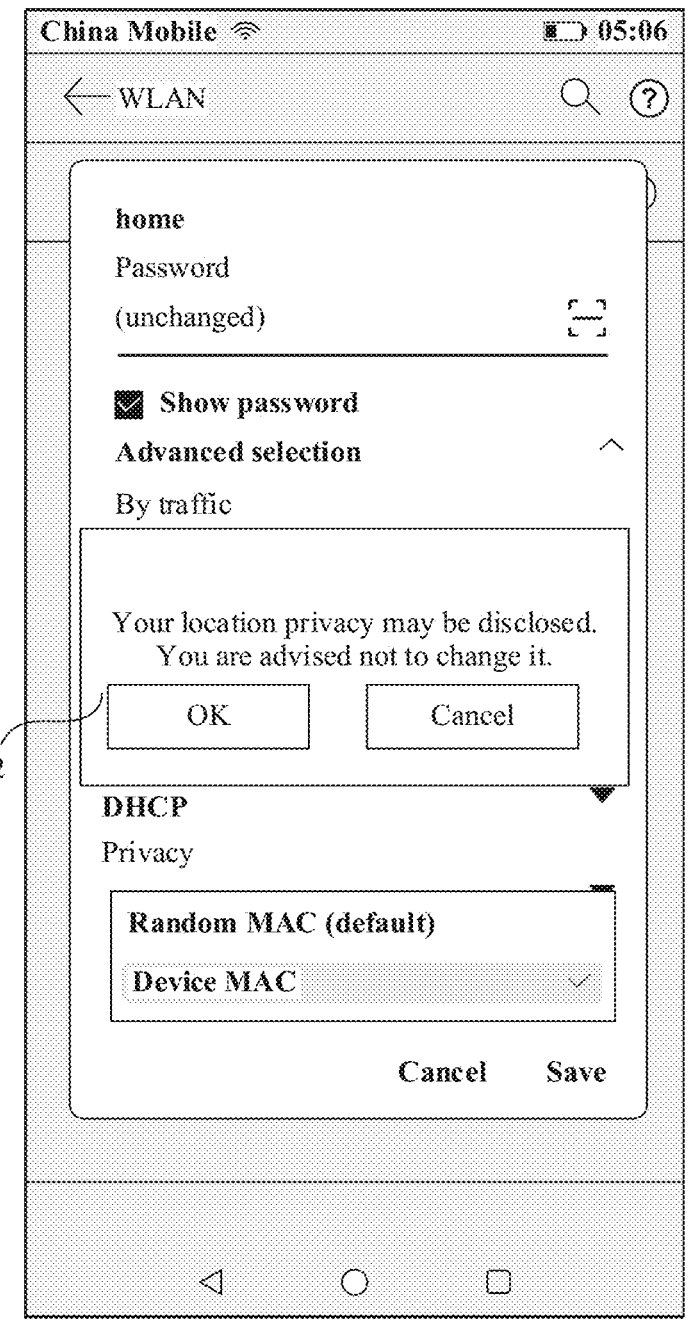
Figure 15C:
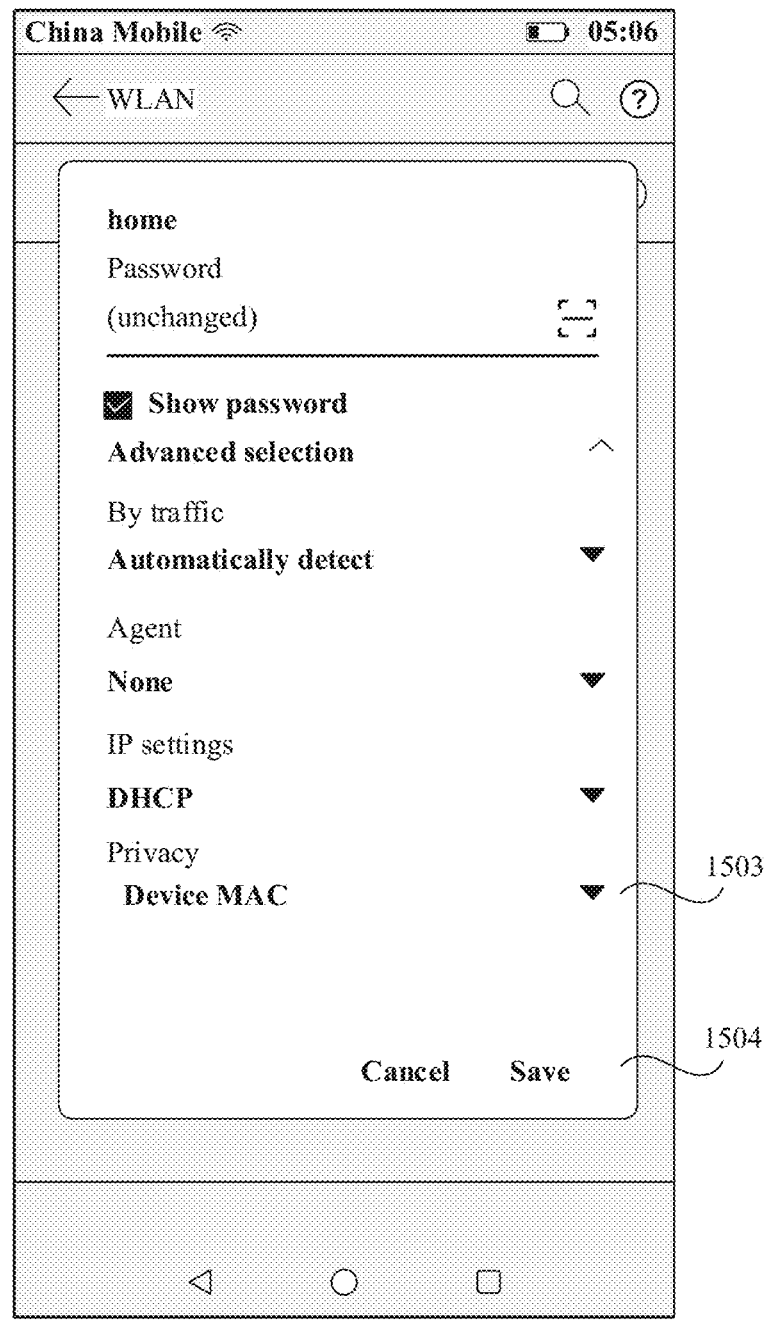

In some embodiments of this application, for the type I network or the type II network, when the user turns on the device MAC option for the network, the terminal may prompt the user of a current situation in which location privacy cannot be protected. As shown in FIG. 15*b*, in response to a tap operation performed by the user on a privacy option 1501 for using device MAC on a network details setting interface, the display of the terminal displays a prompt message. For example, refer to FIG. 15*b*. The terminal may prompt, in a form of a floating window 1502 on an interface that is currently output by the system, the user of "Your location privacy may be disclosed. You are advised not to change it.". In some embodiments, as shown in the floating window 1502, a privacy option has been selected to use device MAC, and the user taps an option "Save" 1504 and saves the setting manner in response to the tap operation performed by the user. In some embodiments, the user may further tap an option "Cancel" to close the floating window 1502. Herein, the terminal may further prompt, by using a pop-up window on the top of the display or by displaying prompt information in a notification bar in addition to using the floating window 1502 shown in FIG. 15*a* to FIG. 15*c*, the user that there is a risk of location privacy leakage. This is not limited herein.

Similarly, in some embodiments of this application, for the type III network, when the user turns on a random MAC option for the network and the terminal cannot connect to the Internet for N times, the terminal may prompt the user to change a privacy setting to use the device MAC. For example, the terminal may prompt the user to change the option setting by using a floating window, by using a pop-up window on the top of the display, or by displaying prompt information in a notification bar. This is not limited herein. N may be selected from 3, 4, 5, 6, 7, or the like, and is set by a terminal vendor based on aspects such as user experience and comfort. In this way, after learning of a current situation of the terminal through prompting by the terminal, the user may select an appropriate solution as required.

Figure 16:
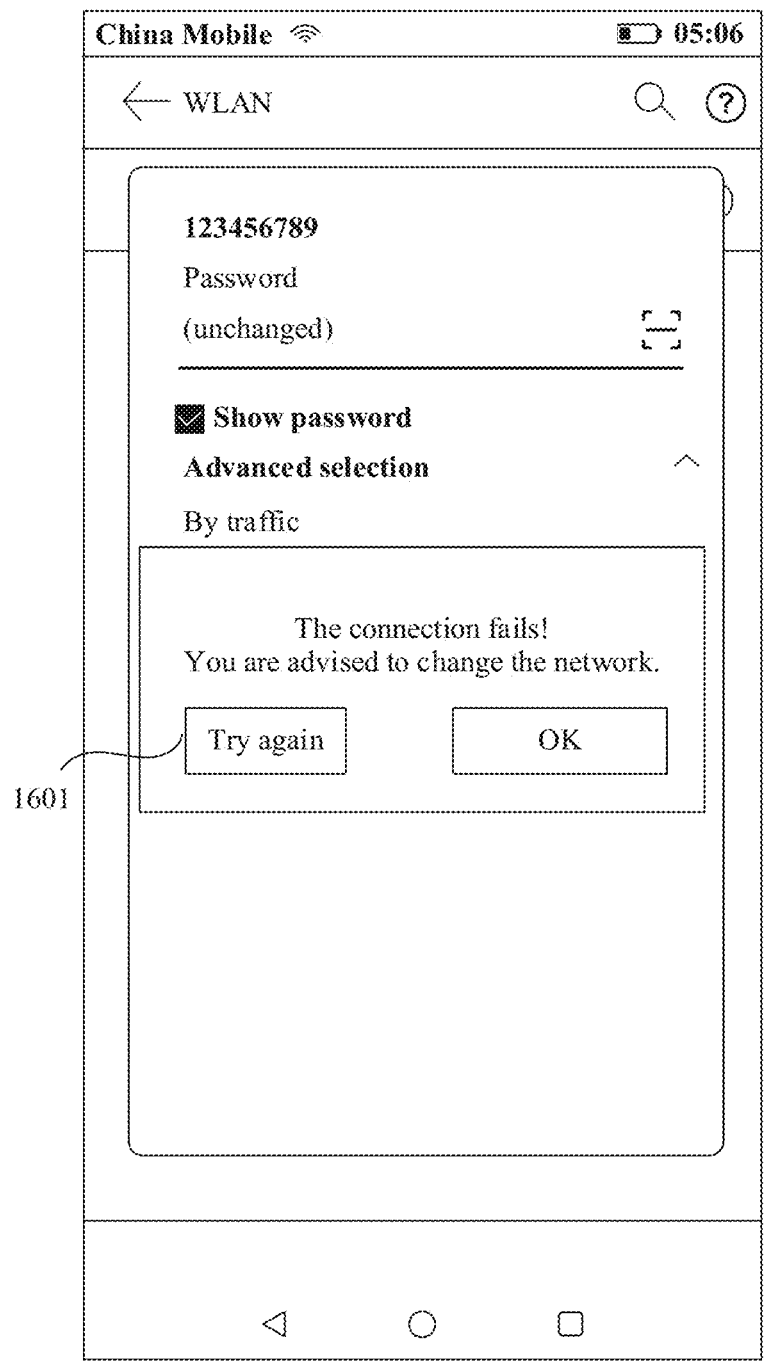

In some embodiments of this application, a connection fails due to a weak signal, object shielding, or the like. When the terminal fails to access Wi-Fi after five times of attempt connections, it is considered that Wi-Fi access fails, and the display of the terminal displays a prompt message indicating a connection failure. Optionally, a recommendation may be provided to recommend changing a network. For example, refer to FIG. 16. The terminal may prompt, in a form of a floating window 1601 on an interface that is currently output by the system, the user of "The connection fails! You are advised to change the network.". In some embodiments, the floating window 1601 may further include an option "Try again" and an option "OK". The user may tap the option "Try again" to attempt to connect to the network again. In this way, the user may learn of a Wi-Fi access status through prompting by the terminal, so as to select a response status.

Figure 17A:
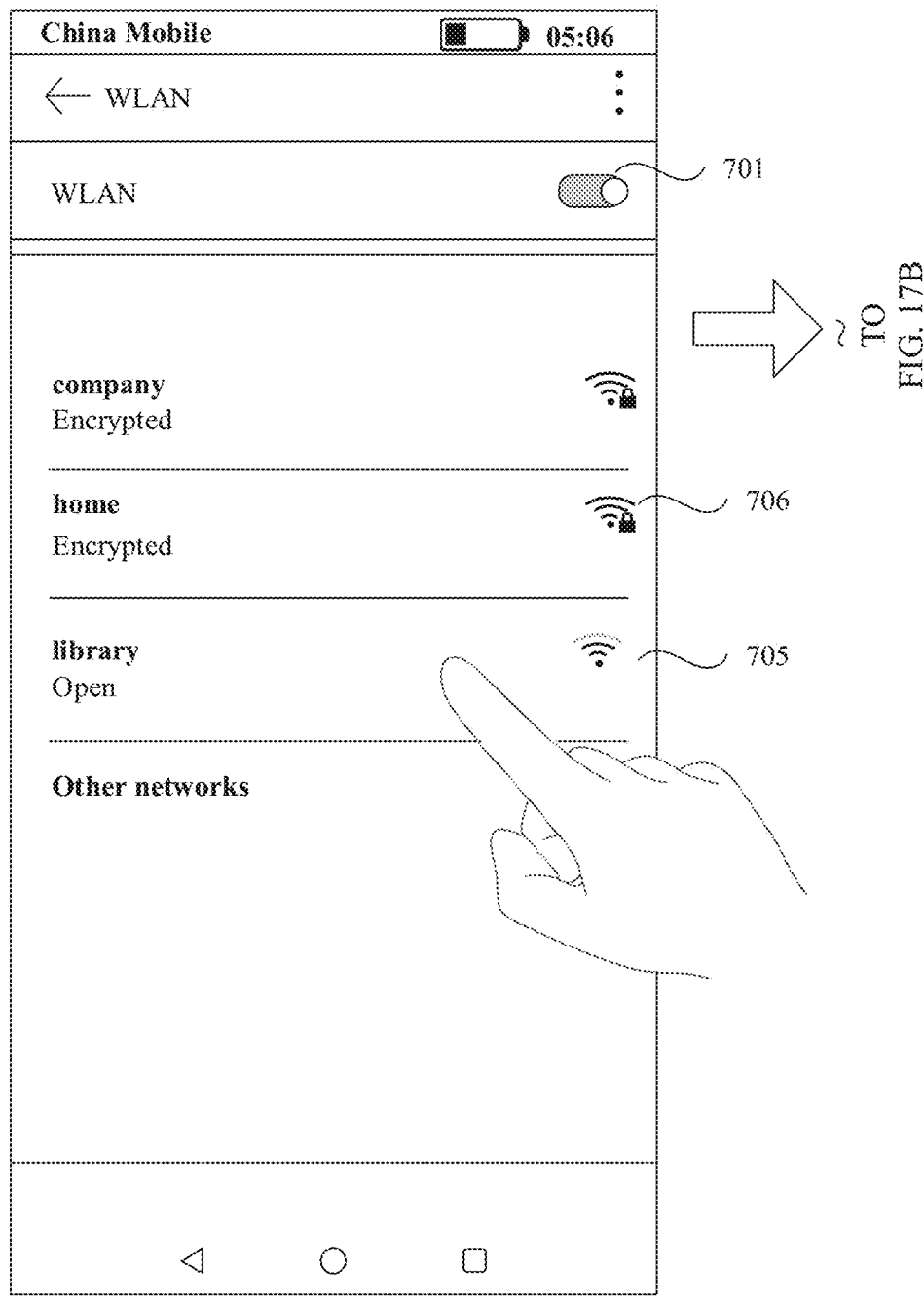
Figure 17B:
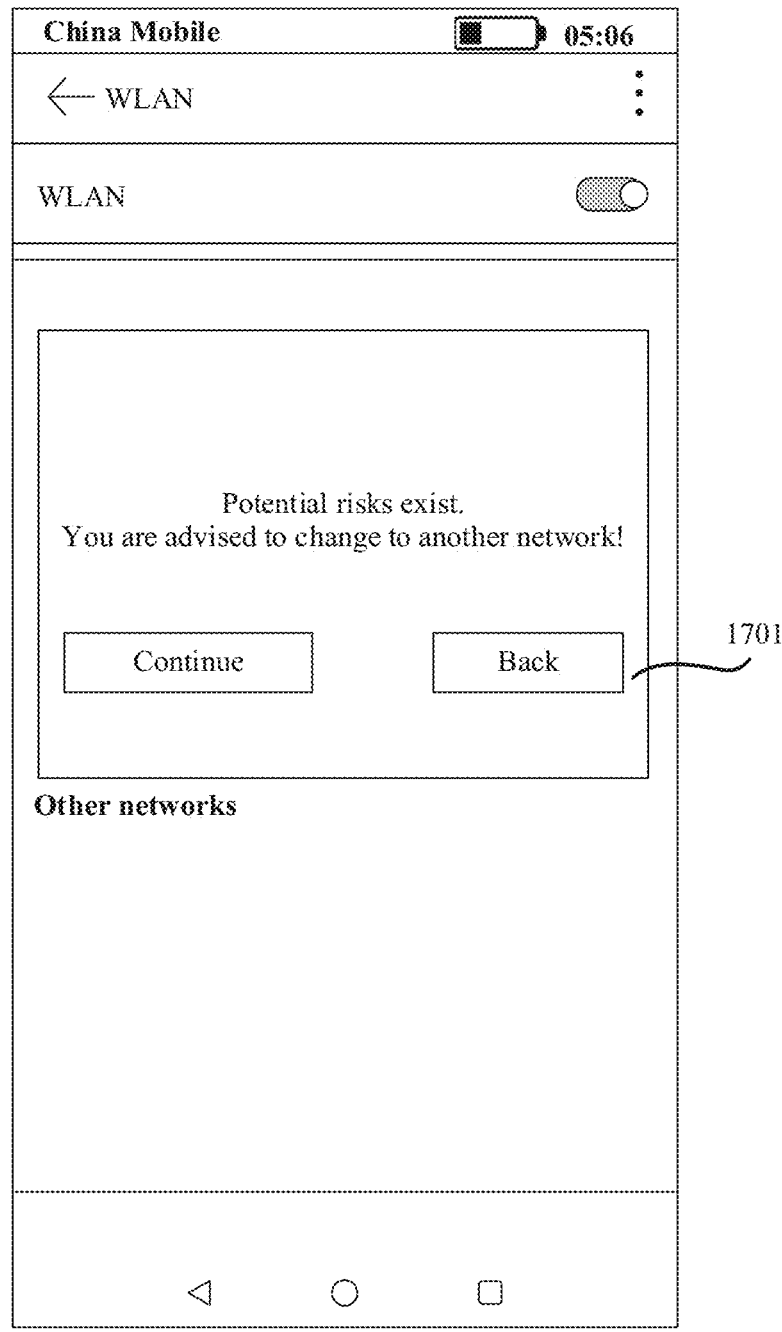

In some embodiments of this application, when the user selects type I Wi-Fi from the available MAN list, the display of the terminal may notify, by using a floating window, the user that Wi-Fi has a risk of location privacy leakage. For example, as shown in FIG. 17A and FIG. 17B, the terminal may prompt, in a form of a floating window 1701 on an interface that is currently output by the system, the user of "Potential risks exist. You are advised to change to another network!". In some embodiments, the user may tap "Continue" to continue accessing. In some embodiments, the user may further tap an option "Back" to close the floating window 1701 for reselection. In some embodiments, when the user selects the option "Continue", the user is prompted to enable the privacy protection mode. For example, the terminal may prompt the user by using a floating window. After the user selects enabling, the user accesses Wi-Fi after the user enables the privacy protection mode. In this way, the user may learn of a Wi-Fi security status through prompting by the terminal, so as to select a response status.

An embodiment of this application further provides a terminal, including one or more touchscreens, one or more memories, and one or more processors. The one or more memories store one or more programs, and when the one or more processors execute the one or more programs, the terminal is enabled to implement the technical solutions of the methods in the foregoing embodiments. Details are not described herein again.

An embodiment of this application further provides a graphical user interface (GUI). The graphical user interface is stored in a terminal, the terminal includes a touchscreen, a memory, and one or more processors, the one or more processors are configured to execute one or more computer programs stored in the memory, and the graphical user interface includes: a first GUI displayed on the touchscreen, where the first GUI includes a control of identification information of the first wireless local area network and an identifier indicating signal strength of the first wireless local area network; a second. GUI displayed on the touchscreen in response to a first touch event tor the control of the identification information of the first wireless local area network, where the second GUI includes a control using virtual MAC and a control using device MAC, the control using virtual MAC is in a selected state, and that the control using virtual MAC is in a selected state indicates that the terminal accesses the first wireless local area network by using a virtual MAC address; a third GUI displayed on the touchscreen in response to a second touch event for the control using device MAC, where the third GUI includes the control using virtual MAC and the control using device MAC, the control using device MAC is in a selected state, and that the control using device MAC is in a selected state indicates that the terminal accesses the first wireless local area network by using the device MAC address; and a fourth GUI displayed on the touchscreen in response to a third touch event for the control of the identification information of the first wireless local area network, where the fourth GUI includes an identifier indicating that the first wireless local area network is in a connected state. According to the foregoing graphical user interface, a user may implement a control function and a function used to identify a device address of the terminal. This improves a capability of intelligent interaction between the terminal and the user.

An embodiment of this application further provides a computer-readable storage medium, including instructions. When the instructions are run on an electronic device, the electronic device is enabled to perform the methods in the foregoing embodiments. Details are not described herein again.

According to the terminal provided in this embodiment of this application, different technical solutions are used for different network types, so that AP compatibility is considered and a Wi-Fi access success rate is increased without affecting user experience. The terminal is prevented from using a device MAC address of the terminal as a fixed identifier, the terminal may be tracked based on the fixed identifier, and the user may be further tracked. This effectively protects user location privacy, satisfies a requirement of the user of the terminal, and improves security of user location information.

What is claimed is:

1. A method for accessing a wireless local area network (WLAN) implemented by a terminal, wherein the method comprises:
   receiving, from a first access point, type information of a first WLAN and first identification information of the first WLAN, wherein the first WLAN is of the first access point;
   sending a first message to the first access point when the type information indicates that a first type of the first WLAN is a type I, wherein the first message requests to access the first WLAN and carries a first virtual media access control (MAC) address, wherein the first virtual MAC address identifies the terminal, and wherein the first virtual MAC address is different from a device MAC address of the terminal;
   sending a second message to the first access point when the type information indicates that a second type of the first WLAN is a type III, wherein the second message requests to access the first WLAN, and wherein the second message carries the device MAC address; and
   storing the first identification information after detecting that the terminal accesses the first WLAN.

2. The method of claim 1, wherein after accessing the first WLAN, the method further comprises:
   storing a correspondence between the first identification information and the first virtual MAC address;
   leaving the first WLAN;
   receiving, from the first access point again, the type information and the first identification information; and
   re-sending, to the first access point based on the correspondence, the first message.

3. The method of claim 1, wherein before accessing the first WLAN, the method further comprises:
   accessing the first WLAN; and
   sending, to a second access point and in response to accessing the first WLAN, a third message requesting to access a second WLAN, wherein the third message carries a second virtual MAC address, wherein the second virtual MAC address identifies the terminal, wherein the second virtual MAC address is different from the device MAC address, and wherein the second WLAN is of the second access point.

4. The method of claim 1, wherein the type I comprises an open network, a WI-FI Protected Access (WPA) 3 (WPA3) enhanced open network, a shared-key Wired Equivalent Privacy (WEP) network, a WPA network, a WPA II (WPA2)-pre-shared key (PSK) network, a WPA3-PSK only personal encryption network, or a WPA2/WPA3-PSK compatible personal encryption network.

5. The method of claim 1, wherein before sending the first message, the method further comprises detecting that a correspondence between the first identification information and the first virtual MAC address is not stored in the terminal.

6. The method of claim 1, wherein after accessing the first WLAN, the method further comprises:
   displaying a first interface comprising a first control of the first identification information, a first identifier indicating that the first WLAN is in a connected state, and a second identifier indicating signal strength of the first WLAN;
   detecting, from a user on the first control, a first operation;
   displaying, in response to the first operation, a second interface comprising a second control using virtual MAC and a third control using device MAC, wherein the second control is in a first selected state indicating that the terminal accesses the first WLAN using the first virtual MAC address;
   detecting, from the user on the third control, a first selection operation;
   displaying, in response to the first selection operation, a third interface comprising the second control and the third control, wherein the third control is in a second selected state indicating that the terminal accesses the first WLAN using the device MAC address;
   leaving the first WLAN; and
   sending, to the first access point, a third message requesting to access the first WLAN, wherein the third message carries the device MAC address.

7. The method of claim 1, wherein after accessing the first WLAN, the method further comprises:
   displaying a fourth interface comprising a first control of the first identification information, a first identifier indicating that the first WLAN is in a connected state, a second identifier indicating signal strength of the first WLAN, and a second control of second identification information of a second WLAN, wherein the second WLAN is of a second access point;
   detecting, from a user on the second control, a second operation;
   displaying, in response to the second operation, a fifth interface comprising a third control using virtual MAC and a fourth control using device MAC, wherein the third control is in a first selected state indicating that the terminal accesses the second WLAN using the first virtual MAC address;
   detecting, from the user on the fourth control using device MAC, a second selection operation;
   displaying, in response to the second selection operation, a sixth interface comprising the third control and the fourth control, wherein the fourth control is in a second selected state indicating that the terminal accesses the second WLAN using the device MAC address;
   detecting, from the user on the second control, a third operation;
   leaving the first WLAN in response to the third operation; and sending, to the second access point, a third message requesting to access the second WLAN, wherein the third message carries the device MAC address.

8. The method of claim 1, wherein after accessing the first WLAN, the method further comprises:

displaying a seventh interface comprising a first control of the first identification information, a second control of second identification information of a third WLAN, a first identifier indicating that the first WLAN is in a connected state, and a second identifier indicating signal strength of the first WLAN, wherein the third WLAN is of a third access point;

detecting, from a user on the second control, a fourth operation;

leaving, in response to the fourth operation, the first WLAN; and sending, to the third access point when a third type of the third WLAN is the type I, a third message requesting to access the third WLAN, wherein the third message carries a third virtual MAC address, wherein the third virtual MAC address identifies the terminal and is different from the first virtual MAC address and the device MAC address, and wherein the third WLAN is different from the first WLAN.

9. The method of claim 1, wherein the type III comprises a WI-FI Protected Access (WPA)-802.1x Enterprise encryption network or a WPA 3 (WPA3)-Enterprise encryption network.

10. A method for accessing a wireless local area network (WLAN) implemented by a terminal, wherein the method comprises:

receiving, from a first access point, type information of a first WLAN and first identification information of the first WLAN, wherein the first WLAN is of the first access point;

sending, to the first access point when the type information indicates that a first type of the first WLAN is a type II, a first message requesting to access the first WLAN, wherein the first message carries a first virtual media access control (MAC) address identifying the terminal, and wherein the first virtual MAC address is different from a device MAC address of the terminal;

sending, to the first access point when the terminal cannot access the first WLAN, a second message requesting to access the first WLAN, wherein the second message carries the device MAC address;

sending, to the first access point when the type information indicates that a second type of the first WLAN is a type III, a third message, wherein the third message requests to access the first WLAN, and wherein the third message carries the device MAC address; and storing the first identification information after accessing the first WLAN.

11. The method of claim 10, wherein after accessing the first WLAN, the method further comprises:

storing a correspondence between the first identification information and the device MAC address;

leaving the first WLAN;

receiving, from the first access point again, the type information and the first identification information; and re-sending, to the first access point based on the correspondence, the second message.

12. The method of claim 10, wherein before sending the second message, the method further comprises:

accessing the first WLAN;

storing a correspondence between the first identification information and the first virtual MAC address after the terminal accesses the first WLAN;

leaving, by the terminal, the first WLAN;

receiving, from the first access point again, the type information and the first identification information; and re-sending the first message to the first access point based on the correspondence.

13. The method of claim 10, wherein the type II comprises a shared-key Wired Equivalent Privacy (WEP) network, a WI-FI Protected Access (WPA) network, a WPA II (WPA2)-pre-shared key (PSK) network, a WPA 3 (WPA3)-PSK only personal encryption network, a WPA2/WPA3-PSK compatible personal encryption network, a WPA-802.1x Enterprise encryption network, or a WPA3-Enterprise encryption network.

14. The method of claim 10, further comprising:

identifying that a quantity of times for which the terminal requests to access the first WLAN is greater than or equal to N, wherein N is an integer; and identifying, in response to the quantity of times being greater than or equal to N, that the terminal cannot access the first WLAN.

15. The method of claim 10, wherein before sending the second message, the method further comprises:

displaying a first interface comprising a reminder message, wherein the reminder message reminds a user to make a selection to access the first WLAN using device MAC;

displaying a second interface comprising a first control of the first identification information and an identifier indicating signal strength of the first WLAN;

detecting, from the user on the first control, a first operation;

displaying, in response to the first operation, a third interface comprising a second control using virtual MAC and a third control using device MAC, wherein the second control is in a first selected state indicating that the terminal accesses the first WLAN using the first virtual MAC address;

detecting, from the user on the third control, a first selection operation; and displaying, in response to the first selection operation, a fourth interface comprising the second control and the third control, wherein the third control is in a second selected state indicating that the terminal accesses the first WLAN using the device MAC address.

16. The method of claim 10, wherein before sending the first message, the method further comprises detecting that a correspondence between the first identification information and the first virtual MAC address is not stored.

17. The method of claim 10, wherein after accessing the first WLAN, the method further comprises:

displaying a fifth interface comprising a first control of the first identification information, a first identifier indicating that the first WLAN is in a connected state, and a second identifier indicating signal strength of the first WLAN;

detecting, from a user on the first control, a second operation;

displaying, in response to the second operation, a fourth interface comprising a second control using virtual MAC and a third control using device MAC, wherein the third control is in a first selected state indicating that the terminal accesses the first WLAN using the device MAC address;

detecting, from the user on the second control, a second selection operation;

displaying, in response to the second selection operation, a third interface comprising the second control and the third control, wherein the second control is in a second selected state indicating that the terminal accesses the first WLAN using the first virtual MAC address;

leaving the first WLAN; and re-sending, to the first access point, the first message requesting to access the first WLAN, wherein the first message carries the first virtual MAC address.

18. The method of claim 10, wherein after accessing the first WLAN, the method further comprises:

displaying a sixth interface comprising a first control of the first identification information, a first identifier indicating that the first WLAN is in a connected state, a second identifier indicating signal strength of the first WLAN, and a second control of identification information of a second WLAN, wherein the second WLAN is of a second access point;

detecting, from a user on the second control, a third operation;

displaying, in response to the third operation, a seventh interface comprising a third control using virtual MAC and a fourth control using device MAC, wherein the third control is in a first selected state indicating that the terminal accesses the second WLAN using the first virtual MAC address;

detecting, from the user on the fourth control, a third selection operation;

displaying, in response to the third selection operation, an eighth interface comprising the third control and the fourth control, wherein the fourth control is in a second selected state indicating that the terminal accesses the second WLAN using the device MAC address;

detecting, from the user on the second control, a fourth operation;

leaving the first WLAN in response to the fourth operation; and sending, to the second access point, a fourth message requesting to access the second WLAN, wherein the fourth message carries the device MAC address.

19. The method of claim 10, wherein after accessing the first WLAN, the method further comprises:

displaying a ninth interface comprising a first control of the first identification information, a second control of second identification information of a third WLAN, a second identifier indicating that the first WLAN is in a connected state, and a third second identifier indicating signal strength of the first WLAN;

detecting, from a user on the second control, a fifth operation;

leaving the first WLAN in response to the fifth operation;

sending, to a third access point when a third second type of the third WLAN is the type II, a fourth message requesting to access the third WLAN, wherein the fourth message carries a second virtual MAC address, wherein the second virtual MAC address identifies the terminal and is different from the first virtual MAC address and the device MAC address, and wherein the third WLAN is different from the first WLAN; and sending, to the third access point when the terminal cannot access the third WLAN, a fifth message requesting to access the third WLAN, wherein the fifth message carries the device MAC address.

20. A terminal, comprising:

a memory configured to store instructions; and one or more processors coupled to the memory and configured to execute the instructions to:

receive, from a first access point, type information of a first wireless local area network (WLAN) and first identification information of the first WLAN, wherein the first WLAN is of the first access point;

send a first message to the first access point when the type information indicates that a first type of the first WLAN is a type I, wherein the first message requests to access the first WLAN and carries a first virtual media access control (MAC) address, wherein the first virtual MAC address identifies the terminal, and wherein the first virtual MAC address is different from a device MAC address of the terminal;

send a second message to the first access point when the type information indicates that a second type of the first WLAN is a type III, wherein the second message requests to access the first WLAN, and wherein the second message carries the device MAC address; and store the first identification information after detecting that the terminal accesses the first WLAN.

* * * * *

UNITED STATES PATENT AND TRADEMARK OFFICE
CERTIFICATE OF CORRECTION

| | |
|---|---|
| PATENT NO. | : 12,219,470 B2 |
| APPLICATION NO. | : 17/611427 |
| DATED | : February 4, 2025 |
| INVENTOR(S) | : Qihang Chen and Peng Yang |

It is certified that error appears in the above-identified patent and that said Letters Patent is hereby corrected as shown below:

In the Claims

Claim 19, Column 54, Line 7: "connected state, and a third second identifier indicating" should read "connected state, and a third identifier indicating"

Claim 19, Column 54, Line 12: "sending, to a third access point when a third second type" should read "sending, to a third access point when a third type"

Signed and Sealed this
First Day of April, 2025

Coke Morgan Stewart
*Acting Director of the United States Patent and Trademark Office*